(12) United States Patent
Anderson et al.

(10) Patent No.: US 7,431,239 B2
(45) Date of Patent: Oct. 7, 2008

(54) ONE-PIECE CLOSED-SHAPE STRUCTURE AND METHOD OF FORMING SAME

(75) Inventors: Alan H. Anderson, Placentia, CA (US); Kathlene K. Bowman, Lancaster, CA (US); Paul D. Teufel, Los Alamitos, CA (US)

(73) Assignee: Toyoto Motor Sales, U.S.A., Inc., Torrance, CA (US)

( * ) Notice: Subject to any disclaimer, the term of this patent is extended or adjusted under 35 U.S.C. 154(b) by 641 days.

(21) Appl. No.: 10/712,042

(22) Filed: Nov. 14, 2003

(65) Prior Publication Data

US 2004/0188025 A1 Sep. 30, 2004

Related U.S. Application Data

(62) Division of application No. 09/987,612, filed on Nov. 15, 2001, now Pat. No. 6,823,578.

(60) Provisional application No. 60/248,190, filed on Nov. 15, 2000.

(51) Int. Cl.
 *B64C 1/00* (2006.01)
(52) U.S. Cl. ............................ 244/119; 156/173
(58) Field of Classification Search .................. 244/119; 29/569, 700, 598, 608; 156/173, 169
 See application file for complete search history.

(56) References Cited

U.S. PATENT DOCUMENTS

| | | | |
|---|---|---|---|
| 2,420,292 A | 5/1947 | Baer et al. | |
| 2,517,902 A | 8/1950 | Luebkeman | |
| 2,762,419 A | 9/1956 | Prewitt | |
| 3,616,063 A | 10/1971 | Bradley | |
| 3,874,030 A | 4/1975 | Knight | |
| 3,886,029 A | 5/1975 | Poulsen | |
| 4,086,378 A | 4/1978 | Kam et al. | |
| 4,492,607 A | 1/1985 | Halcomb | |
| 4,593,870 A | 6/1986 | Cronkhite | |
| 4,610,402 A | 9/1986 | Corbett et al. | |
| 4,783,232 A | 11/1988 | Carbone et al. | |
| 4,822,444 A | 4/1989 | Weingart et al. | |
| 4,869,761 A | 9/1989 | Weingart et al. | |
| 4,907,754 A | 3/1990 | Vaniglia | |
| 4,921,557 A | 5/1990 | Nakamura | |
| 4,938,824 A | 7/1990 | Youngkeit | |
| 5,022,952 A | 6/1991 | Vaniglia | |

(Continued)

OTHER PUBLICATIONS

"Filament Winding Composite Structure Fabrication," Society for the Advancement of Material and Process Engineering, 1991. (13 pages).

(Continued)

*Primary Examiner*—Tien Dinh
(74) *Attorney, Agent, or Firm*—Finnegan, Henderson, Farabow, Garrett & Dunner, LLP

(57) ABSTRACT

The present invention relates to a one-piece closed-shape structure and a method for manufacturing a one-piece closed-shape structure. In particular, the present invention relates to a one-piece fuselage and a method for manufacturing a one-piece fuselage. One embodiment of the method of the invention involves the use of molding technology, tooling technology, the integration of the molding and tooling technology, and fiber placement to manufacture a one-piece closed shape structure.

22 Claims, 66 Drawing Sheets

U.S. PATENT DOCUMENTS

| | | | |
|---|---|---|---|
| 5,059,377 A | 10/1991 | Ashton et al. | |
| 5,114,097 A | 5/1992 | Williams | |
| 5,223,067 A | 6/1993 | Hamamoto et al. | |
| 5,242,523 A | 9/1993 | Willden et al. | |
| 5,259,901 A | 11/1993 | Davis et al. | |
| 5,262,121 A | 11/1993 | Goodno | |
| 5,266,137 A | 11/1993 | Hollingsworth | |
| 5,362,345 A | 11/1994 | Stettler et al. | |
| 5,378,109 A | 1/1995 | Lallo et al. | |
| 5,447,765 A | 9/1995 | Crane | |
| 5,571,357 A | 11/1996 | Darrieux et al. | |
| 5,834,082 A * | 11/1998 | Day | 428/56 |
| 5,848,767 A | 12/1998 | Cappa et al. | |
| 5,925,297 A | 7/1999 | Noto | |
| 6,082,660 A | 7/2000 | Meyer | |
| 6,086,524 A | 7/2000 | Martin | |
| 6,096,164 A | 8/2000 | Benson et al. | |
| 6,112,792 A | 9/2000 | Barr et al. | |
| 6,139,278 A | 10/2000 | Mowbray et al. | |
| 6,179,945 B1 | 1/2001 | Greenwood et al. | |
| 6,190,598 B1 | 2/2001 | Murphy et al. | |
| 6,582,542 B1 | 6/2003 | Russell et al. | |
| 6,613,258 B1 * | 9/2003 | Maison et al. | 264/102 |
| 6,729,576 B2 | 5/2004 | Kay et al. | |
| 6,764,419 B1 | 7/2004 | Giannetti et al. | |

OTHER PUBLICATIONS

Entec Composite Machines Home Page, http://www.entec.com, Dec. 19, 2003. (2 pages).

McClean Anderson Home Page, http://www.mcleananderson.com, Dec. 19, 2003. (1 page).

Walsh, Paul et al., "Carbon Fiber Property Translation into Composite—A Comparison of Commercial Grade 48K Carbon Fibers Versus 12K Aerospace Fibers." (16 pages).

"The Mission: To Deliver Large-Tow Carbon Fiber in Filament Winding Applications." (21 pages).

User Manual for Cadwind NG for Windows, 1999. (4 pages).

Marchel, Oliver, "Space Qualification Program for CFRP-Prepregs Used for Design of Deployable Booms as a Main Structural Part of a Solar Sail." (12 pages).

* cited by examiner

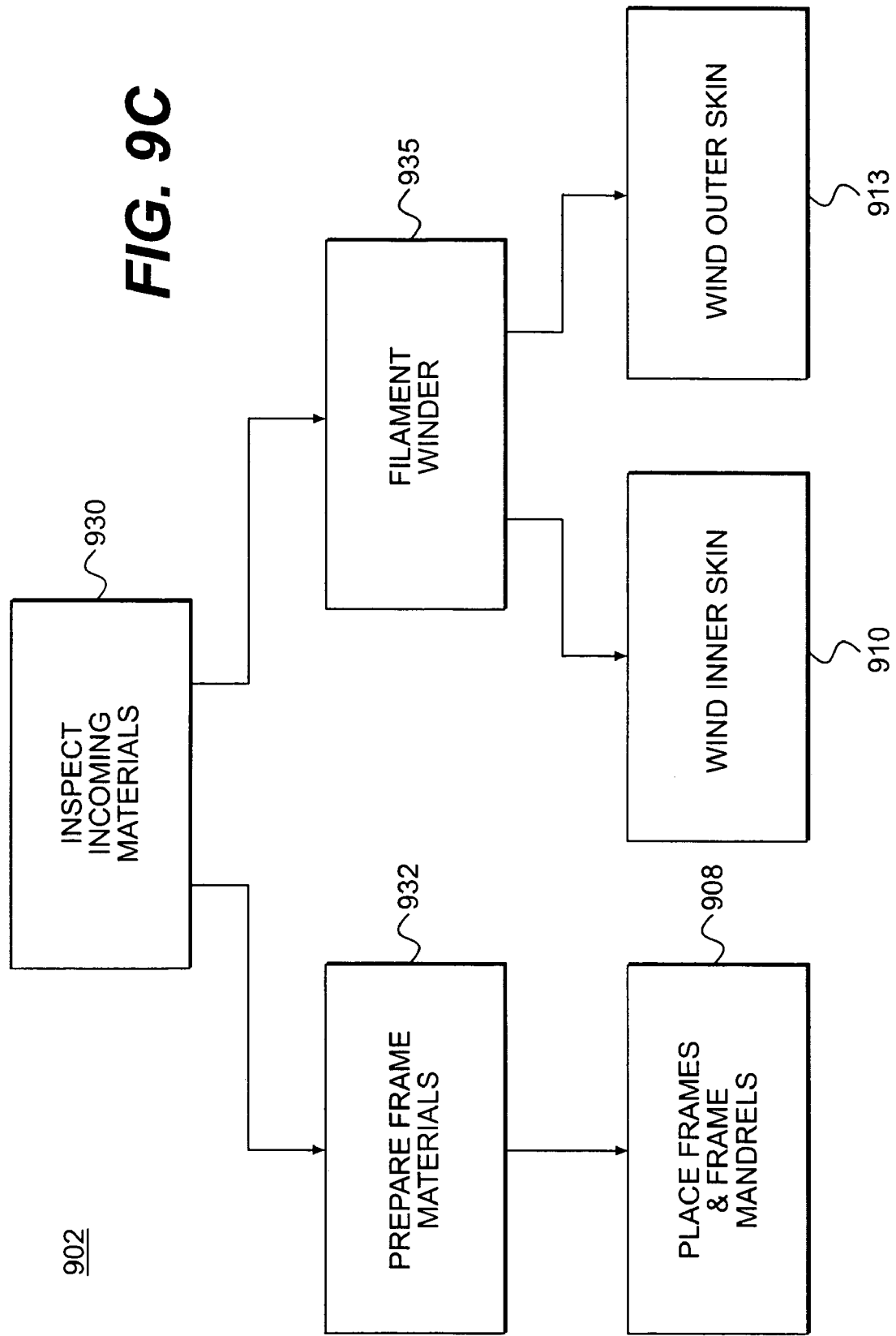

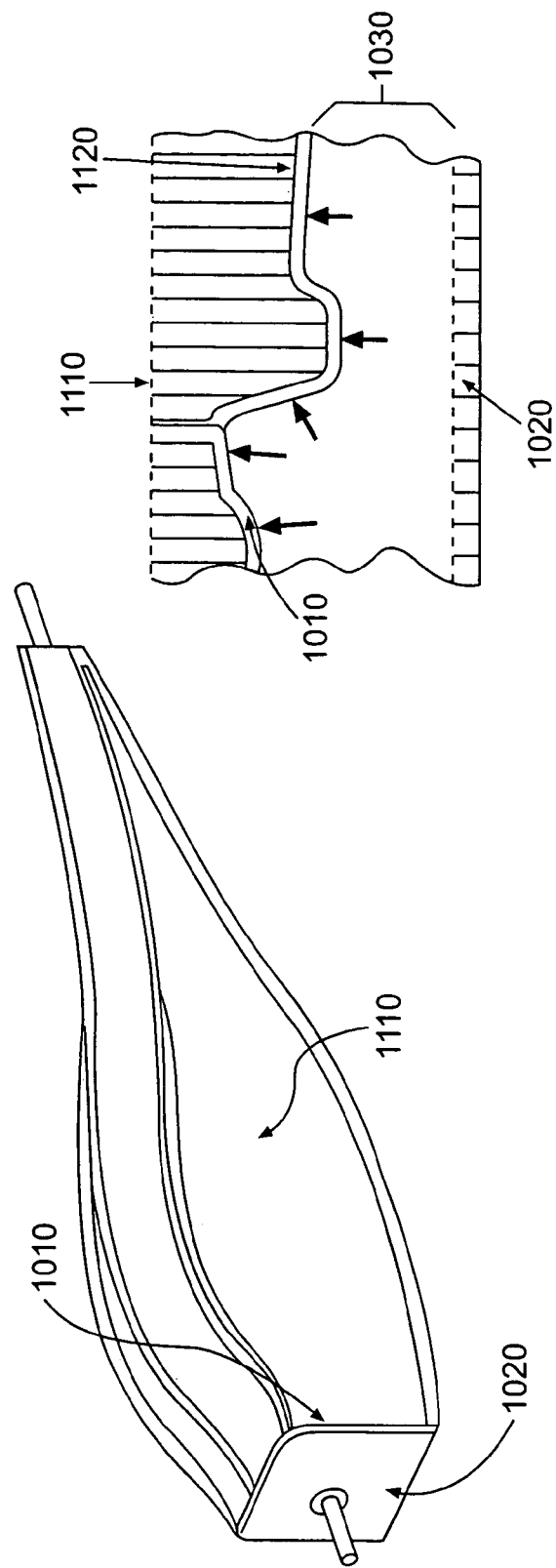

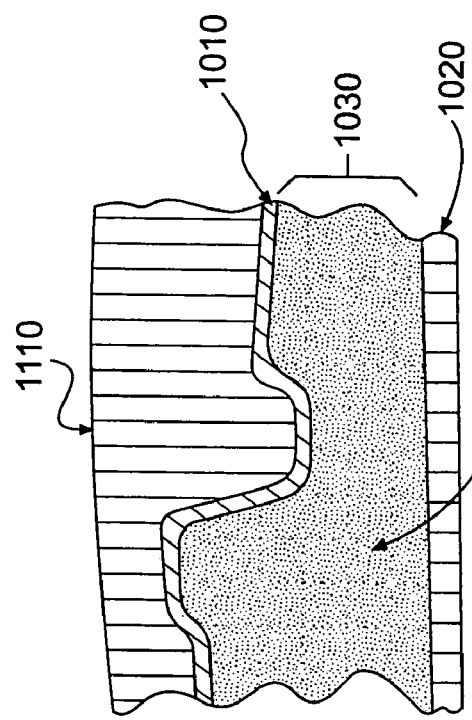
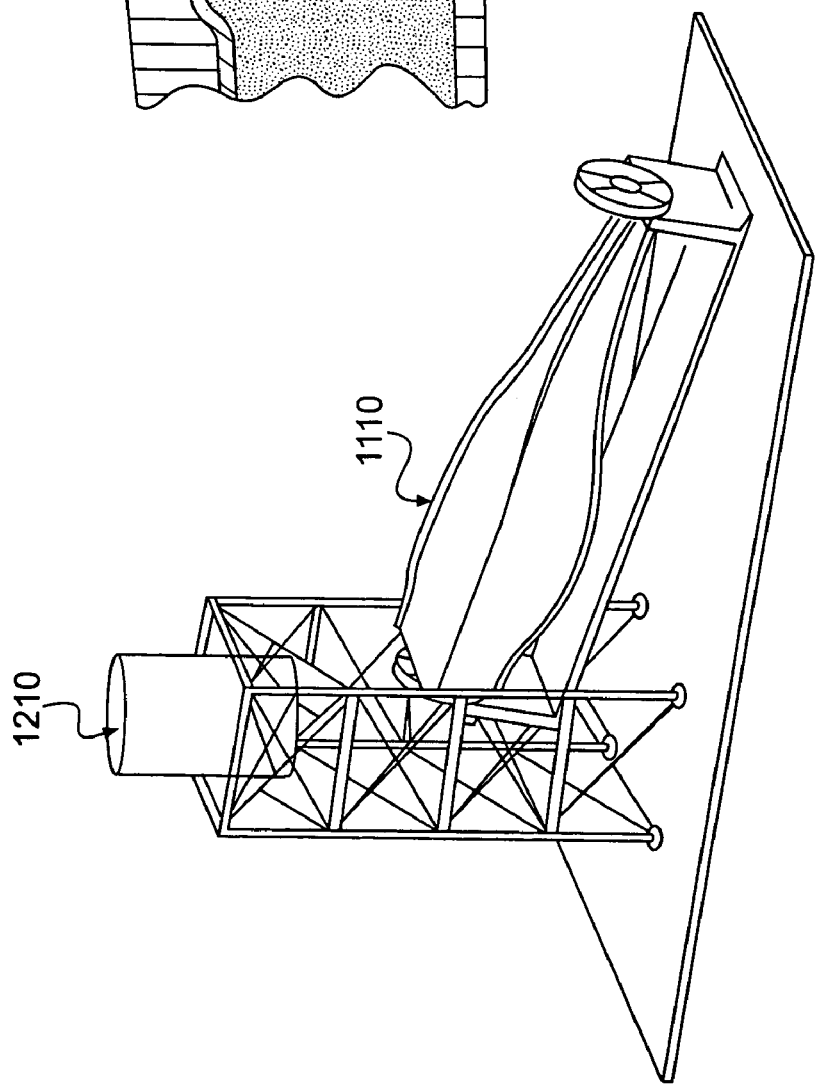

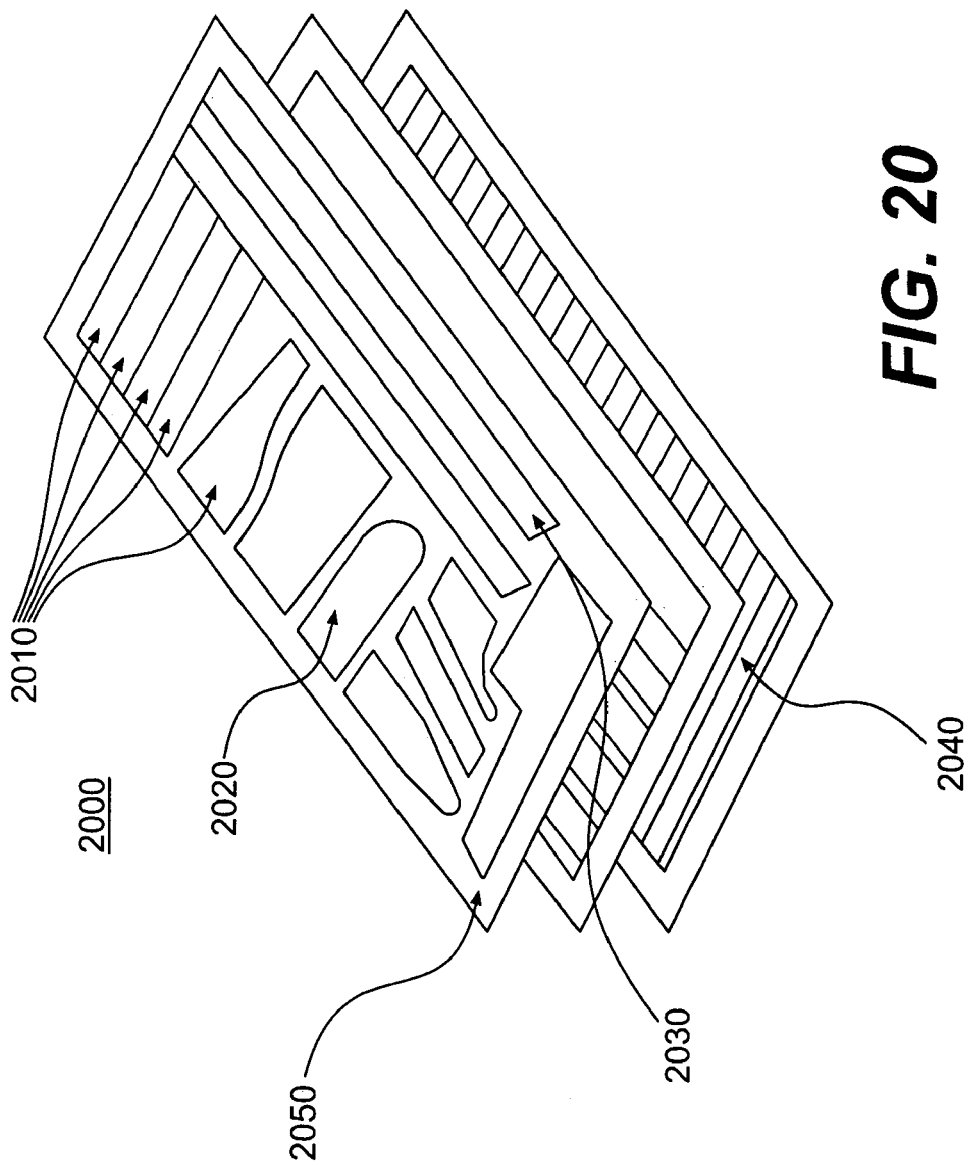

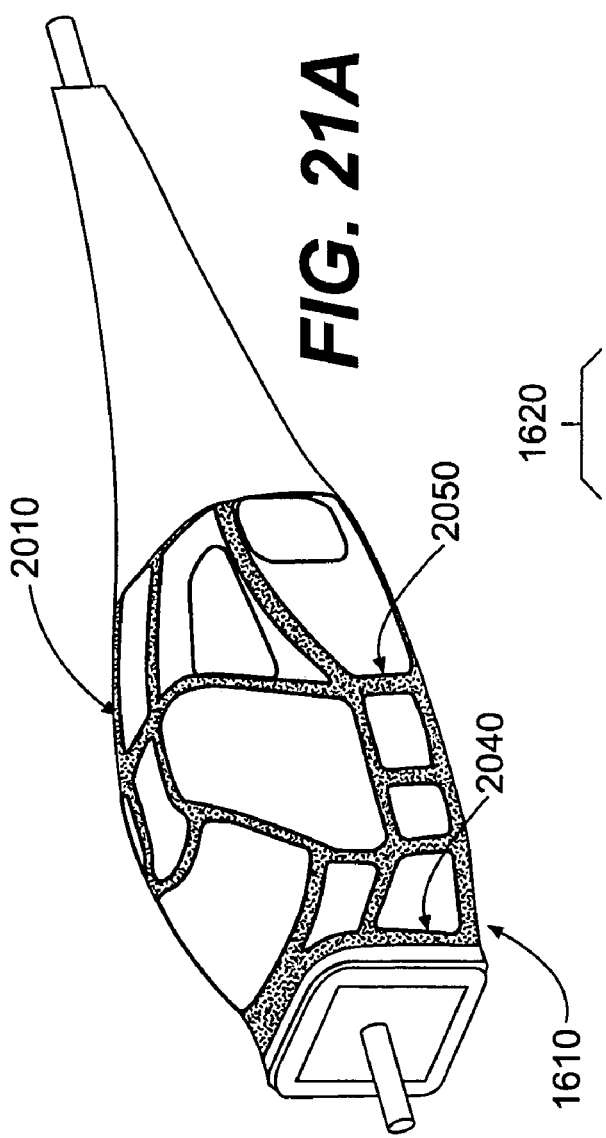
FIG. 21A
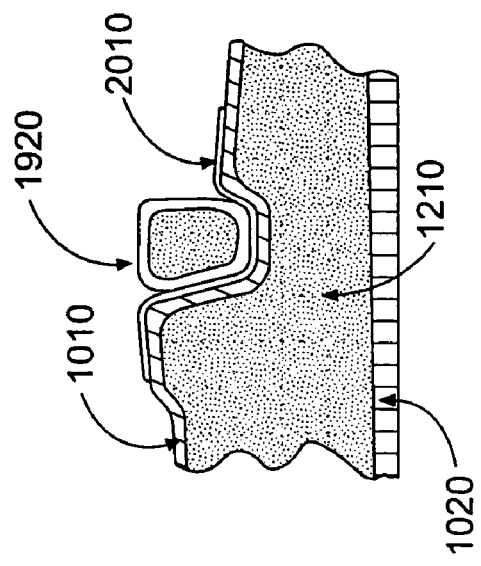
FIG. 21B
FIG. 21C

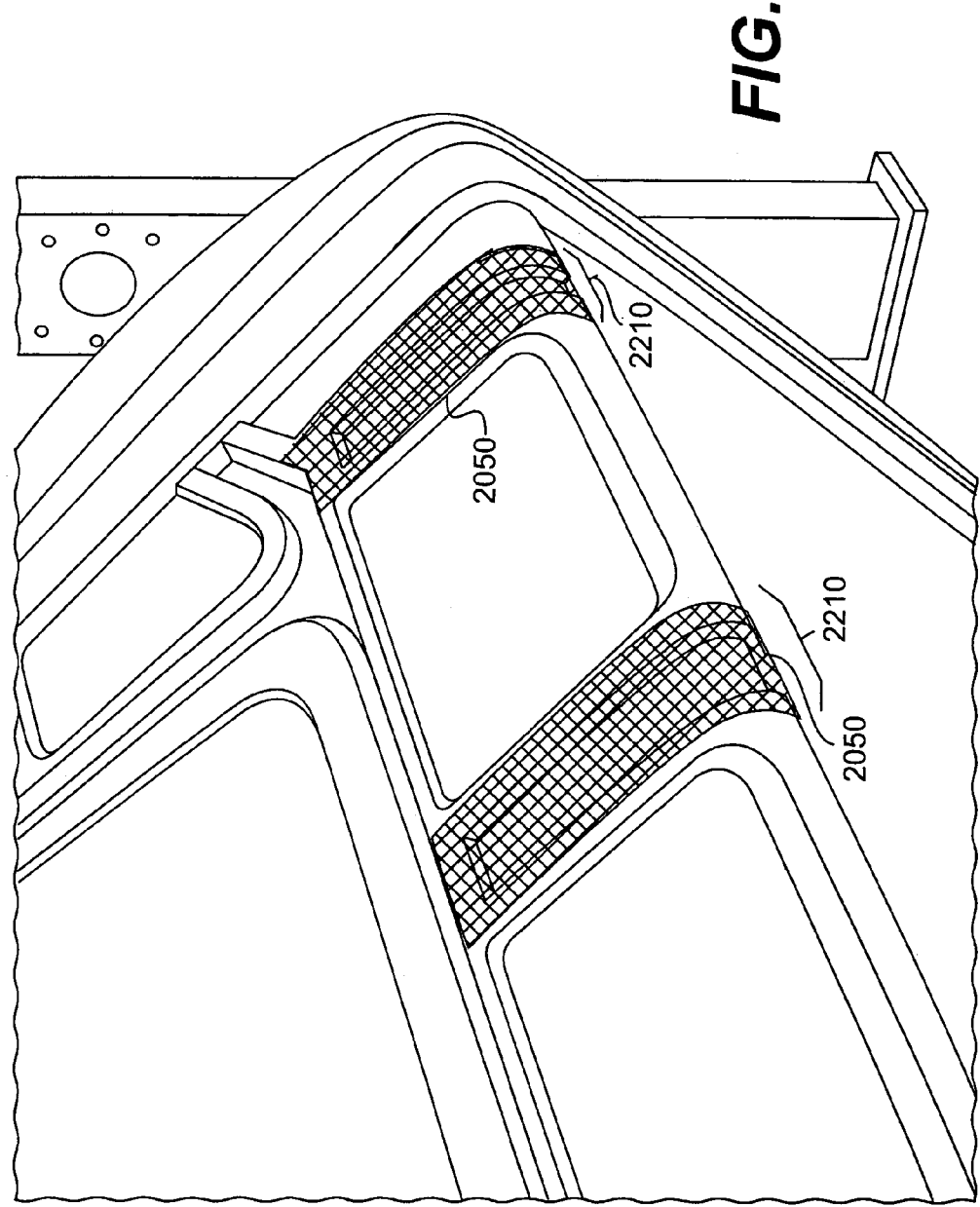

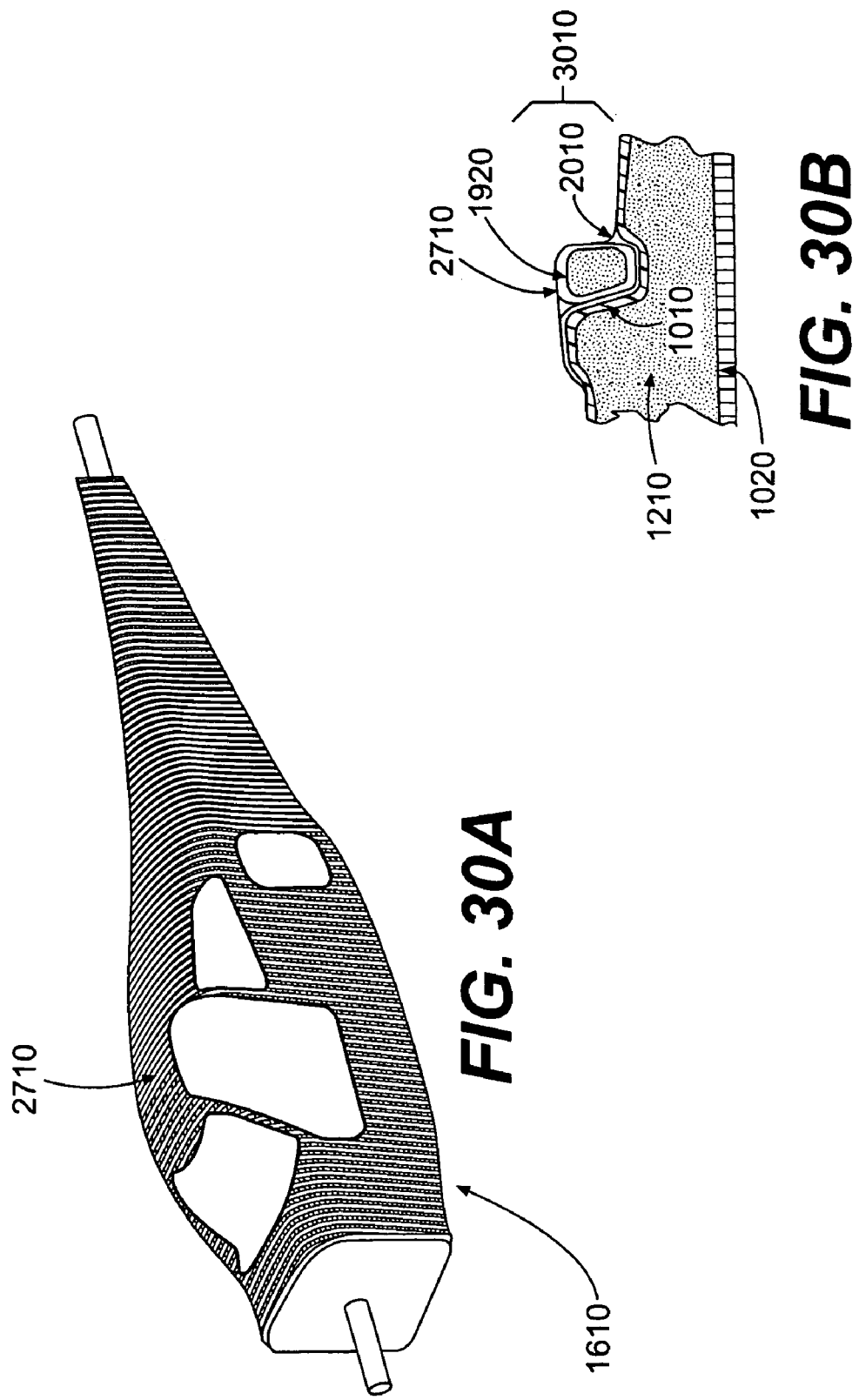

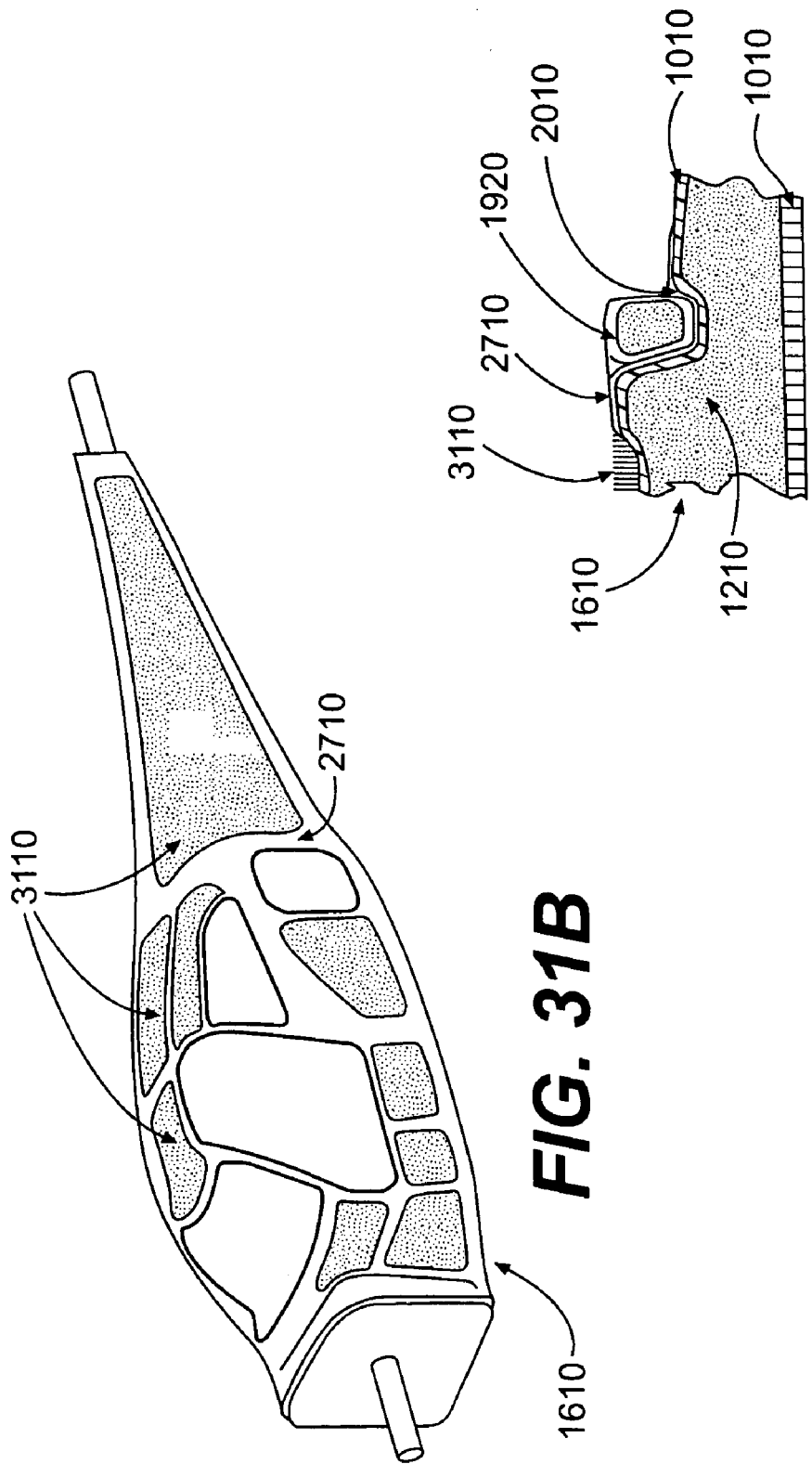

ONE-PIECE CLOSED-SHAPE STRUCTURE AND METHOD OF FORMING SAME

I. CROSS-REFERENCE TO RELATED APPLICATION

This is a divisional application of application Ser. No. 09/987,612, filed Nov. 15, 2001 by Alan H. Anderson, Kathlene K. Bowman, and Paul D. Teufel and titled ONE-PIECE CLOSED-SHAPE STRUCTURE AND METHOD OF FORMING SAME, now U.S. Pat. No. 6,823,578, which claims the benefit of U.S. Provisional Application No. 60/248,190, filed Nov. 15, 2000 by Alan H. Anderson, Kathlene K. Bowman, and Paul D. Teufel and titled ONE-PIECE CLOSED-SHAPE STRUCTURE AND METHOD OF FORMING SAME, for which benefit of priority is claimed herein, and both of which are expressly incorporated herein by reference.

II. BACKGROUND OF THE INVENTION

A. Field of the Invention

The present invention relates to a one-piece closed-shape structure and a method for manufacturing a one-piece closed-shape structure. In particular, the present invention relates to a one-piece fuselage and a method for manufacturing a one-piece fuselage.

B. Background of the Invention

Since the 1940's and 1950's, aircraft have been manufactured from lightweight metals, primarily aluminum. More recently, composite materials (such as fiber reinforced plastics) have been used to manufacture some aircraft. The manufacture of such aircraft include the manufacture of the fuselage (the central body of the aircraft), the wings, and the various other components of the aircraft.

In the manufacture of an aircraft fuselage with metals or composites, the typical manufacturing process involves the combination of several pieces that are individually manufactured and then bonded together to form the fuselage. These multiple steps have many disadvantages, including both high costs and significant time.

The creation of a single-piece fuselage would provide many advantages over fuselages manufactured from the combination of multiple parts. These advantages potentially include lower cost, lighter weight, improved integration, safety, improved performance, noise reduction, improved aerodynamics, and styling flexibility.

As for lower cost, a one-piece fuselage is less costly to fabricate, because there is only one part to manufacture, and there are no fasteners. Thus, the one-piece design saves money in both the fabrication stage and in combination stage. In addition, the work areas needed at a manufacturing facility are less for a one-piece design, because multiple parts require dramatically more workspace areas.

As for lighter weight, because there are fewer parts to a one-piece fuselage, and because there are fewer fasteners, a one-piece fuselage is lighter than a fuselage created from multiple parts. The lighter the aircraft, the more carrying capacity that the aircraft will have, which is a substantial benefit.

As for improved integration, a one-piece fuselage is easier to integrate with the other components of the aircraft, such as the tail cone, the wings, and the other parts of the aircraft. Additionally, the interior of a one-piece fuselage would also be easier to integrate, because there is only one form that must be properly fitted. Moreover, problems with integration of multiple parts (such as dimension variation and other fabrication problems) would be completely eliminated in a one-piece design.

As for safety, a one-piece fuselage offers structural advantages over a fuselage fabricated from multiple parts. In the initial fabrication of the one-piece fuselage, the structure may be designed with safety improvements (such as strengthened areas, etc.). Additionally, because the one-piece fuselage does not have most of the fasteners necessary for combining the multiple parts, the one-piece design is more structurally sound, which provides increased passenger safety. Also, a one-piece fuselage is more crashworthy. A one-piece fuselage provides the advantages of an integrated structure, which has numerous crashworthiness benefits.

As for improved performance, there are both objective and subjective improvements. For objective improvements, there is of course the improved aerodynamics, which results in greater speed. For subjective improvement, there is the noise reduction, which results in a more comfortable ride. In some way, all of the advantages of the one-piece fuselage play a role in improved performance.

As for noise reduction, because a one-piece fuselage would result in improved aerodynamics, a further benefit would be a diminution of air disruption, which results in noise reduction. Any increase in the smoothness of an aircraft has the benefit of noise reduction. Thus, to the extent that the creation of a one-piece fuselage results in the improvement of aerodynamics, there is a reciprocal decrease in noise.

As for improved aerodynamics, a one-piece fuselage inherently is more aerodynamic than a fuselage created from the combination of multiple parts. This improvement in aerodynamics would result from the absence of seams or joints as well as the absence of rivets or other external fasteners. In modern aircraft, seams and joints between the combined parts increase drag and thus diminish aerodynamics. By omitting the seams and joints in a one-piece fuselage, aerodynamics would be improved. Also, in modern aircraft, the external fasteners for flanges and other structure internal to the fuselage also increase drag and diminish aerodynamics. A one-piece fuselage would omit most fasteners and would thus improve aerodynamics.

As for styling flexibility, the capability to create a one-piece fuselage would provide more opportunities for aircraft design. Because multiple parts are not combined to create the fuselage, unique shapes may be possible, that were previously difficult to achieve. By improving the design and styling of the aircraft with a one-piece fuselage, it would thus be possible to create a more attractive aircraft for the market.

Therefore, it is desirable to provide a one-piece fuselage.

For a one-piece fuselage, either metal or composite materials may be used. Metal has more disadvantages, due to the inability to fabricate all components of the fuselage in a single step. Composite materials are thus more advantageous for the fabrication of a one-piece fuselage, because composite materials may be fabricated simultaneously.

Therefore, it is further desirable to provide a one-piece fuselage manufactured from composite materials.

Methods and structures in accordance with the invention provide for a one-piece structure manufactured from composite materials, including a one-piece fuselage. One embodiment includes manufacturing a one-piece fuselage by filament winding. Other embodiments for manufacturing a one-piece fuselage may also be used.

III. SUMMARY OF THE INVENTION

Methods and structures consistent with the present invention may overcome the shortcomings of conventional systems by providing a one-piece closed shape structure manufactured by composite materials. Additional objects and advantages of the invention will be set forth in part in the description, which follows, and in part will be obvious from the description, or may be learned by practice of the invention. The objects of the invention will be realized and attained by means of the elements and combination particularly pointed out in the appended claims.

In accordance with an embodiment of the present invention, a method of manufacturing a one-piece closed-shape structure using a mandrel comprises: preparing the mandrel, wherein the mandrel comprises a bag and an armature; applying a frame mandrel to the mandrel to form a frame for the structure; filling the mandrel and the frame mandrel with media; applying a curable resign to a fiber; applying the fiber over the mandrel and frame mandrel to form the structure; curing the structure; removing the media from the mandrel and frame mandrel; and extracting the mandrel and frame mandrel from the structure.

In accordance with another embodiment of the present invention, preparing further comprises: placing the armature through the bag and conforming the shape of the bag to a desired shape of the structure. This embodiment may also include sealing the bag; placing the armature and the bag in a form tool; and conforming the shape of the bag to the form tool. Further, this implementation may include filling a space between the armature and the bag with air and creating a vacuum between the form tool and the bag to force the bag to conform to the shape of the form tool.

In accordance with another embodiment of the present invention, applying a frame mandrel further comprises applying the frame ply to an exterior of the bag and applying the frame mandrel over the frame ply.

In accordance with another embodiment of the present invention, filling further comprises compacting the media. In this embodiment, compacting may further comprise vibrating the mandrel and frame mandrel to aid compaction.

In accordance with another embodiment of the present invention, applying the fiber comprises winding the fiber over the mandrel and frame mandrel to form the structure. In this embodiment, winding may further include placing a first winding aid on the bag; winding the fiber over the first winding aid, the frame mandrel, and the mandrel to form an inner skin; cutting the inner skin to remove the first winding aids; placing a second winding aid on the inner skin; winding the fiber over the second winding aid and inner skin to form an outer skin; and cutting the outer skin to remove the second winding aids. This embodiment may also include placing a core piece on the inner skin.

In accordance with another embodiment of the present invention, curing further comprises placing a mold around an exterior of the structure; sealing the mold; placing the mold in a heating device; and applying heat to the mold using the heating device. This embodiment may also include creating a vacuum in the mandrel and creating a vacuum in the frame mandrel.

In accordance with another embodiment of the present invention, curing further comprises placing a mold around an exterior of the structure; sealing the mold; placing the mold in an autoclave; and applying pressure to the mold using the autoclave.

In accordance with an embodiment of the present invention, the structure is a fuselage of an aircraft.

In accordance with an embodiment of the present invention, a system for manufacturing a one-piece closed-shape structure using a mandrel comprises: a preparing component configured to prepare the mandrel, wherein the mandrel comprises a bag and an armature; a first applying component configured to apply a frame mandrel to the mandrel to form a frame for the structure; a first filling component configured to fill the mandrel and the frame mandrel with media; a second applying component configured to apply a curable resign to a fiber; a third applying component configured to apply the fiber over the mandrel and frame mandrel to form the structure; a curing component configured to cure the structure; a removing component configured to remove the media from the mandrel and frame mandrel; and an extracting component configured to extract the mandrel and frame mandrel from the structure.

In accordance with an embodiment of the present invention, a computer-implemented method of manufacturing a one-piece closed-shape structure using a mandrel comprises: preparing the mandrel, wherein the mandrel comprises a bag and an armature; applying a frame mandrel to the mandrel to form a frame for the structure; filling the mandrel and the frame mandrel with media; applying a curable resign to a fiber; applying the fiber over the mandrel and frame mandrel to form the structure; curing the structure; removing the media from the mandrel and frame mandrel; and extracting the mandrel and frame mandrel from the structure.

In accordance with another embodiment of the present invention, a system for manufacturing a one-piece closed-shape structure using a mandrel comprises: a preparing means for preparing the mandrel, wherein the mandrel comprises a bag and an armature; an applying means for applying a frame mandrel to the mandrel to form a frame for the structure; a filling means for filling the mandrel and the frame mandrel with media; a first applying means for applying a curable resign to a fiber; a second applying means for applying the fiber over the mandrel and frame mandrel to form the structure; a curing means for curing the structure; a removing means for removing the media from the mandrel and frame mandrel; and an extracting means for extracting the mandrel and frame mandrel from the structure.

In accordance with another embodiment of the present invention, a one-piece closed shape structure comprises: an outer shell formed of a composite material; and a frame formed on an interior portion of the outer shell, the outer shell and frame being co-cured to form the one-piece closed shape structure. In this embodiment, the outer shell may comprise an inner and outer skin. Further, in this embodiment, a core material may be located between the inner and outer skin.

In accordance with another embodiment of the present invention, a one-piece closed shape structure comprises: an outer skin formed of a composite material; an inner skin formed of a composite material; a frame located on an interior portion of the inner skin; and a core material located between the inner and outer skin, wherein the outer skin, inner skin, frame, and core material have been co-cured to form the one-piece closed shape structure.

In accordance with another embodiment of the invention, a one-piece airplane fuselage comprises an outer skin formed of a composite material; an inner skin formed of a composite material; a frame located on an interior portion of the inner skin; and a core material located between the inner and outer skin, wherein the outer skin, inner skin, frame, and core material have been co-cured to form the one-piece airplane fuselage. In this embodiment, the airplane fuselage may further comprise at least one integrally formed flange that has been co-cured with the outer skin, inner skin, frame, and core material. In addition, this airplane fuselage may further comprise at least one integrally formed wing attachment pocket that has been co-cured with the outer skin, inner skin, frame, core material, and flange.

Additional aspects of the invention are disclosed and defined by the appended claims. It is to be understood that both the foregoing general description and the following detailed description are exemplary and explanatory and are intended to provide further explanation of the invention as claimed.

IV. BRIEF DESCRIPTION OF THE DRAWINGS

The accompanying drawings, which are incorporated in and constitute a part of this specification, illustrate several embodiments of the invention and, together with the following description, serve to explain the principles of the invention.

In the drawings:

As shown in FIG. 2A, conventional methods used in the industry typically construct a fuselage 200 from two or more pieces;

FIG. 9C is a flow diagram illustrating the material flow for manufacturing a one-piece fuselage in accordance with one embodiment of the present invention, as shown in FIG. 9A;

FIG. 11A is a perspective view of an armature and bag in a form tool in accordance with an embodiment of the present invention, as shown in FIG. 10A;

FIG. 11B is a cut-away view of a portion of an armature and bag in a form tool in accordance with an embodiment of the present invention, as shown in FIG. 11A;

FIG. 12A illustrates introducing media into a mandrel in accordance with an embodiment of the present invention, as shown in FIG. 13;

FIG. 12B is a cut-away view of a portion of a mandrel filled with media in accordance with an embodiment of the present invention, as shown in FIG. 12A;

FIG. 20 illustrates preparing frame materials in accordance with an embodiment of the present invention, as shown in FIG. 9;

FIG. 21A is a perspective view of a mandrel with frame plies and frame mandrels in place in accordance with an embodiment of the present invention, as shown in FIG. 9;

FIG. 21B illustrates frame plies on the mandrel in accordance with an embodiment of the present invention, as shown in FIG. 21A;

FIG. 21C illustrates frame plies and a frame mandrel on the mandrel in accordance with an embodiment of the present invention, as shown in FIG. 21A;

FIG. 22 illustrates wing attachment plies being applied to a mandrel to form wing attachment pockets in accordance with an embodiment of the present invention, as shown in FIGS. 21A-21C;

FIG. 30A is a perspective view of a mandrel with inner skin cut and draped in accordance with an embodiment of the present invention, as shown in FIG. 27A;

FIG. 30B is a cut-away view of a mandrel with inner skin that has been cut and draped in accordance with an embodiment of the invention, as shown in FIG. 30A;

FIG. 31B is a perspective view of a mandrel with core material in accordance with an embodiment of the present invention, as shown in FIG. 9;

FIG. 31C is a cut-away view of a mandrel with core details in accordance with an embodiment of the present invention, as shown in FIG. 31A;

V. DESCRIPTION OF THE EMBODIMENTS

A. Introduction

Methods and structures in accordance with the present invention will now be described with respect to an embodiment of a one-piece structure, an aircraft fuselage. The attached figures illustrate the manufacture of both a fuselage containing a tail cone and a fuselage without a tail cone. The invention as claimed, however, is broader than fuselages and extends to other closed-shape structures, such as, other aircraft, automotive, forklift, or watercraft structures.

B. Methods and Structures

Figure 1A:
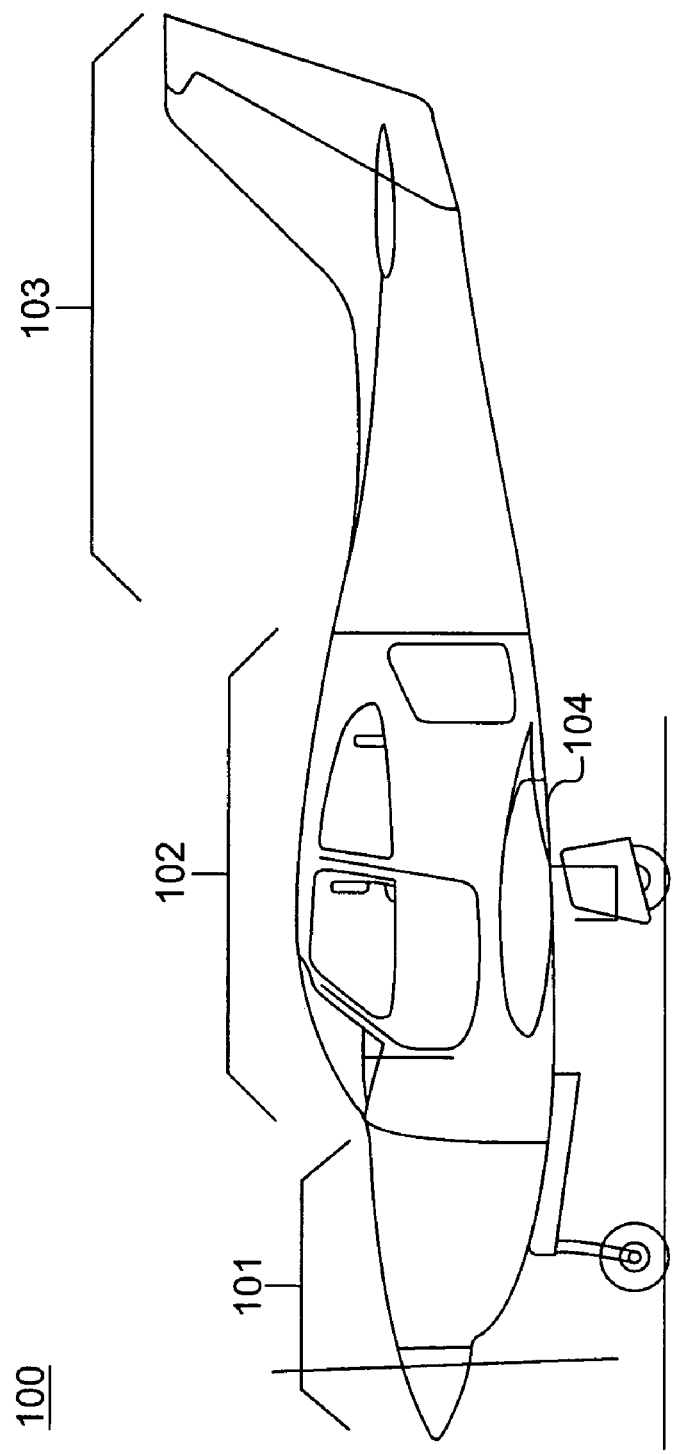
FIG. 1A is a side view of an airplane.

FIG. 1A is a side view of an airplane. As shown in FIG. 1A, airplane 100 consists of engine section 101, fuselage 102, empennage 103, and wings 104. Engine section 101, empennage 103, and wings 104 connect to fuselage 102. Airplane 100 may be any type of airplane, such as, prop, jet, or other type. Airplane 100 is the type of airplane for which a one-piece fuselage could be constructed (which is described in more detail below). In one implementation, the one-piece fuselage includes fuselage 102. In other implementations, the one-piece fuselage may also include engine section 101, empennage 103, wings 104, and/or any other parts of aircraft 100 (not shown). This implementation is merely exemplary, and other implementations may also be used.

Figure 1B:
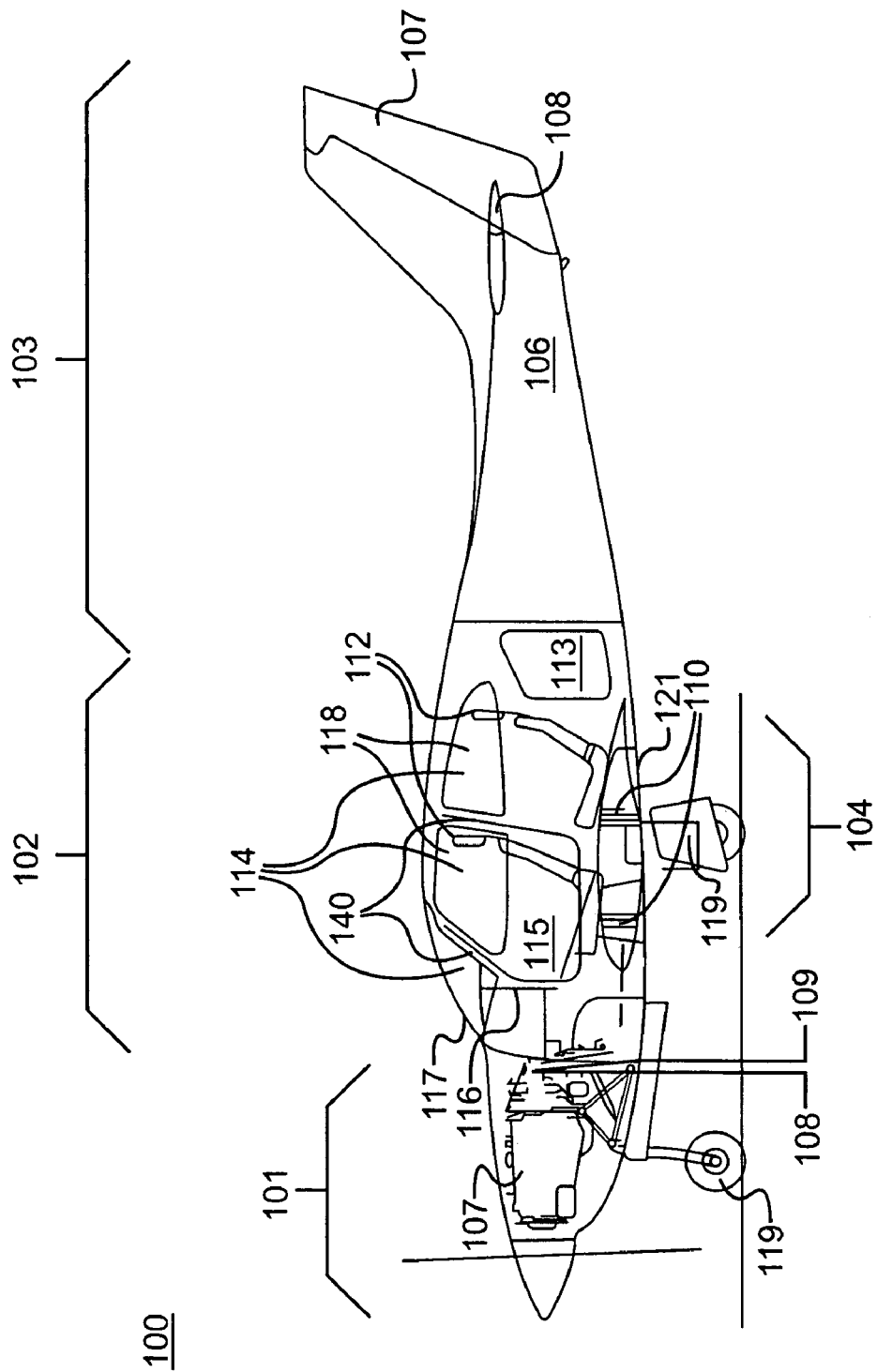
FIG. 1B is a partially cut away side view of an airplane identifying certain features of the airplane, as shown in FIG. 1A.

FIG. 1B is a partially cut away side view of an airplane identifying certain features of the airplane, as shown in FIG. 1A. In FIG. 1B, airplane 100 is described in more detail than in FIG. 1A. As shown in FIG. 1B, engine section 101 contains an engine 107, an engine mount 108, and a firewall 109. Engine section 101, engine mount 108, and firewall 109 are all connected to fuselage 102. In some implementations, engine 107 is connected to fuselage 102 via engine mount 108. However, other implementations may have engine 107 connected directly to fuselage 102. Further, engine mount 108 may be a separate component, as shown in FIG. 1B, or engine mount 108 may be a part of either engine section 101 or fuselage 102. These implementations are merely exemplary, and other implementations may also be used.

Empennage 103 contains tail cone 106, vertical stabilizers 107, and horizontal stabilizers 108. Empennage 103 may be a separate component of airplane 100, as shown in FIG. 1B, or tail cone 106 may be a part of fuselage 102 with vertical stabilizer 107 and horizontal stabilizer 108 being separate pieces. These implementations are merely exemplary, and other implementations may also be used.

Wings 104 generally include left wing 121 (shown) and right wing 122 (not shown). Wings 104 are connected to fuselage 102 by wing spars 110. Wing spars 110 support wings 101 within fuselage 102. Other wing configurations may be used for airplane 100, such as a bi-wing configuration or a tri-wing configuration or other wing configurations. In addition, a canard (not shown) and winglets (not shown) may also be used with airplane 100. Also, airplane 100 depicts a low wing aircraft, but airplane 100 may also be a high-wing, mid-wing, or other wing-design aircraft.

Fuselage 102 contains panel section 116, seat supports (not shown), seats 112, access doors 115, luggage access doors 113, and windows 114. Panel section 116 holds flight instruments for airplane 100. Seat supports hold seats 112. Access door 115 is depicted as a single door on the left side of airplane 100, as shown in FIG. 1B. Access door 115 may also be located on the right side of airplane 100. Further, additional or other doors may be included within a group of access doors 115, such as a second set of access doors or any other access door configurations. Luggage access door 113 is depicted as located on the back left side of airplane 100, as shown in FIG. 1B, but luggage access door 113 may be located anywhere on airplane 100. In addition, airplane 100 may contain multiple luggage access doors 113. Fuselage 102 also contains wing spar attachment boxes (not shown).

Windows 114 include front window 117 and side windows 118. FIG. 1B depicts two side windows 118, but other configurations may be used for side windows 118 such as one side window 118 or two or more side windows 118. Windows 114 may also include a rear window (not shown). Windows 114 may also include other windows, such as skylight windows (not shown), camera windows (not shown), or any other type of window.

shown in FIG. 1B, fuselage 102 has numerous openings, such as access doors 115, windows 114, and luggage access doors 113. Also, there are other openings that are not shown such as an engine mount block (not shown) for engine mount 108, an empennage mounting block (not shown) for empennage 106, and landing gears mounts (not shown) for landing gear 119.

Because of these openings, portions of fuselage 102 may be strengthened for support around these openings. For example, window frames 140 may be strengthened to support windows 114. Other areas may also be strengthened, such as seat supports 130 (not shown, but described above). Other strengthening may also be necessary for the engine mount block (not shown), the landing gear mounts (not shown), the empennage mounting block (not shown), and roll-over frames (not shown). Still other areas may also need to be strengthened, depending on the design of airplane 100. These implementations are merely exemplary, and other implementations may also be used.

Figure 2A:
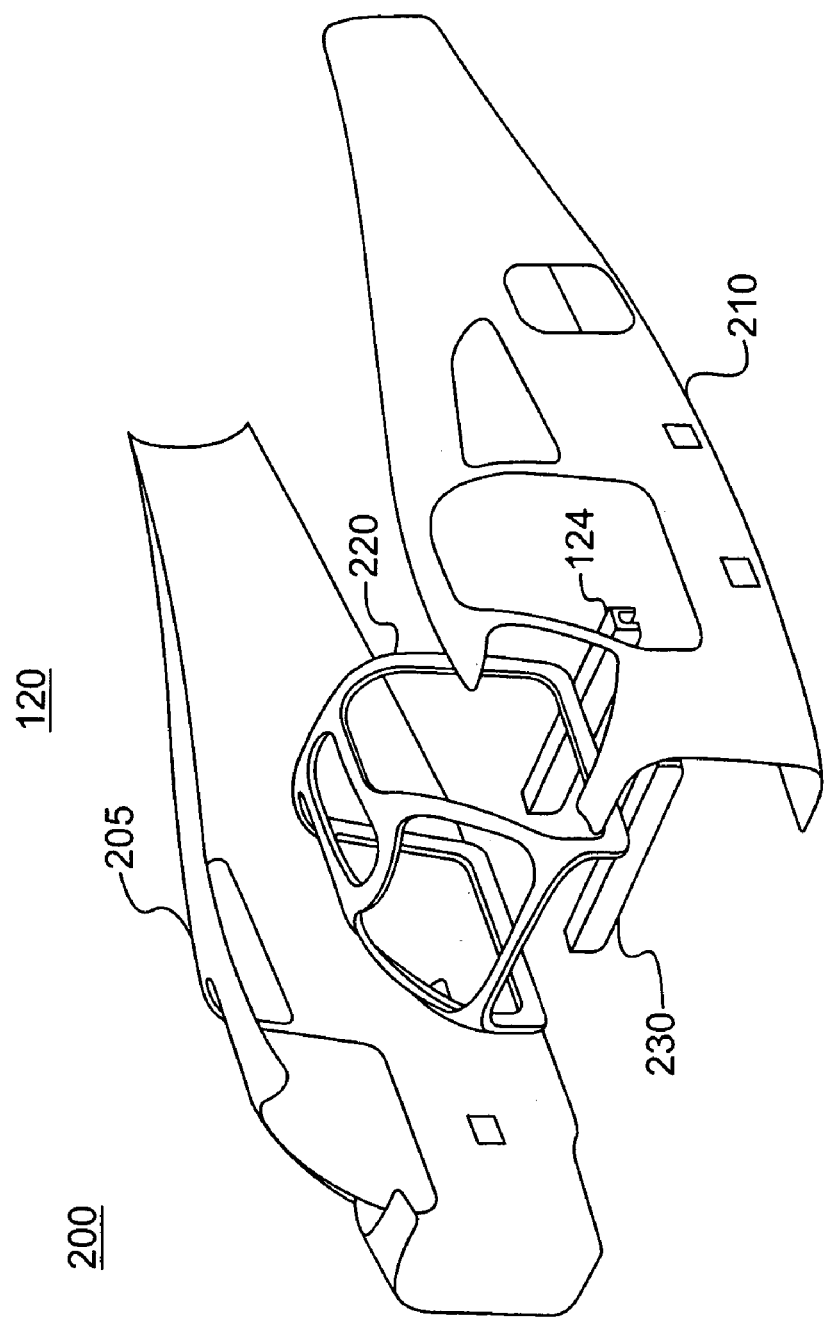
FIG. 2A illustrates a conventional multi-piece composite fuselage.

FIG. 2A illustrates a conventional multi-piece composite fuselage. As shown in FIG. 2A, conventional methods used in the industry typically construct a fuselage 200 from two or more pieces. Those pieces consist of fuselage halves 205 and 210, frame stiffening structures for the passenger area 220, and wing spar attachment boxes 230. In composite aircraft manufacture, these pieces are typically manufactured from fiberglass prepreg. These conventional methods also require the steps of bonding the pieces together, machining of the pieces at the joint areas, machining the core frames, and various other mechanical assembly processes.

Figure 2B:
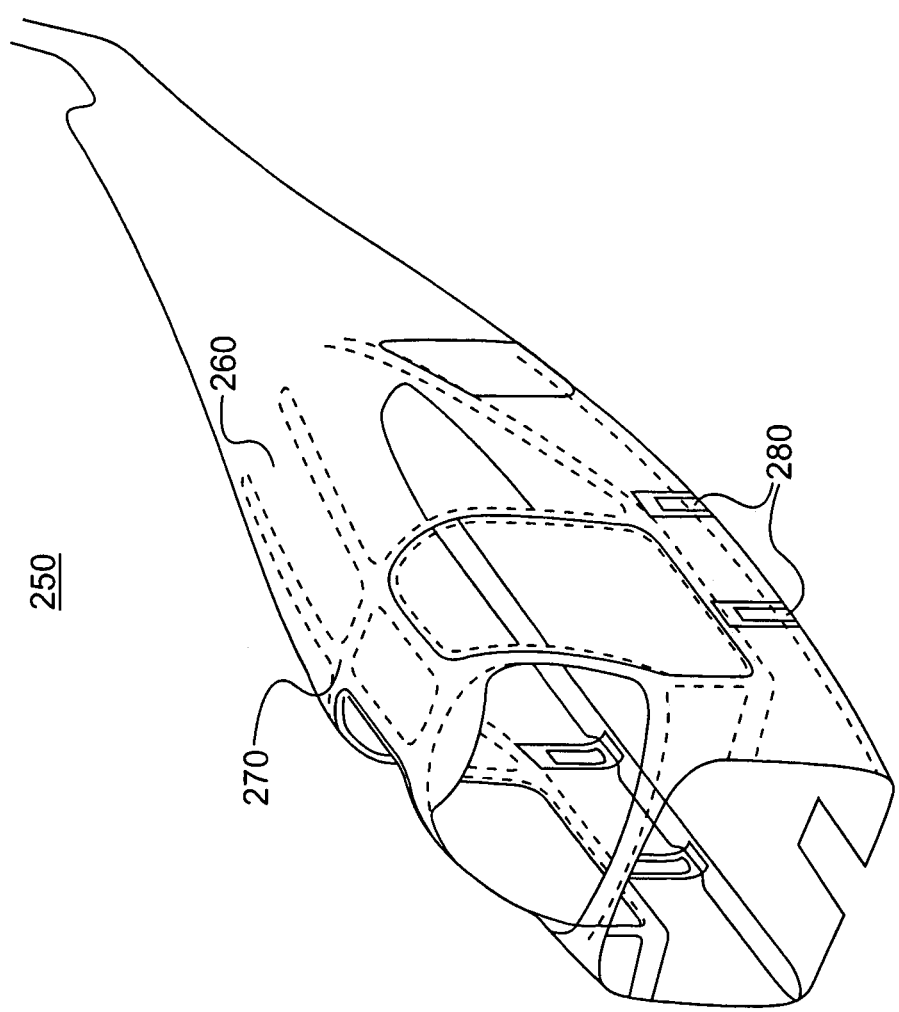
FIG. 2B illustrates a one-piece fuselage in accordance with an embodiment of the present invention.

FIG. 2B illustrates a one-piece fuselage in accordance with an embodiment of the present invention. As shown in FIG. 2B, a fuselage 250 is a one-piece structure, including exterior surface of the fuselage 260, frame sections 270, attachment pockets for the wings 280, and other frames sections, attachments pockets, and flanges (not shown). Notably, the use of a one-piece fuselage eliminates the assembly operations that are associated with the conventional methods for manufacturing a fuselage as well as providing other advantages, as described above. This implementation is merely exemplary, and other implementations may also be used.

Figure 3:
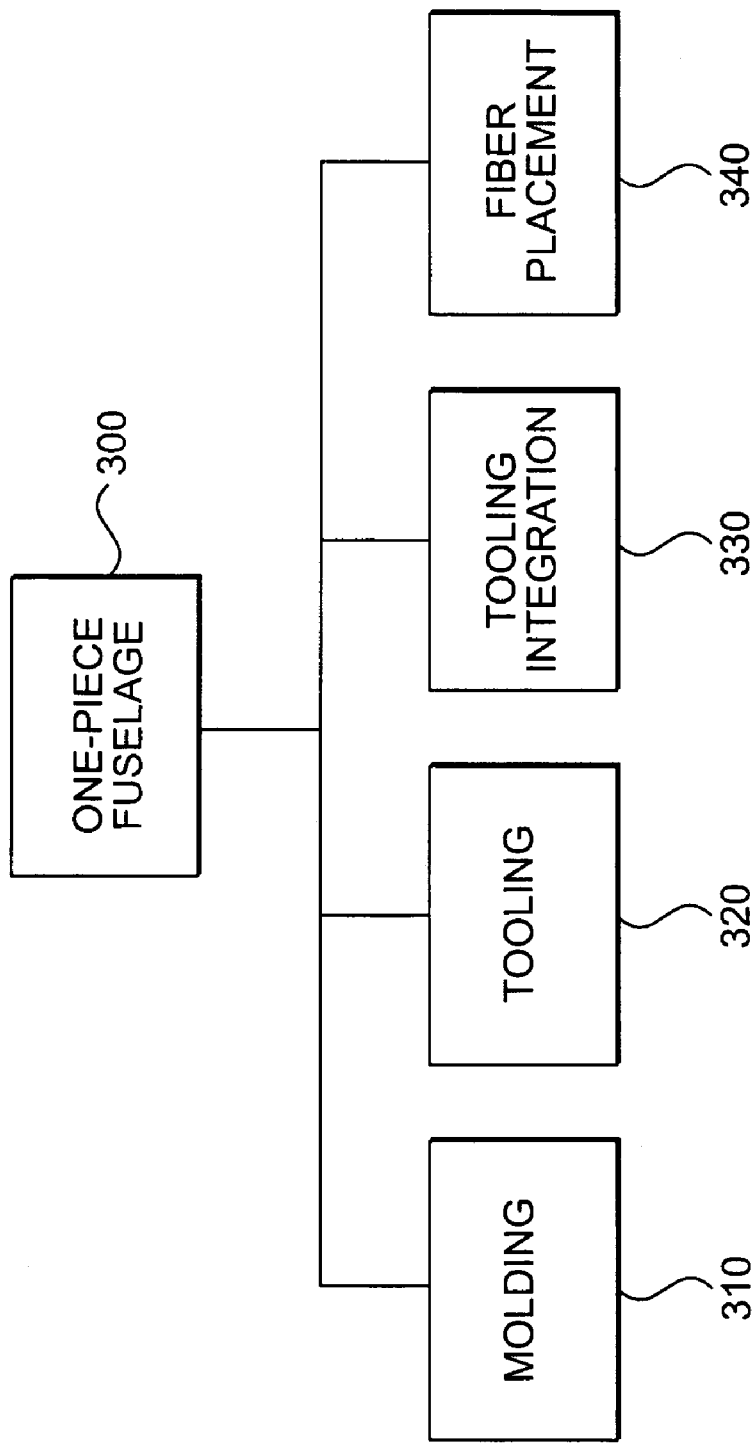
FIG. 3 is a block diagram illustrating component processes for manufacturing a one-piece fuselage in accordance with an embodiment of the present invention.

FIG. 3 is a block diagram illustrating component processes for manufacturing a one-piece fuselage in accordance with an embodiment of the present invention. As shown in FIG. 3, the component processes for manufacturing a one-piece fuselage 300 include molding 310, tooling 320, tooling integration 330, and fiber placement 340. Molding 310 includes the use of any type of molding. For example, molding 310 may include such things as hand lay up of fiberglass or graphite prepreg into molds, pressing of sheet molding compounds, injection of molding compounds into dies, and/or machine lamination of composite prepreg onto molds.

Tooling 320 includes the use of any type of tooling needed for molding. For example, tooling 320 may include the use of metal molds, molds made from composite materials, and/or mandrels made from metals and composite materials. Tooling 320 also includes tooling made from elastomeric materials such as silicone, urethane, or natural rubbers. Tooling 320 further includes the use of plastic or metal dies and punches.

Tooling integration 330 includes any combination of molding 310 with tooling 320. For example, tooling integration 330 includes vacuum sealing of a part cavity, pressurization of tool cavities, and/or application of vacuum pressure in tool cavities.

Fiber placement 340 includes any placement using any form of fiber. For example, fiber placement 340 includes such things as winding with carbon tape, winding with carbon tow, winding with glass fiber or roving, winding with glass tape, wrapping of glass or carbon prepreg materials, and/or wrapping of carbon and glass fiber materials. As shown in FIG. 3, molding 310, tooling 320, tooling integration 330, and fiber placement 340 may be used to create one-piece fuselage 300. This implementation is merely exemplary, and other implementations may also be used.

Figure 4:
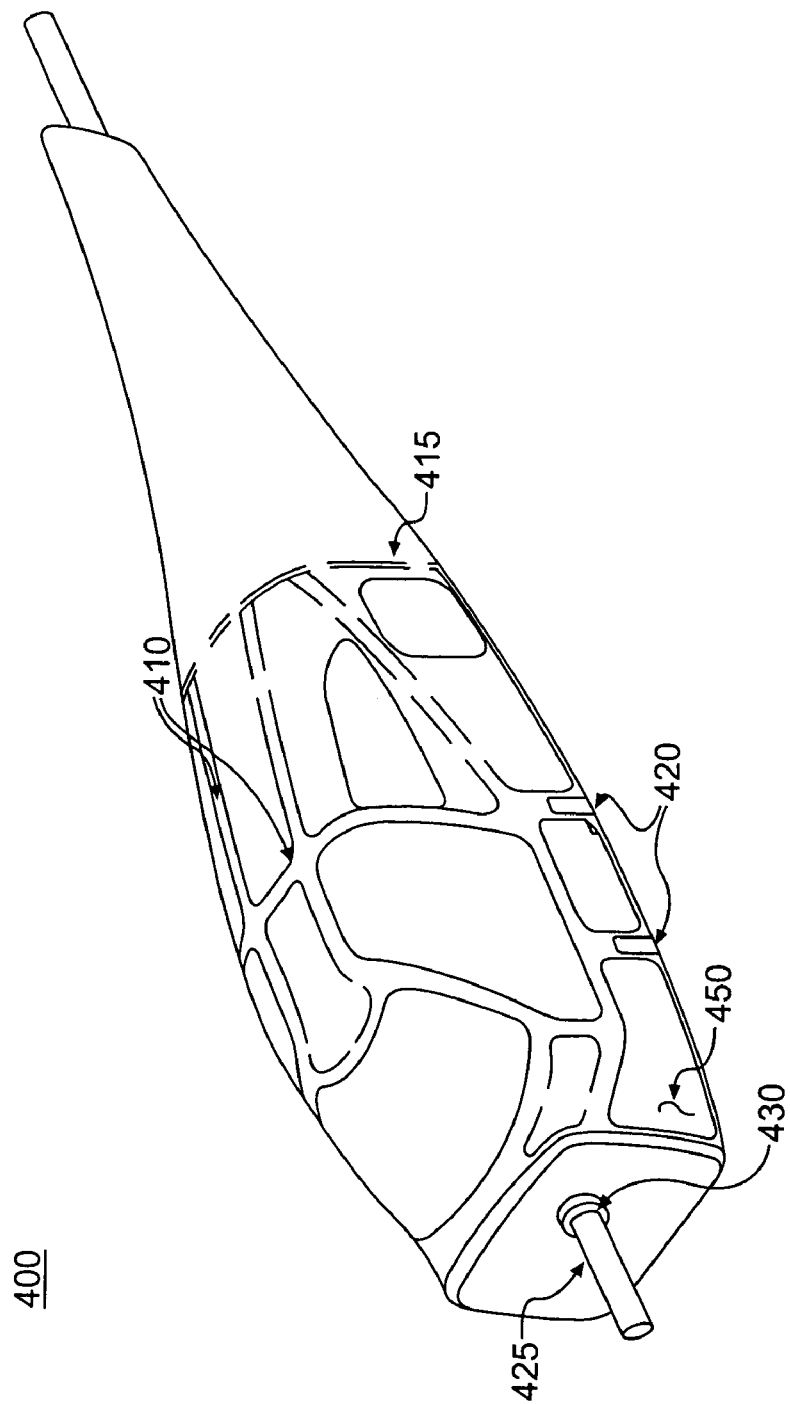
FIG. 4 is a perspective view of a one-piece fuselage structure using the component processes, as shown in FIG. 3.

FIG. 4 is a perspective view of a one-piece fuselage structure using the component processes, as shown in FIG. 3. As shown in FIG. 4, a one-piece fuselage 400 may be created using the processes described in FIG. 3. For example, molding 310 is used to create such things as molded frames 410, molded integral flanges 415 (for attachment of the bulkhead), and molded integral wing attachment hard points 420 (for attachment of the wings). Tooling 320 is used to create such things as armature 425 and mandrel 430 (placed inside the fuselage). Tooling integration 330 is used to integrate tooling 320 with molding 310 to prepare for fiber placement 340 of fuselage 400. Fiber placement creates fuselage skin 450. FIG. 4 depicts just some examples of the uses of the components of FIG. 3 in a one-piece fuselage, and many other uses may be made of these components Oust some of which are described herein with reference to FIG. 4).

Figure 5:
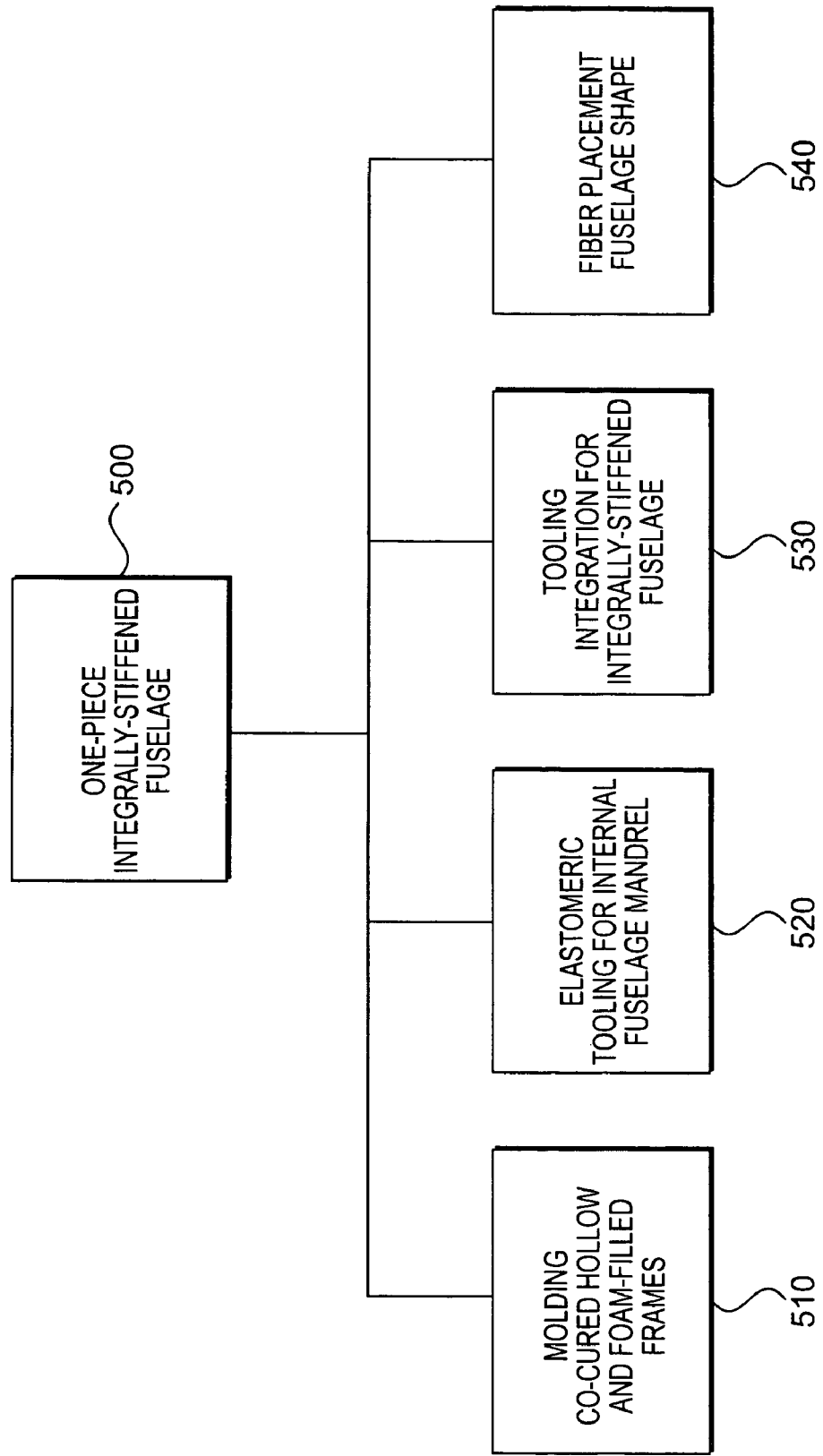
FIG. 5 is a block diagram illustrating the component processes for manufacturing a one-piece integrally-stiffened fuselage in accordance with an embodiment of the present invention.

FIG. 5 is a block diagram illustrating the component processes for manufacturing a one-piece integrally-stiffened fuselage in accordance with an embodiment of the present invention. As shown in FIG. 5, a one-piece integrally-stiffened fuselage 500 includes molding co-cured hollow and foam-filled frames 510, elastomeric tooling for internal fuselage mandrel 520, tooling integration for integrally-stiffened fuselage 530, and fiber placement fuselage shape 540.

For fuselage 500, molding co-cured hollow and foam filled frames 510 includes the molding of stiffening structure inside of the fuselage shell that is co-cured with that shell. Such molded structure may also include flanges that are integral with the shell. Other molded structures may further include wing attachment pockets and pockets for engine truss mount fittings.

Elastomeric tooling for internal fuselage mandrel 520 includes the use of an elastomeric tooling associated with molding the internal shape of the fuselage. In this context, elastomeric tooling refers to a mandrel that is used to maintain the internal shape of the fuselage during frame lay up and filament winding.

Tooling integration for integrally-stiffened fuselage 530 involves the joining of molding 510 and elastomeric tooling 520 in a manner that produces the fuselage shape. Tooling integration 530 includes such things as application of a vacuum and/or pressure in various mold cavities to obtain the desired fuselage shape.

Finally, fiber placement fuselage shape 540 is used to create the fuselage skin material and shape. During fiber placement 540, fiber is wound directly on the elastomeric mandrel to create the fuselage skin. Fiber placement 540 also includes the creation of skin material by winding fiber over a secondary mandrel and then cutting ply pieces to obtain frame and integral stiffening structures.

Co-curing of fuselage components creates integral stiffening for one-piece integrally stiffened fuselage 500. The co-curing of these components reduces the chances of defects created during manufacturing of separate elements and their subsequent joining using bonding or mechanical fasteners. The co-cured integral stiffening distributes loads more uniformly throughout the fuselage during flight and in the event of an off field landing.

Figure 6:
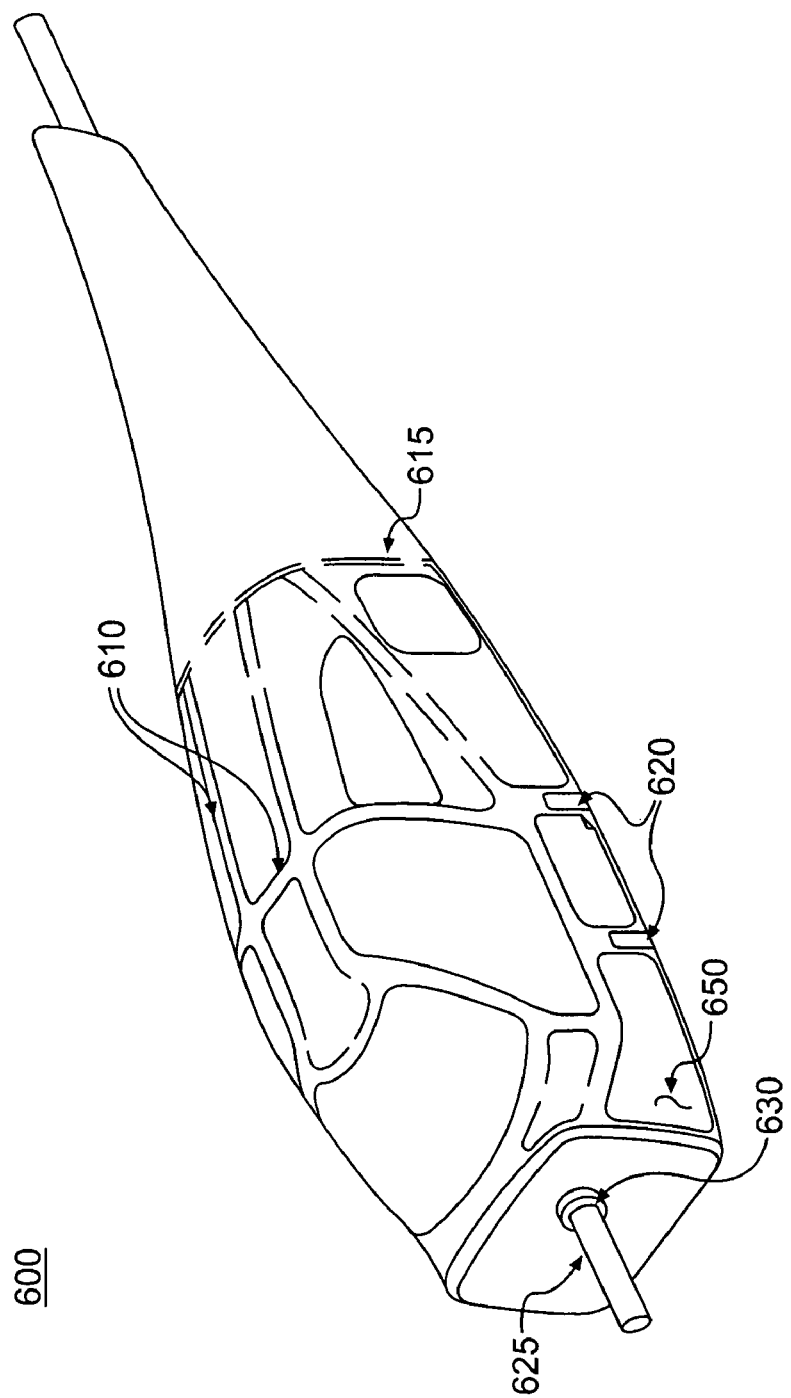
FIG. 6 is a perspective view of a one-piece integrally-stiffened fuselage using the components, as shown in FIG. 5.

FIG. 6 is a perspective view of a one-piece integrally-stiffened fuselage using the components, as shown in FIG. 5. As shown in FIG. 6, a one-piece fuselage 600 may be created using the components described in FIG. 5. For example molding 510 may be used to create co-cured hollow and foam filled frames 610, integral flanges 615 (such as for bulkhead attachment), and integral wing attachment hard points 620.

Tooling 520 may be used to create armature 625 and a reusable elastomeric mandrel 630 both of which go inside of fuselage 600. Tooling 520 may also include filament-wound broad goods. In general, broad goods are custom-sized pieces of composite materials, and filament-wound broad goods are custom-sized pieces of composite materials that have been filament-wound. For example, a filament-wound broad good would become a co-cured hollow frame ply. These filament-wound broad goods may be used for integral frames 610, flanges 615, longerons 610, and doublers 620.

Tooling integration 530 may be used to integrate such things as tooling for fuselage 600 and tooling for the filament winding of fuselage skins (such as fuselage skin 650) with molding 510.

Fiber placement 540 may be used to create fuselage skin plies 650. FIG. 6 depicts just some examples of the uses of the components of FIG. 5 in a one-piece integrally-stiffened fuselage, and many other uses may be made of these components (just some of which are described with reference to FIG. 6).

Figure 7:
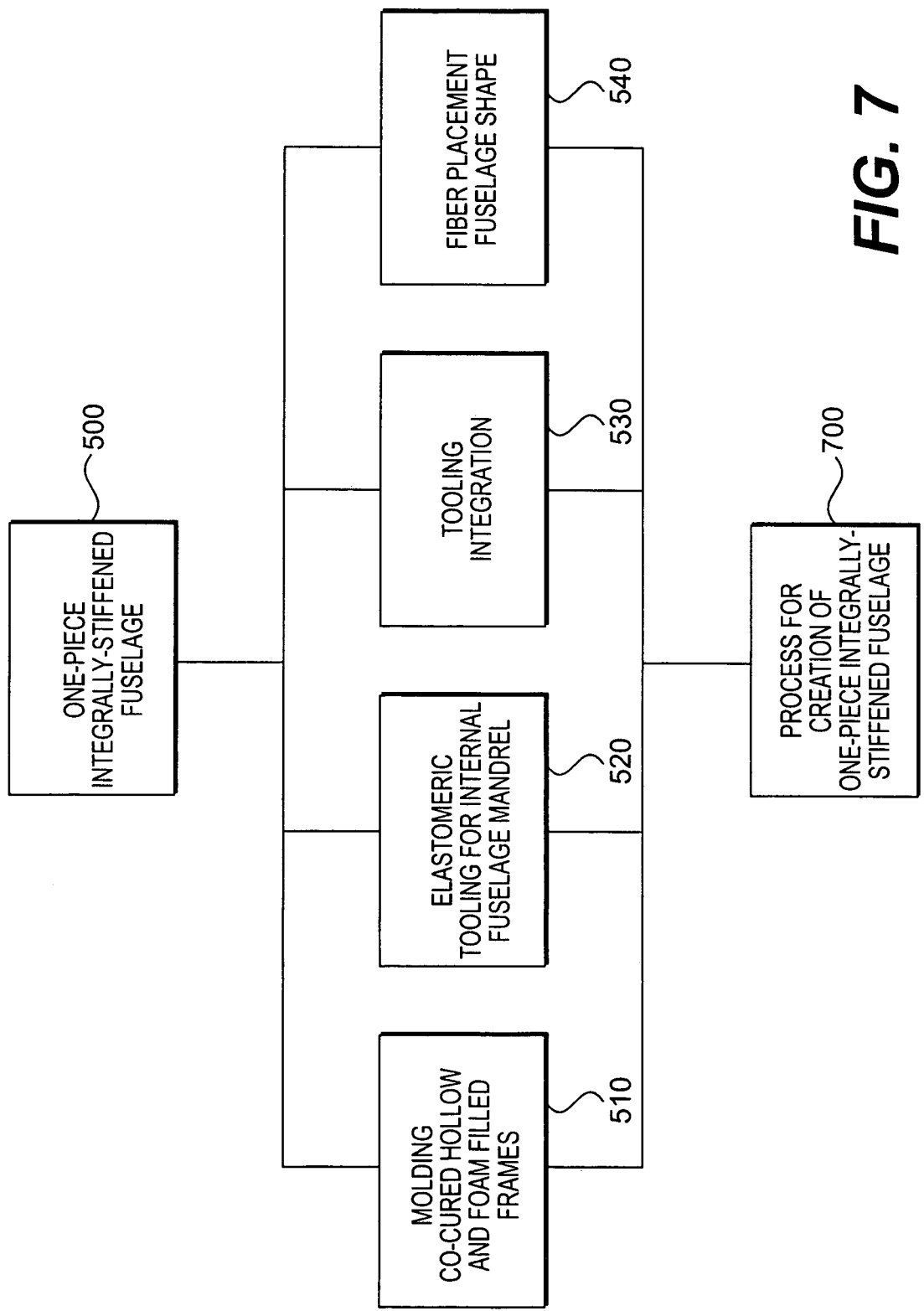
FIG. 7 is a block diagram illustrating the components for manufacturing a one-piece integrally stiffened fuselage by a process in accordance with an embodiment of the invention.

FIG. 7 is a block diagram illustrating the components for manufacturing a one-piece integrally stiffened fuselage by a process in accordance with an embodiment of the invention. As shown in FIG. 7, process for creation of one-piece integrally-stiffened fuselage 700 includes molding co-cured hollow and foam filled frames 510, elastomeric tooling for internal fuselage mandrel 520, tooling integration 530, and fiber placement fuselage shape 540. As shown in FIG. 7, a process for the combination of molding co-cured hollow and foam filled frames 510, elastomeric tooling for internal fuselage mandrel 520, tooling integration 530, and filament placement fuselage shape 540 may result in one-piece integrally-stiffened fuselage 500. This implementation is merely exemplary, and other implementations may also be used.

Figure 8:
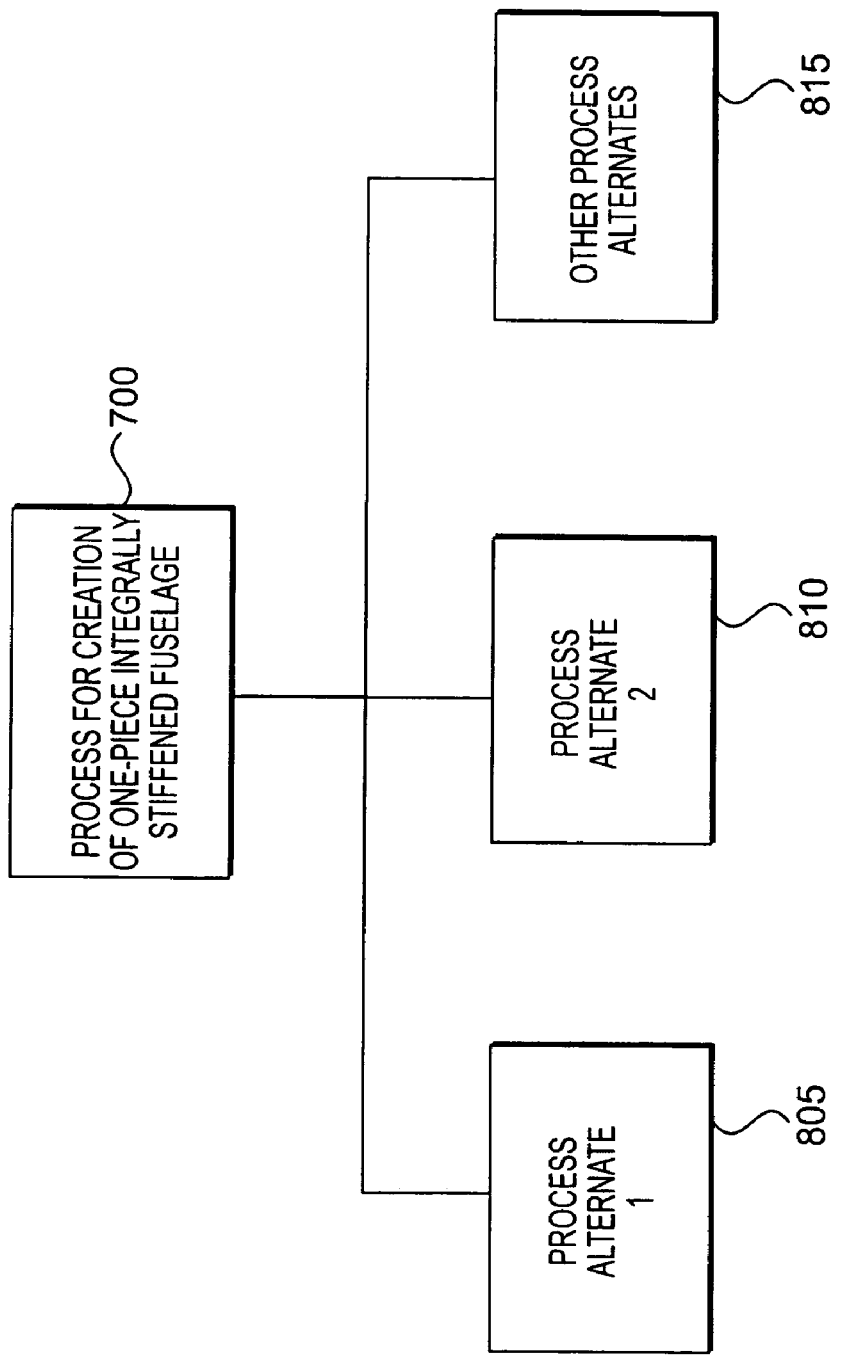
FIG. 8 is a block diagram illustrating alternative embodiments for the process of manufacturing a one-piece integrally stiffened fuselage in accordance with the present invention.

FIG. 8 is a block diagram illustrating alternative embodiments for the process of manufacturing a one-piece integrally stiffened fuselage in accordance with the present invention. As shown in FIG. 8, process for creation of one-piece integrally-stiffened fuselage (as described in FIG. 7) includes Process Alternate #1 805, Process Alternate #2 810, and Other Process Alternates 815. Other Process Alternates 815 shows that various alternative processes may be used for creating one-piece integrally-stiffened fuselage 700. Process Alternate #1 805 is depicted in FIGS. 9-48. Process Alternate #2 810 is depicted in FIGS. 49-53. Although not depicted in separate figures, Other Process Alternates 815 show that processes other than those described herein may be used for the process for creation of one-piece integrally-stiffened fuselage 800.

1. Alternate 1

Figure 9A:
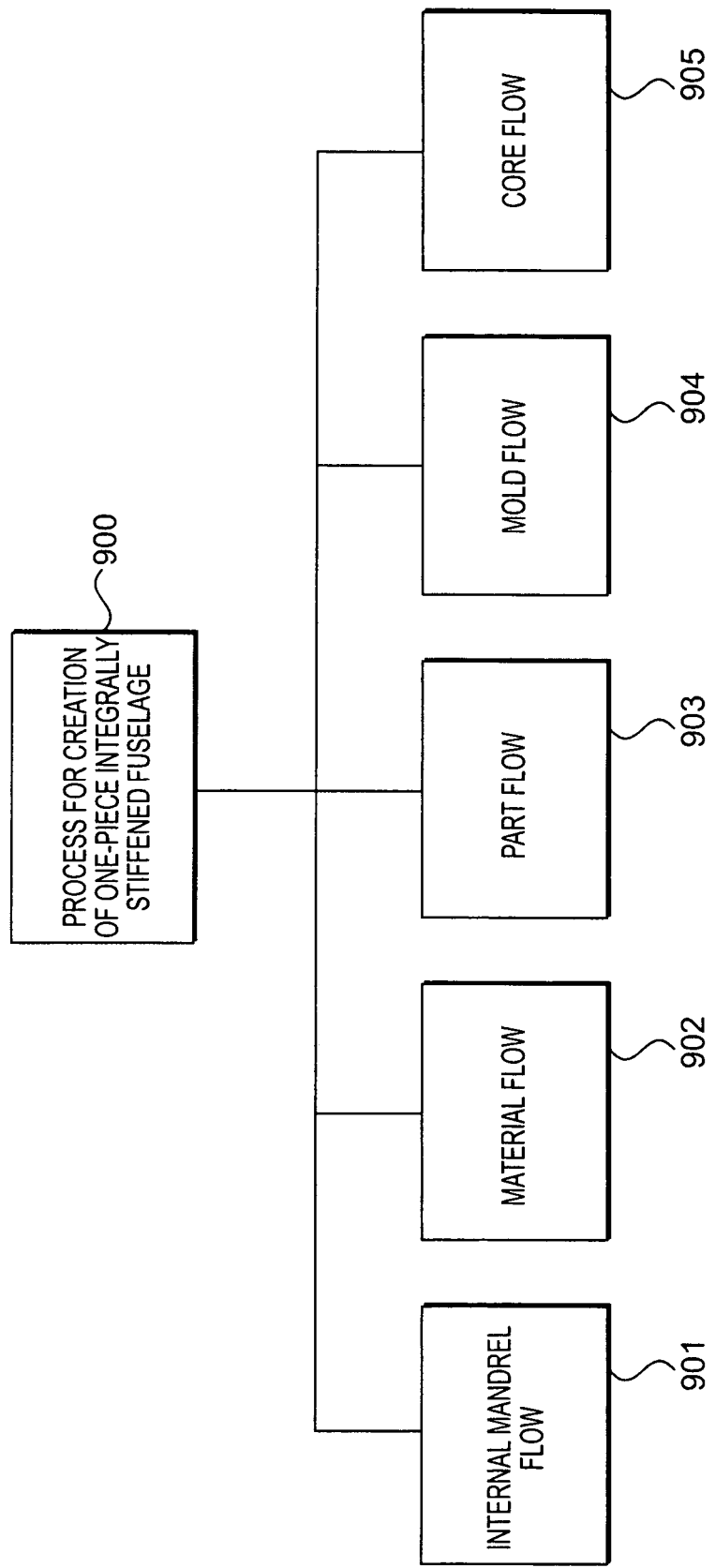
FIG. 9A is a block diagram illustrating the processes of manufacturing a one-piece fuselage in accordance with one embodiment of the present invention, as shown in FIG. 8.
Figure 9B:
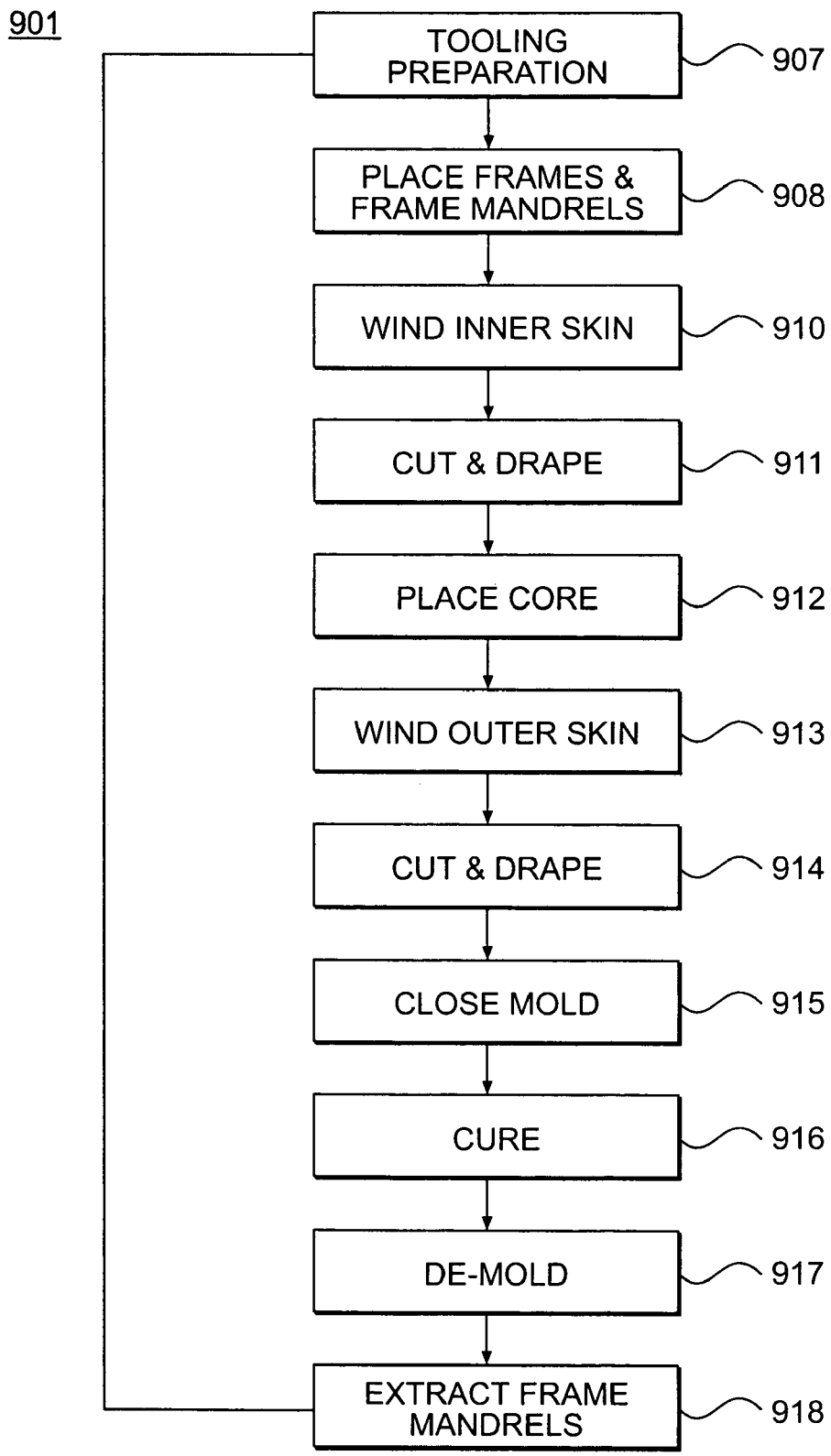
FIG. 9B is a flow diagram illustrating the internal mandrel flow for manufacturing a one-piece fuselage in accordance with one embodiment of the present invention, as shown in FIG. 9A.
Figure 9D:
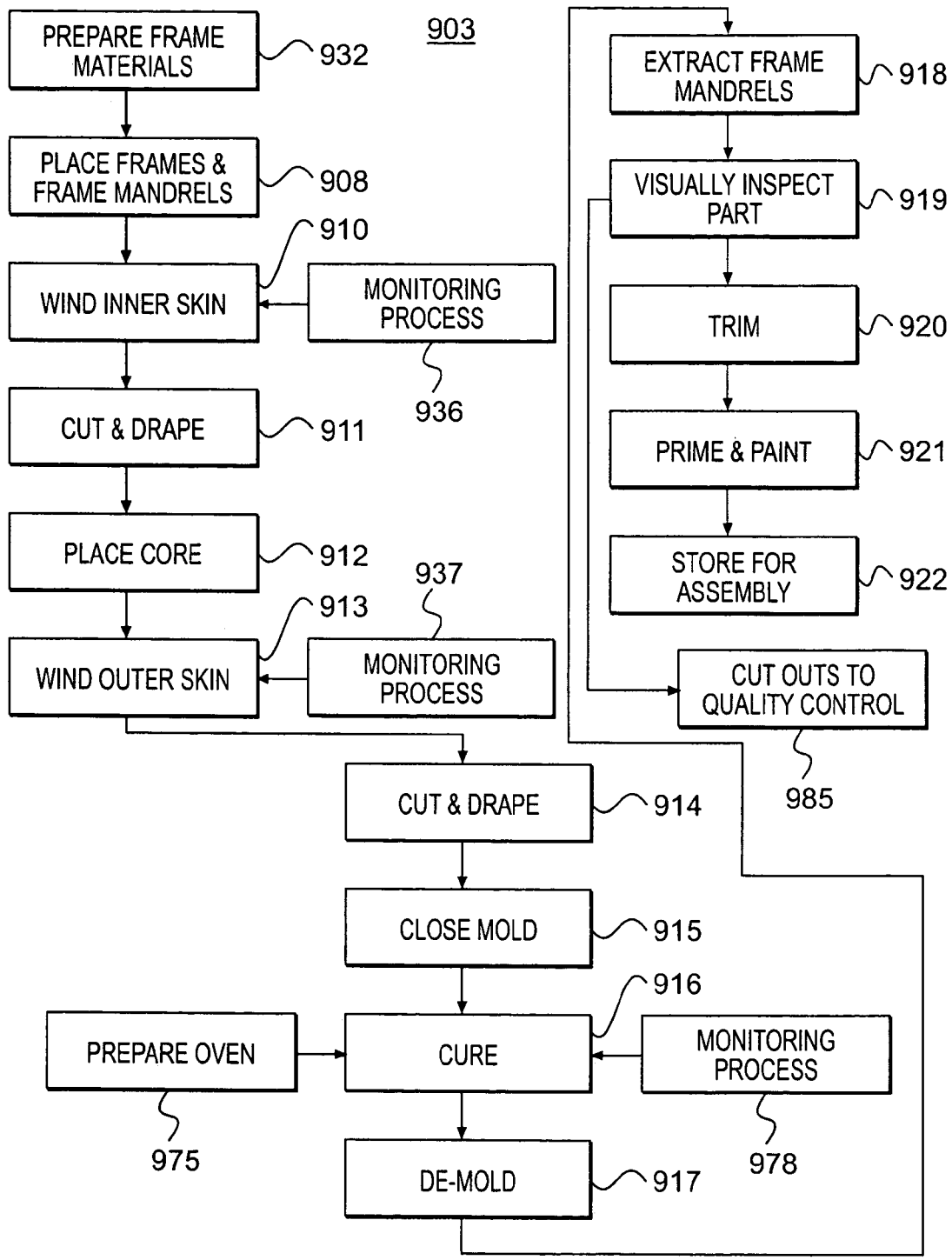
FIG. 9D is a flow diagram illustrating the part flow for manufacturing a one-piece fuselage in accordance with one embodiment of the present invention, as shown in FIG. 9A.
Figure 9E:
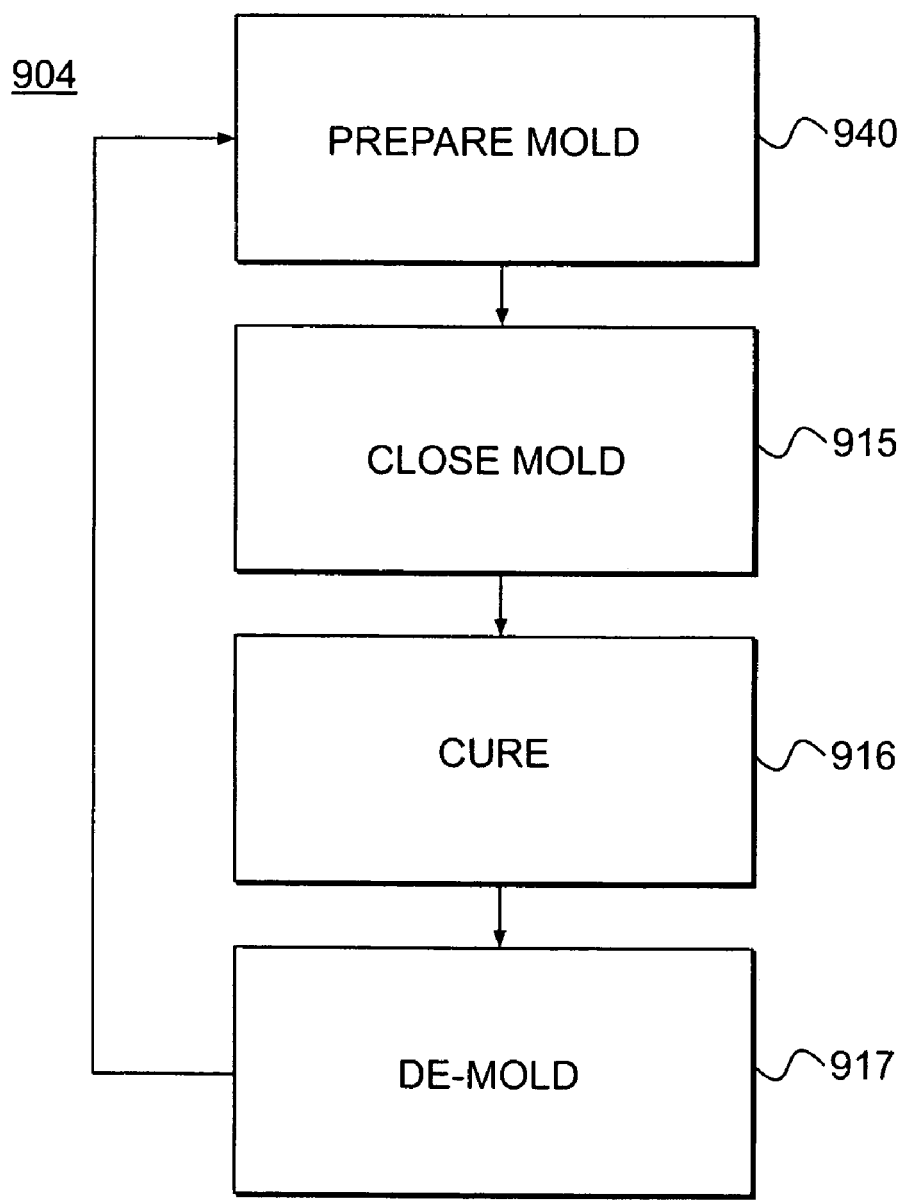
FIG. 9E is a flow diagram illustrating the mold flow for manufacturing a one-piece fuselage in accordance with one embodiment of the present invention, as shown in FIG. 9A.
Figure 9F:
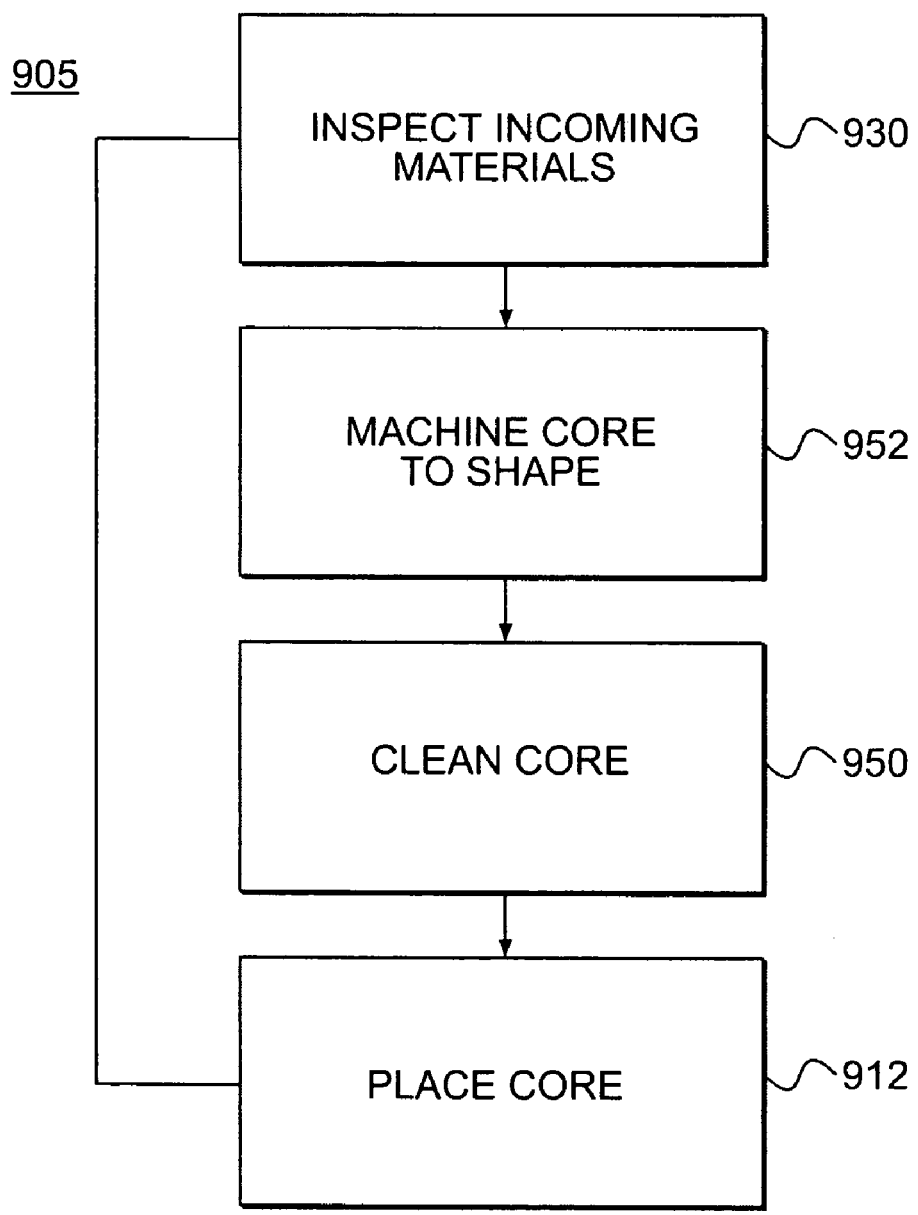
FIG. 9F is a flow diagram illustrating the core flow for manufacturing a one-piece fuselage in accordance with one embodiment of the present invention, as shown in FIG. 9A.
Figure 9G:
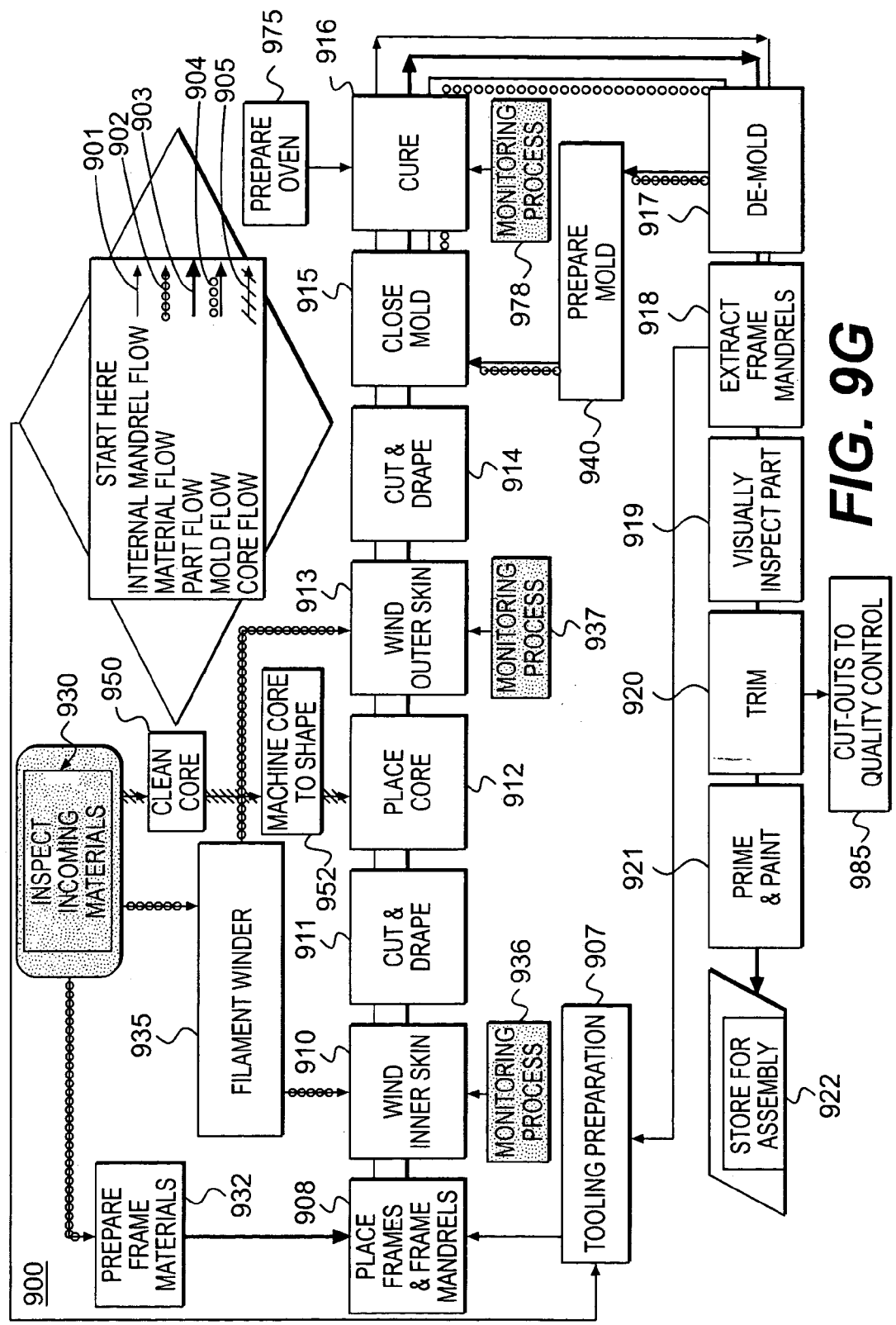
FIG. 9G is a flow diagram illustrating the process of manufacturing a one-piece fuselage in accordance with one embodiment of the present invention, as shown in FIG. 9A-9F.

FIG. 9A is a block diagram illustrating the processes of manufacturing a one-piece fuselage in accordance with one embodiment of the present invention, as shown in FIG. 8. As shown in FIG. 9A, process for creation of one-piece integrally stiffened fuselage 900 includes five processes including internal mandrel flow 901, material flow 902, part flow 903, mold flow 904, and core flow 905. Internal mandrel flow 901 is depicted in FIG. 9B. Material flow 902 is depicted in FIG. 9C. Part flow 903 is depicted in FIG. 9D. Mold flow 904 is depicted in FIG. 9E. Core flow 905 is depicted in FIG. 9F. FIG. 9G illustrates the integration of flows 901-905.

FIG. 9B is a flow diagram illustrating the internal mandrel flow for manufacturing a one-piece fuselage in accordance with one embodiment of the present invention, as shown in FIG. 9A. As shown in FIG. 9B, internal mandrel flow 901 describes the flow of the internal tooling for creation of the fuselage. Internal mandrel flow 901 begins with tooling preparation 907. Tooling preparation 907 includes placing of an armature inside of a bag, forming the bag inside of a form tool, and filling the space between the bag and the form tool with media to form the internal mandrel. The mandrel exterior (which is described in detail on the following figures) is in the shape of the desired fuselage interior.

After tooling preparation 907, the following actions take place: place frames and frame mandrels 908, wind inner skin 910, cut and drape 911, place core 912, wind outer skin 913, cut and drape 914, close mold 915, cure 916, demold 917 and extract frame mandrels 918. Each of these actions are described in detail below (see FIGS. 10-48).

FIG. 9C is a flow diagram illustrating the material flow for manufacturing a one-piece fuselage in accordance with one embodiment of the present invention, as shown in FIG. 9A. As shown in FIG. 9C, material flow 902 describes the flow of fiber and resin for creating the composite material that becomes one-piece integrally-stiffened fuselage 500. Material flow 902 begins with inspect incoming materials 930. Inspect incoming materials 930 involves inspection of the fiber and resin used by system 900. Fiber and resin at inspect incoming materials 930 are inspected for conformity for use in prepare frame materials 932 and filament winder 935.

Prepare frame materials 932 involves the preparation of a fiber and resin, which includes filament winding of broad goods, cutting with a ply cutter, and the preparation of frame and doubler plies. Filament winder 935 includes loading of the fiber and resin into a filament winder device, such as those known in the art. Filament winder 935 creates an inner skin in wind inner skin 910. Filament winder 935 also creates an outer skin in wind outer skin 913. Each of these actions is described in detail below (see FIGS. 10-48).

In material flow 902, any type of fiber and any type of resin may be used. Some of the fibers that are found to be acceptable include: Toray T700, T600, and T300 that are available in 3K, 6K, and 12K tow count, Amoco T-300 and T-650 that are available in 3K, 6K, and 12K tow count, Hexcal AS4 that is available in 3K and 6K tow count, Fortafil 3(C), Grafil 34-600WD, and Panex 33. In one implementation, fibers that are never twisted may be used, although other fibers may also be used in other implementations. In most implementations, an acceptable tow count for the spool is dependent upon part size.

Additionally, any type of curable resin may be used. Some curable resins that have been found acceptable include epoxy resin with a room temperature viscosity of 10,000 to 125,000 cps. The viscosity to be used generally depends upon the shape of the part being filament wound. Any type of Shell epoxy resin may also be used. Shell epoxy resins that have been found acceptable include combinations of 862 and 1050 with "W" curative and accelerator 537. In addition, Shell epoxy resins that have been found acceptable may use tougheners from Nippon zeon, which have been shown to have desirable physical properties. Shell epoxy resins can be used separately or in combination with other resins to obtain the desired properties. Furthermore, still other resins may also be used. For example, high tack resins may be used under certain circumstances (such as holding fibers in place during winding). Therefore, any type of curable resin and any combination of curable resin types may be used.

FIG. 9D is a flow diagram illustrating the part flow for manufacturing a one-piece fuselage in accordance with one embodiment of the present invention, as shown in FIG. 9A. As shown in FIG. 9D, part flow 903 describes the flow of the part (i.e. the fuselage) during the manufacturing process. Part flow 903 includes most of the actions of internal mandrel flow 901. Part flow 903 begins with prepare frame materials 932. Part flow 903 then includes the following actions: place frames and frame mandrels 908, wind inner skin 910, cut and drape 911, place core 912, wind outer skin 913, cut and drape 914, close mold 915, cure 916, de-mold 917, extract frame mandrels 918, visually inspect part 919, trim 920, prime and paint 921, and store for assembly 922. Part flow 903 also includes monitoring process 936, monitoring process 937, and monitoring process 978 for monitoring wind inner skin 910, wind outer skin 913, and cure 916, respectively. Finally, part flow 903 also includes prepare oven 975, and cut-outs to quality control 985. Each of these actions is described below (see FIGS. 10-48).

FIG. 9E is a flow diagram illustrating the mold flow for manufacturing a one-piece fuselage in accordance with one embodiment of the present invention, as shown in FIG. 9A. As shown in FIG. 9E, mold flow 904 describes the actions involving a mold during the manufacturing process. In one implementation, a mold (which will be described in more detail below) is in the shape of a circumferential mold for holding (therefore molding) the structure inside the circumferential mold. In one implementation, the circumferential mold is made of metal. In other implementations, the circumferential mold may be made out of any other materials. Mold flow 904 begins with prepare mold 940. After prepare mold 940, close mold 915 occurs. Close mold 915 includes closing the mold. In some implementations, close mold 915 may also include applying a vacuum to the mold or applying pressure to the mold. After close mold 915, cure 916 occurs (which in some implementations may be preceded by prepare oven 975). In one implementation, cure 916 involves heating the mold, or in another implementation cure 916 involves pressurization of the mold. In other implementations, cure 916 may include curing by any other method. After cure 916, demold 917 occurs. Demold 917 includes the removal of the contents of the mold. After demold 917, the mold is reused in prepare mold 940. All of these actions will be described below (see FIGS. 10-48).

FIG. 9F is a flow diagram illustrating the core flow for manufacturing a one-piece fuselage in accordance with one embodiment of the present invention, as shown in FIG. 9A. As shown in FIG. 9F, core flow 905 involves the core materials that give buckling stiffness to the desired structure, such as one-piece integrally-stiffened fuselage 500. Core flow 905 begins with inspect incoming materials 930. At inspect incoming materials 930, core material (such as honeycomb core material) is inspected for use. After inspect incoming materials 930, the core material is machined to shape in machine core to shape 952. After machine core to shape 952, the core material is cleaned in clean core 950. After clean core 950, the core material is used by system 900 (See FIG. 9G) in place core 912. Notably, place core 912 may involve manipulation of the shape of the desired structure by cut and drape 911. For example, between cut and drape 911 and place core 912, additional material may be added to the core material for manipulation of the shape of the desired structure. Any type of core material may be used for the core material. These actions will be described below (see FIGS. 10-48).

FIG. 9G is a flow diagram illustrating the process of manufacturing a one-piece fuselage in accordance with one embodiment of the present invention, as shown in FIG. 9A-9F. FIG. 9G illustrates the combination in system 900 of internal mandrel flow 901, material flow 902, part flow 903, mold flow 904, and core flow 905, described in FIGS. 9A-9G. Internal mandrel flow 901 is depicted in FIG. 9G as a line with arrows. Material flow 902 is depicted in FIG. 9G as a line with arrows with circles through the line. Part flow 903 is depicted in FIG. 9G as a bold line with arrows. Mold flow 904 is depicted in FIG. 9G as a line with arrows with circles next to the line. Core flow 905 is depicted in FIG. 9G as a line with arrows with slash marks through the line.

As referenced above, the actions taken in system 900 are described in FIGS. 10-48. FIGS. 10-48 illustrate the use of system 900 to create both a one-piece integrally stiffened fuselage with a tail cone and an integrally stiffened fuselage without a tail cone. Therefore, FIGS. 10-48 illustrate the components of system 900 being used to create multiple structures. Those figures illustrating the creation of a one-piece integrally stiffened fuselage with a tail cone will be numbered consistently with one another and those figures illustrating the creation of a one-piece integrally stiffened fuselage without a tail cone will be number consistently with one another.

As shown in FIG. 9G, system 900 begins with tooling preparation 907. Tooling preparation 907 is described in FIG. 10A.

Figures 10A, 10B:
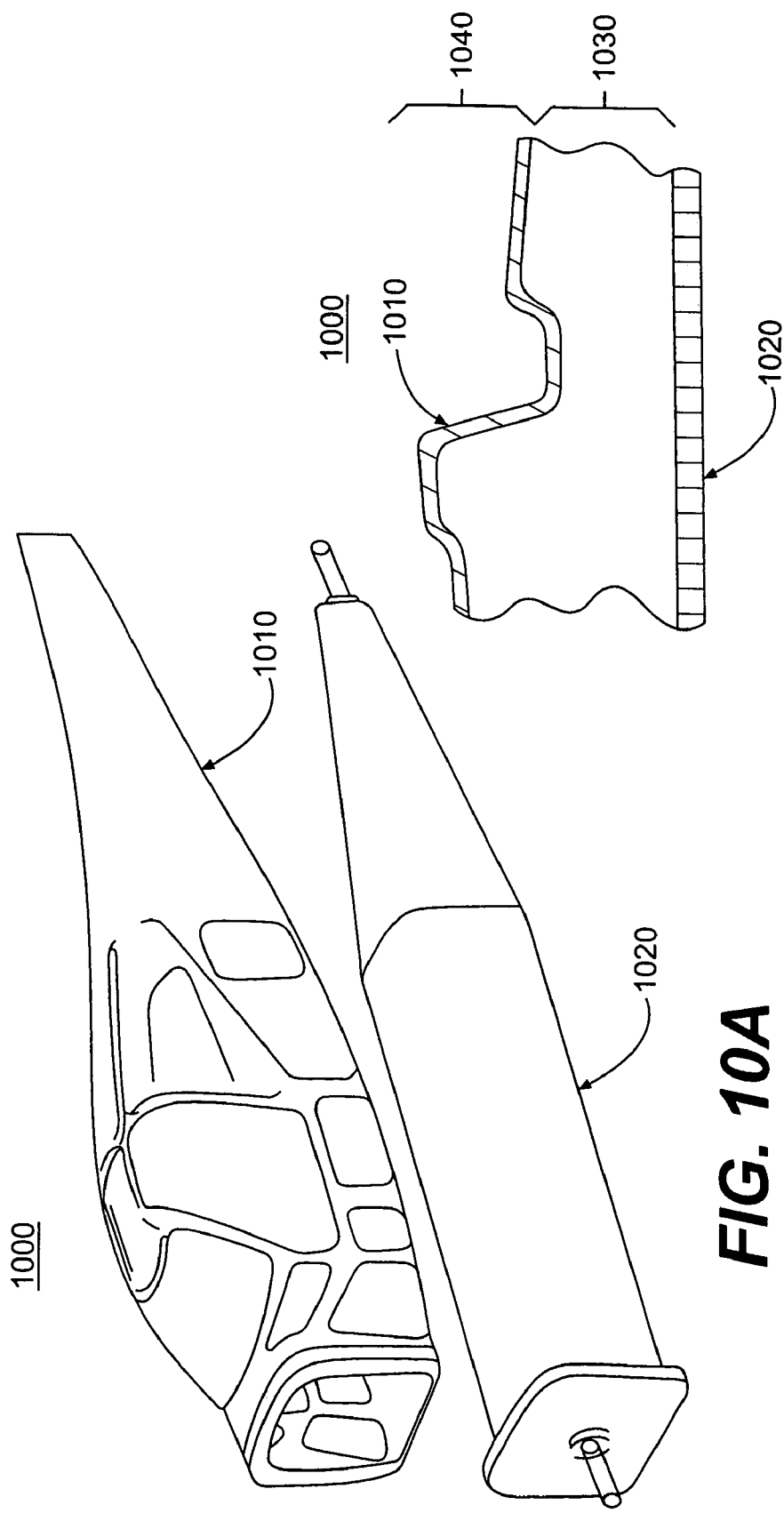
FIG. 10A illustrates tooling preparation in accordance with an embodiment of the present invention, as shown in FIG. 9.
FIG. 10B is a cut-away view of a portion of an armature with a bag in accordance with an embodiment of the present invention, as described in FIG. 10A.

FIG. 10A illustrates tooling preparation in accordance with an embodiment of the present invention, as shown in FIG. 9. FIG. 10A provides an example of tooling preparation 907 from FIG. 9. FIG. 10A shows the preparation of tooling, such as a mandrel 1000. In one implementation, mandrel 1000 is a reusable elastomeric mandrel, such as that currently available through International Design Technologies, Inc (IDT). However, any mandrel may be used.

Mandrel 1000 may include a bag 1010 and an armature 1020. Bag 1010 may comprise premolded silicone, or bag 1010 may consist of any other form or substance. Some silicone bag materials that have been found acceptable include those available from Arlon-Mosite, Kirkhill, and D-Aircraft Products SMC 950. In addition, there are many other suppliers of high temperature (up to 400° F.), unfilled, and uncured silicone sheet materials that may be used, depending upon the cure temperature of the desired part.

Armature 1020 may be made of any material. In one implementation, a welded metal armature is used. However, other materials could be used to form the armature. To minimize weight and mandrel bending, armature 1020 may be as large as possible, while allowing it to be removed from bag 1010 and from the completed fuselage. These implementations are merely exemplary, and other implementations may also be used.

FIG. 10B is a cut-away view of a portion of an armature with a bag in accordance with an embodiment of the present invention, as described in FIG. 10A. As shown in FIG. 10B, armature 1020 is placed through bag 1010 to form cavity 1030. The space difference between armature 1020 and bag 1010 provides for cavity 1030. To form cavity 1030, bag 1010 is sealed at each end to armature 1020. In one implementation, clamps and/or bolts are used to seal each end of bag 1010. Armature 1020 thus supports bag 1010. Notably, bag 1010 has a desired pre-molded shape 1040. Bag 1010 may lack the rigidity to maintain desired shape 1040 without support from additional tooling. Therefore, as described below, additional tooling may be used to maintain desired shape 1040. These implementations are merely exemplary, and other implementations may also be used.

FIG. 11A is a perspective view of an armature and bag in a form tool in accordance with an embodiment of the present invention, as shown in FIG. 10A. As shown in FIG. 11A, following placement of armature 1020 in bag 1010 (as described in FIG. 10A), armature 1020 and bag 1010 are placed in a form tool 1110 and bag 1010 is sealed at both ends to form tool 1110. In one implementation, form tool 1110 covers most of armature 1020 and bag 1010. Form tool 1110 provides a desired shape to outside surface of bag 1010. This implementation is merely exemplary, and other implementations may also be used.

FIG. 11B is a cut-away view of a portion of an armature and bag in a form tool in accordance with an embodiment of the present invention, as shown in FIG. 11A. As shown in FIG. 11B, bag 1010 is between form tool 1110 and armature 1020. Bag 1010 is sealed at each end to both form tool 1110 and armature 1020 to form enclosed cavity 1030 and enclosed cavity 1120. Enclosed cavity 1030 is between outside surface of armature 1020 and inside surface of bag 1010 and enclosed cavity 1120 is between inside surface of form tool 1110 and outside surface of bag 1010. In one implementation, form tool 1110 is equipped with ports for enclosed cavity 1120 (not shown) to control pressure and quantity of air within enclosed cavity 1120. Enclosed cavity 1030 may also be equipped with ports (not shown) to control pressure and quantity of air within enclosed cavity 1030. These implementations are merely exemplary, and other implementations may also be used.

In one implementation, to provide the desired shape to outside surface of bag 1010, the air is vented from enclosed cavity 1120 through ports 1130 (not shown) while pressurized air is inserted into enclosed cavity 1030 through ports (not shown) forcing outside surface of bag 1010 against inside surface of form tool 1110. Ports for enclosed cavity 1120 are then sealed to maintain outside surface of bag 1010 against inside surface of form tool 1110. Ports to enclosed cavity 1030 may then be kept pressurized or they may be vented to the atmosphere. In another implementation, to provide desired shape to outside surface of bag 1010, the air is evacuated from enclosed cavity 1120 through ports while ports into enclosed cavity 1030 are left vented to the atmosphere which forces outside surface of bag 1010 against inside surface of form tool 1110. These implementations are merely exemplary, and other implementations may also be used.

Figure 13:
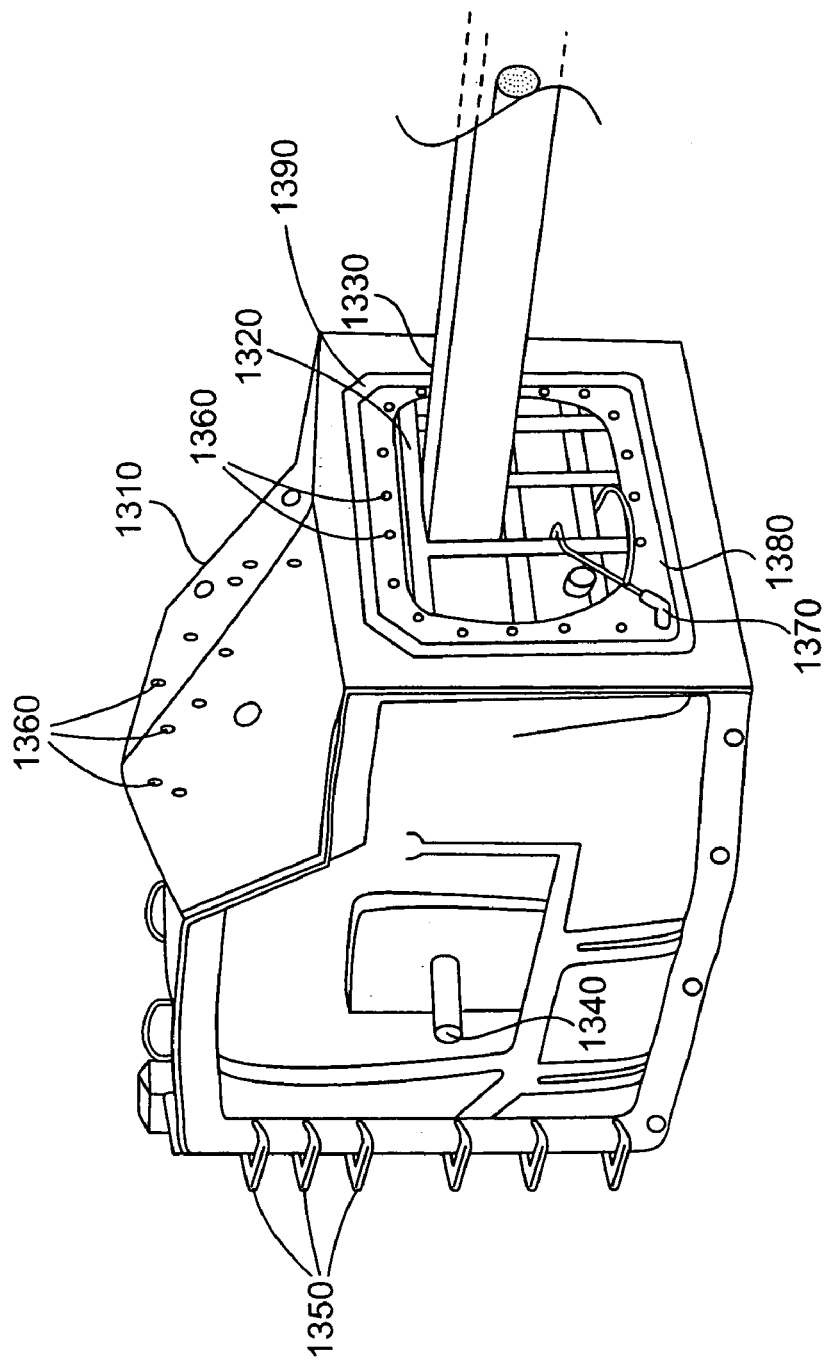
FIG. 13 is a perspective view of installing a winding shaft in a mandrel in a form tool in accordance with another embodiment of the present invention, as shown in FIG. 12A-12B.

FIG. 12A illustrates introducing media into a mandrel in accordance with an embodiment of the present invention, as shown in FIG. 13. As shown in FIG. 12A, after forming bag 1010 to the shape of form tool 1110 (as described in FIGS. 11A-11B), media 1210 may be introduced into enclosed cavity 1030 to provide the desired shape to bag 1010 (not shown, but shown in FIG. 12B). In one implementation, media 1210 is introduced through a sealable opening (not shown) inside armature 1020. Media 1210 may be any material used to provide rigidity to bag 1010. In one implementation, media 1210 is a lightweight insulator material, such as porous ceramic materials used for water filtration. In another implementation, aluminum hollow-beaded materials may be used. These implementations are merely exemplary, and other implementations may also be used.

In one implementation, when media 1210 is introduced into enclosed cavity 1030, it may be introduced under pressure if enclosed cavity 1030 is pressurized, under atmospheric conditions if enclosed cavity 1030 is vented to atmosphere, or under less than atmospheric conditions if enclosed cavity 1030 is maintained under some pressure less than atmospheric. As shown in FIG. 12A, in one implementation, the introduction of media 1210 is performed in a semi-horizontal orientation. However, in other implementations, other orientations, such as a vertical orientation or any other orientation, may be used for introducing media 1210 into enclosed cavity 1030. These implementations are merely exemplary, and other implementations may also be used.

FIG. 12B is a cut-away view of a portion of a mandrel filled with media in accordance with an embodiment of the present invention, as shown in FIG. 12A. As shown in FIG. 12B, media 1210 is introduced into enclosed cavity 1030, which is between armature 1020 and bag 1010, as held together by form tool 1110. After the introduction of media 1210, media 1210 may be compacted to settle the media. In one implementation, the compacting of media 1210 occurs by vibrating form tool 1110. In another implementation, compacting of media 1210 occurs by tamping media 1210. These implementations are merely exemplary, and other implementations may also be used.

Following compaction of media 1210 the air within enclosed cavity 1030 may be removed as completely as possible to complete a pressure difference between enclosed cavity 1030 and the atmosphere. This pressure difference causes bag 1010 to retain its shape once form tool 1110 is removed. If a pressure difference between enclosed cavity 1030 and the atmosphere is not maintained, bag 1010 may lose the desired shape established by form tool 1110. In one implementation, five pounds per square inch (psi) of pressure difference between enclosed cavity 1030 and atmospheric pressure has been demonstrated sufficient to cause bag 1010 to retain the desired shape. This implementation is merely exemplary, and other implementations may also be used.

FIG. 13 is a perspective view of installing a winding shaft in a mandrel in a form tool in accordance with another embodiment of the present invention, as shown in FIG. 12A-12B. FIG. 13 is also the first drawing illustrating the manufacture of a mandrel without a tail cone. As shown in FIG. 13, following the introduction of media into mandrel 1390, a winding shaft 1330 is inserted into mandrel 1300. In one implementation, mandrel 1390 incorporates armature 1320, winding shaft 1330, compacted media (not shown), and bag (not shown). Winding shaft 1330 is used to rotate mandrel 1390 during fiber placement. In one implementation, winding shaft 1330 is inserted into a box channel within armature 1320.

As shown in FIG. 13, mandrel 1390 is surrounded by form tool 1310, as described above. Form tool 1310 incorporates pivot 1340. In one implementation, pivot 1340 allows form tool 1310 and mandrel 1300 to rotate to vertical, if needed. Form tool 1310 also includes clamps 1350, bolts 1360, vacuum port 1370, and end plates 1380. In one implementation, clamps 1350 are used to seal a bag (not shown) around form tool 1310. In this implementation, bolts 1360 are used to join and seal segments of form tool 1310 to each other. In addition, bolts 1360 may also be used to seal end plates 1380 to bag 1420, form tool 1310 and to armature 1320.

Figure 14:
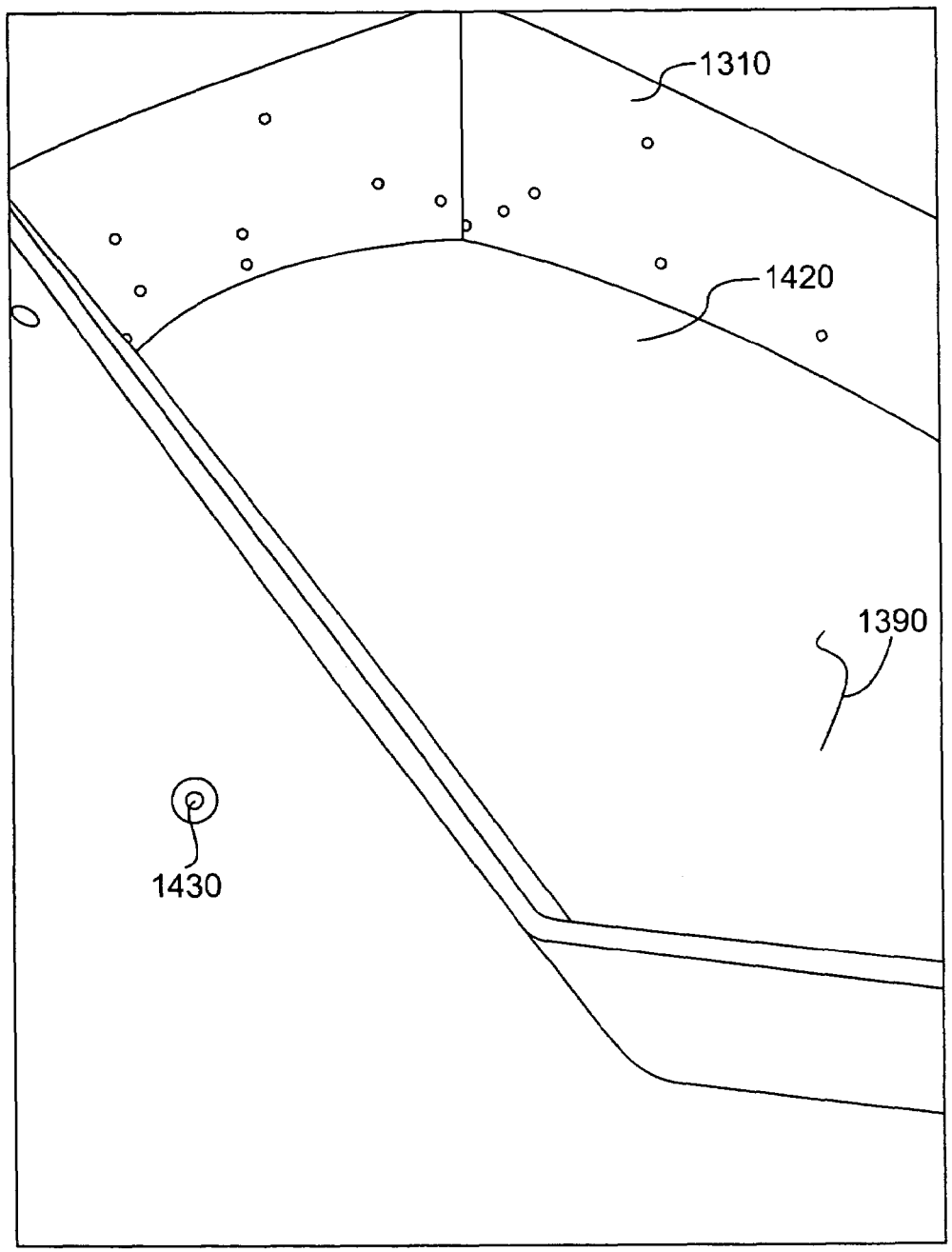
FIG. 14 illustrates a close-up perspective view of a mandrel in a form tool in accordance with an embodiment of the present invention, as shown in FIG. 13.

FIG. 14 illustrates a close-up perspective view of a mandrel in a form tool in accordance with an embodiment of the present invention, as shown in FIG. 13. As shown in FIG. 14, one section of form tool 1310 has been removed from around mandrel 1390. As shown in FIG. 14, the external surface of bag 1420 is formed to the shape of internal surface of form tool 1310.

In one implementation, form tool 1310 includes a vacuum port 1430. Vacuum port 1430 connects to an interior surface of form tool 1310. Vacuum port 1430 is used to vent or remove air from between interior surface of form tool 1310 and exterior surface of bag 1420.

Figure 15:
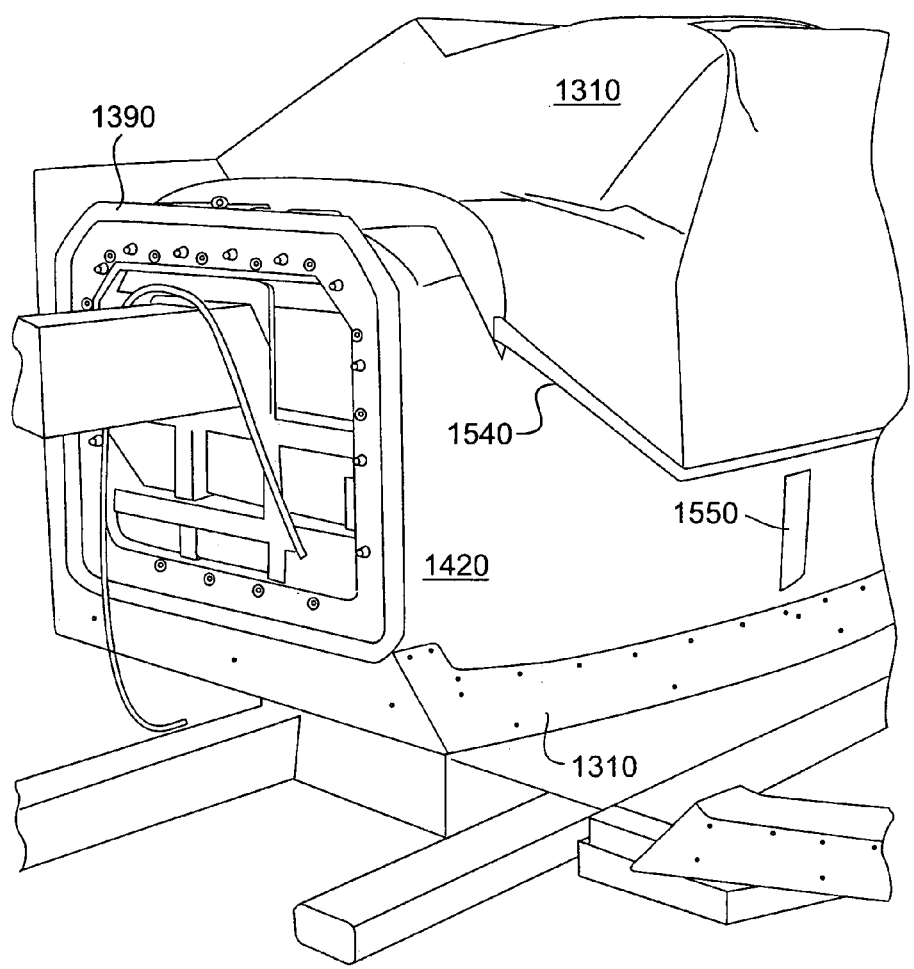
FIG. 15 illustrates another perspective view of a mandrel in a form tool in accordance with an embodiment of the present invention, as shown in FIG. 14.
Figure 16:
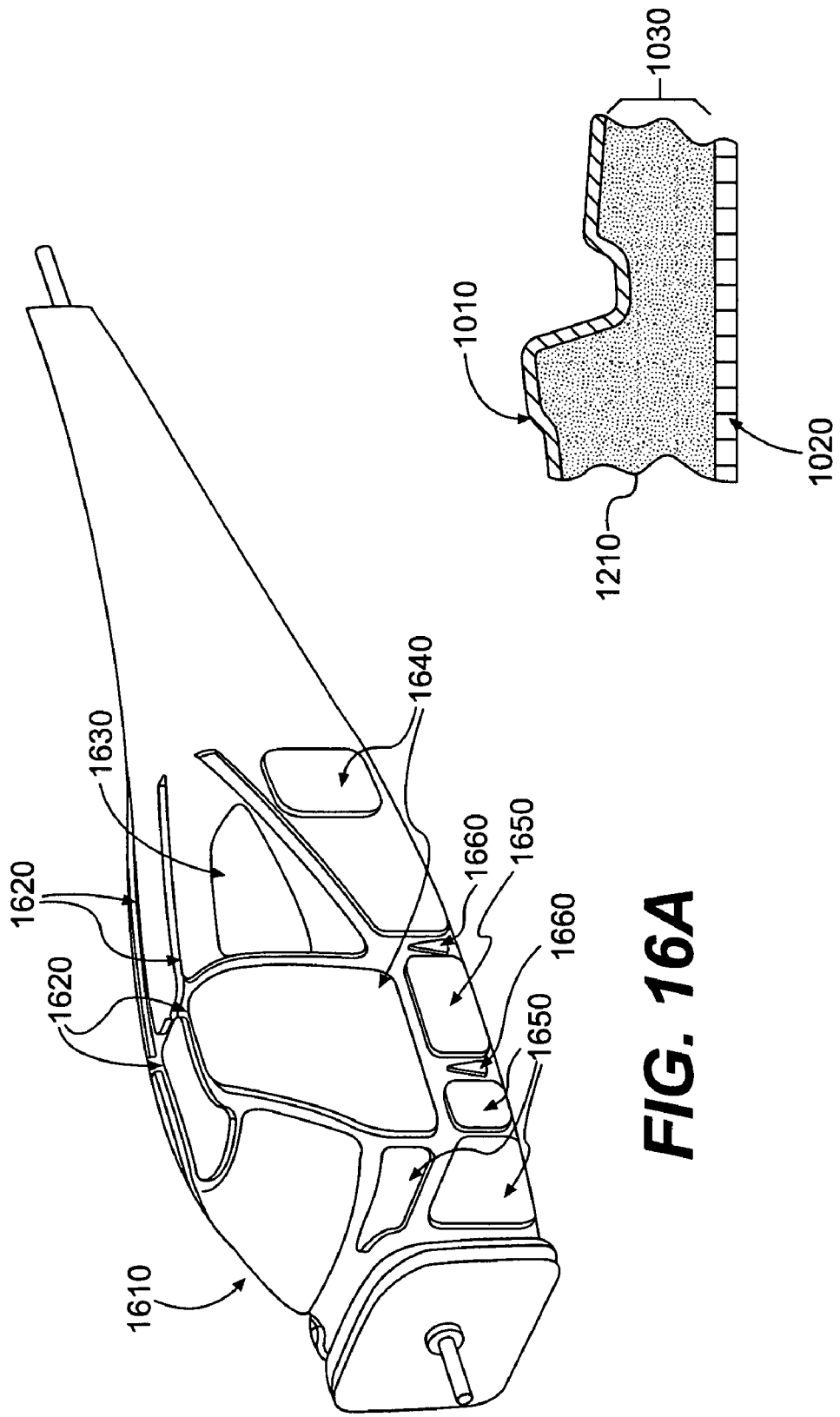
FIG. 16A is a perspective view of the mandrel prepared for lay-up in accordance with an embodiment of the present invention, as shown in FIGS. 12A-12B.
FIG. 16B is a cut-away view of the mandrel prepared for lay-up in accordance with an embodiment of the present invention, as shown in FIG. 16A.

FIG. 15 illustrates another perspective view of a mandrel in a form tool in accordance with an embodiment of the present invention, as shown in FIG. 14. As shown in FIG. 15, a section of form tool 1310 has been removed from mandrel 1390. As further shown in FIG. 15, bag 1420 retains the desired shape imparted to it by form tool 1310. In one implementation, a pressure differential is maintained between a media-filled enclosed cavity situated between armature 1320 and bag 1420 and the atmosphere. This implementation is merely exemplary, and other implementations may also be used.

As shown in FIG. 15, mandrel 1390 includes frame recesses 1540 and wing attachment pocket recesses 1550. Frame recesses 1540 and wing attachment pocket recesses 1550 are located on the external surface of bag 1420. In one implementation, frame recesses 1540 and wing attachment pocket recesses 1550 are created by the inside surface of form tool 1310. However, it may be problematic for form tool 1310 to create frame recesses 1540 and wing attachment pocket recesses 1550 because of the tendency of form tool 1310 to have either no draft or negative draft. For this reason, the removal of form tool 1310 could be difficult from around certain portions of mandrel 1390.

In one implementation, these problems are overcome by making form tool 1310, as shown in FIG. 15, in multiple pieces having required draft. In another implementation, the negative draft features are made as separate details that fit within recesses in the inside of the form tool and are detachable from outside of the form tool when it is necessary to remove form tool from around formed mandrel. These implementations are merely exemplary, and other implementations may also be used.

FIG. 16A is a perspective view of the mandrel prepared for lay-up in accordance with an embodiment of the present invention, as shown in FIGS. 12A-12B. As shown in FIG. 16A, following introduction of internal media 1210 (described in FIGS. 12A-12B), form tool 1110 is removed to expose mandrel 1610. Mandrel 1610 is then cleaned and prepared for lay-up. Lay-up is the procedure of applying composite materials at desired locations to the exterior surface of the formed mandrel. These materials may (when cured) form stiffening structure, frames, within the fuselage, or when placed following placement of an inner skin, as core details, add buckling strength to the fuselage skin.

In one implementation, mandrel 1610 contains frame recesses window recesses 1630, door recesses 1640, core detail recesses 1650, and wing attachment pocket recesses 1660. These recesses are used to form features such as frames, windows, doors, core pockets, and wing attachment pockets in the fuselage. This implementation is merely exemplary, and other recesses and other implementations may also be used.

FIG. 16B is a cut-away view of the mandrel prepared for lay-up in accordance with an embodiment of the present invention, as shown in FIG. 16A. As shown in FIG. 16B, mandrel 1610 includes armature 1020, bag 1010, and enclosed cavity 1030 filled with media 1210. As shown in FIG. 16B, the insertion of media 1210 into enclosed cavity 1030 and subsequent evacuation of air has caused the outside surface of bag 1010 to hold the desired inside surface shape of the removed form tool 1110. This "shape memory" provides for features desired for lay-up of window doublers, door frames, core details, and wing attachment lugs. This implementation is merely exemplary, and other implementations may also be used.

Figure 17:
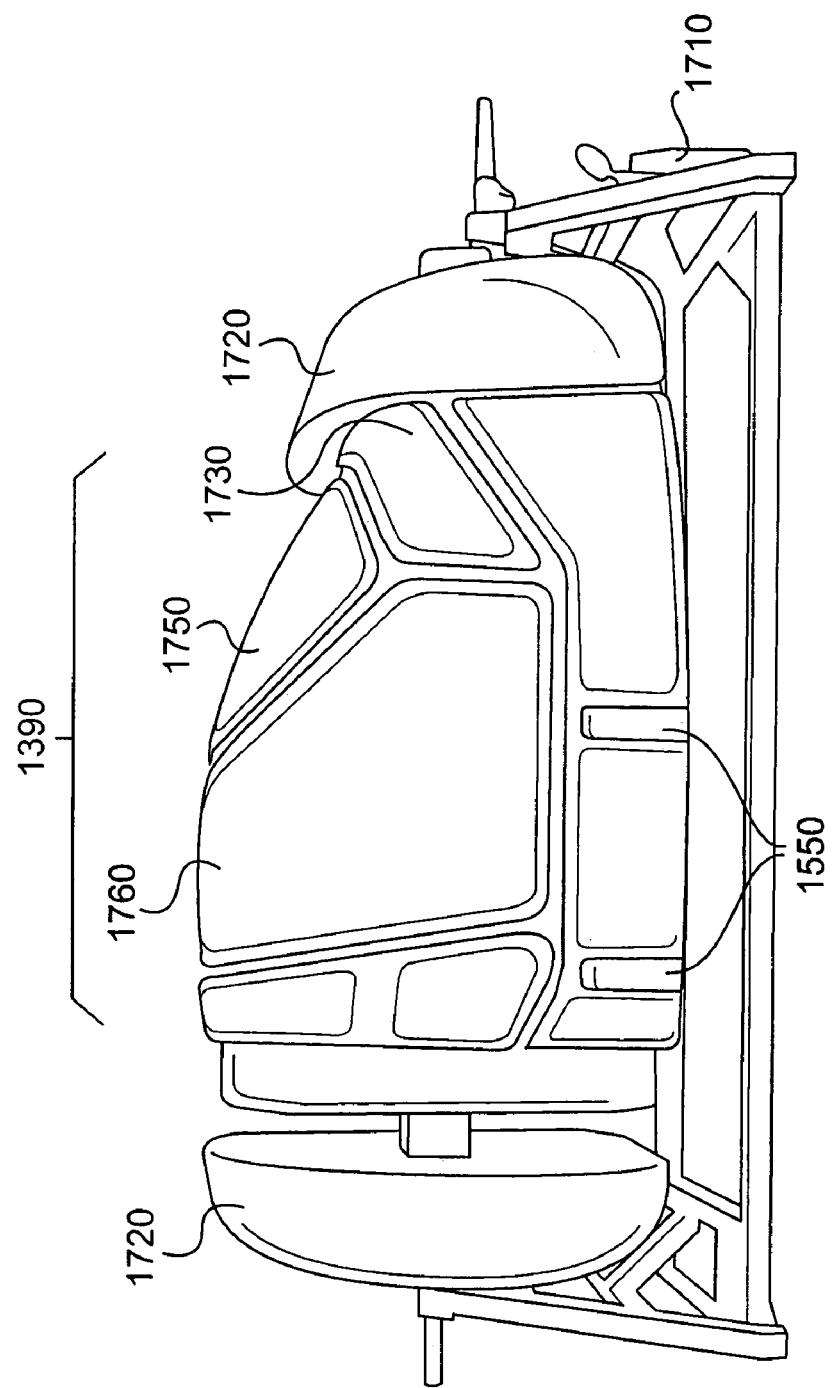
FIG. 17 illustrates preparing an internal mandrel for filament winding of the inner skin in accordance with another embodiment of the present invention, as shown in FIG. 15.

FIG. 17 illustrates preparing an internal mandrel for filament winding of the inner skin in accordance with another embodiment of the present invention, as shown in FIG. 15. As shown in FIG. 17, mandrel 1390 is placed in a winding cart 1710 in preparation for filament winding. Winding end aids 1720 are positioned on the ends of mandrel 1500. Winding end aids 1720 are used to eliminate concave or flat winding surfaces. Other winding aids are also depicted in FIG. 17. Examples of other winding aids include frames 1740, door recess fillers 1760, and windshield area fillers 1750. Other winding aids provide a surface upon which the filament winding machine places the fibers (and resin) so that the fibers do not shift as the mandrel is rotated. Other winding aids 1725 are also used to protect mandrel 1390 from being cut during cut and drape 911. Other winding aids 1725 may further include guide features to guide cutting of plies during cut and drape 911 (described below). In addition, gap winding aids 1727 (not shown) are also used in areas where other winding aids 1725 are higher than mandrel 1390. These gap winding aids 1727 ensure that all surfaces are convex prior to filament winding.

Figure 18:
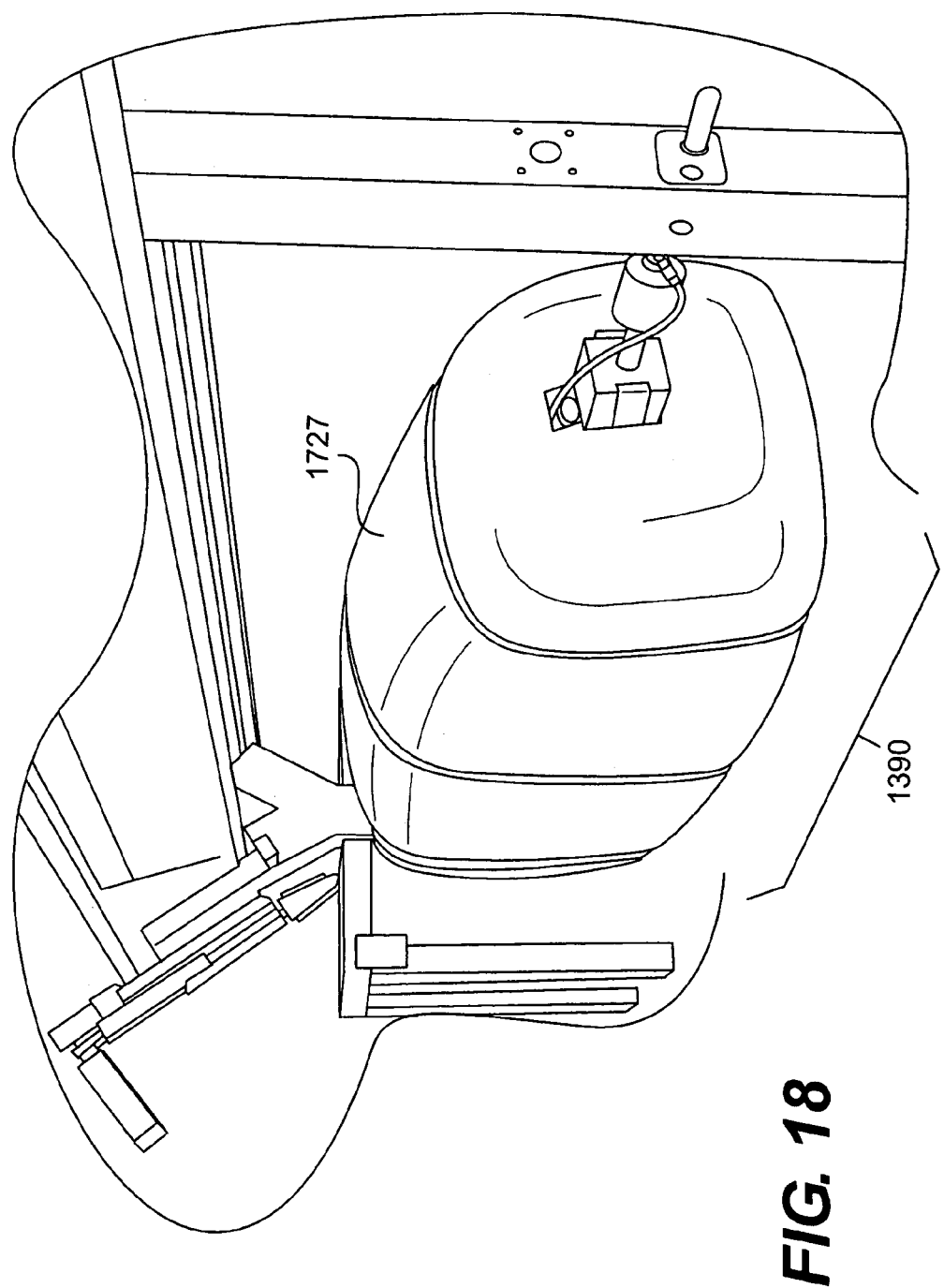
FIG. 18 illustrates another perspective view of preparing the mandrel for filament winding in accordance with an embodiment of the present invention, as shown in FIG. 17.

FIG. 18 illustrates another perspective view of preparing the mandrel for filament winding in accordance with an embodiment of the present invention, as shown in FIG. 17. As shown in FIG. 18, gap winding aids 1727 have been installed to make all surfaces convex. Gap winding aids 1727 are used because the excessive concave area on mandrel 1390 would make filament winding difficult.

Figure 19:
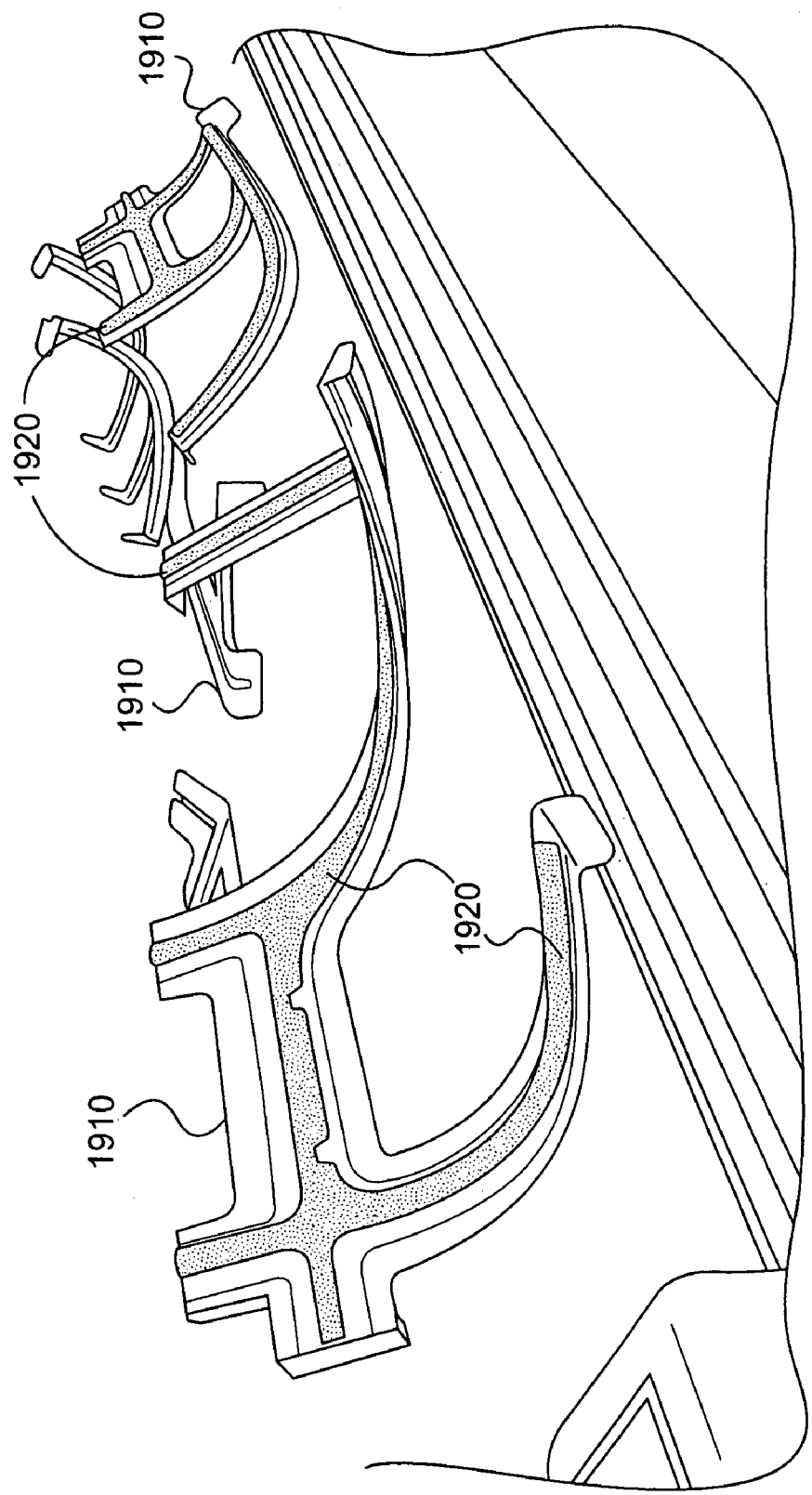
FIG. 19 illustrates preparing frame mandrels to be placed on a mandrel in accordance with an embodiment of the present invention, as shown in FIG. 18.

FIG. 19 illustrates preparing frame mandrels to be placed on a mandrel in accordance with an embodiment of the present invention, as shown in FIG. 18. As shown in FIG. 19, frame mandrel tools 1910 are used to create desired shapes using frame mandrels 1920. In one implementation, frame mandrels 1920 are held to the inside shape frame mandrel tools 1910 by drawing a vacuum between the inside surface of form tools 1910 and the outside surface of frame mandrels 1920. Frame mandrels 2020 are then filled with media. Finally, this media is compacted to give the frame mandrel the desired shape.

In one implementation, to maintain the desired shape, the air within the frame mandrel cavity, which has been completely filled with media, is evacuated. This causes media to lock together retaining the form tool shape. In another implementation, frame mandrels may include armatures. These implementations are merely exemplary, and other implementations may also be used.

FIGS. 10-19 have described tooling preparation 907, as shown in FIG. 9. As shown in FIG. 9, following tooling preparation 907, prepare frame materials 932 occurs. Prepare frame materials 932 is described in FIG. 20.

FIG. 20 illustrates preparing frame materials in accordance with an embodiment of the present invention, as shown in FIG. 9. As shown in FIG. 20, frame material 2000 may be cut to produce ply pieces which will be formed and placed on a mandrel in a predetermined location to produce frames. Frame material 2000 may also be cut to produce ply pieces, which will be formed and placed on a mandrel in predetermined locations to produce integral doublers, longerons, flanges, and attachment lugs.

Frame material 2000 may be used for frame plies 2010, doubler plies 2020, longeron plies 2030, integral flange plies 2040, and wing attachment pocket plies 2050. Frames, doublers, longerons, flanges, and attachment pockets are structures that enhance the strength and utility of the fuselage. Frame material 2000 may include prepreg fabric or filament-wound broad goods. Other frame material may also be used.

FIG. 20 has described prepare frame materials 932, as shown in FIG. 9. As shown in FIG. 9, following prepare frame materials 932, place frames and frame mandrels 908 occur. Place frames and frame mandrels 908 are described in FIGS. 21A-24B.

FIG. 21A is a perspective view of a mandrel with frame plies and frame mandrels in place in accordance with an embodiment of the present invention, as shown in FIG. 9. As shown in FIG. 21A, mandrel 1610 includes recesses for plies, including frame plies 2010, integral flange plies 2040, and wing attachment pocket plies 2050. In one implementation, these frame plies 2010 are placed in frame recesses 1620 (see FIG. 21B) on mandrel 1610. Once frame plies 2010 have been placed, frame mandrels 1920 may be placed. In one implementation, frame mandrels 1920 (as described in FIG. 19) may be placed upon frame plies 2010 or flange plies 2040 to provide the support during the cure process. In one implementation, mandrel 1610 may be placed in winding cart (not shown) to allow access for lay-up. These implementations are merely exemplary, and other implementations may also be used.

FIG. 21B illustrates frame plies on the mandrel in accordance with an embodiment of the present invention, as shown in FIG. 21A. As shown in FIG. 21B, frame plies 2010, may be formed and placed in a frame recess 1620 on bag 1010, which sits atop media 1210, which sits atop armature 1020.

FIG. 21C illustrates frame plies and a frame mandrel on the mandrel in accordance with an embodiment of the present invention, as shown in FIG. 21A. As shown in FIG. 21C, a frame mandrel, such as frame mandrel 1920 is placed on top of frame plies 2010 on bag 1010, which sits atop media 1210, which sits atop armature 1020. This implementation is merely exemplary, and other implementations may also be used.

FIGS. 21A-21C have provided an overview of frames and frame mandrels. FIGS. 22-24B describe frame ply lay-up and frame mandrels in more detail.

FIG. 22 illustrates wing attachment plies being applied to a mandrel to form wing attachment pockets in accordance with an embodiment of the present invention, as shown in FIGS. 21A-21C. As shown in FIG. 22, wing attachment plies 2050 have been formed and placed in wing attachment pockets 2210. Wing attachment pockets 2210 may also include metal inserts (not shown). Metal inserts provide bearing strength in the joint areas.

Figure 23:
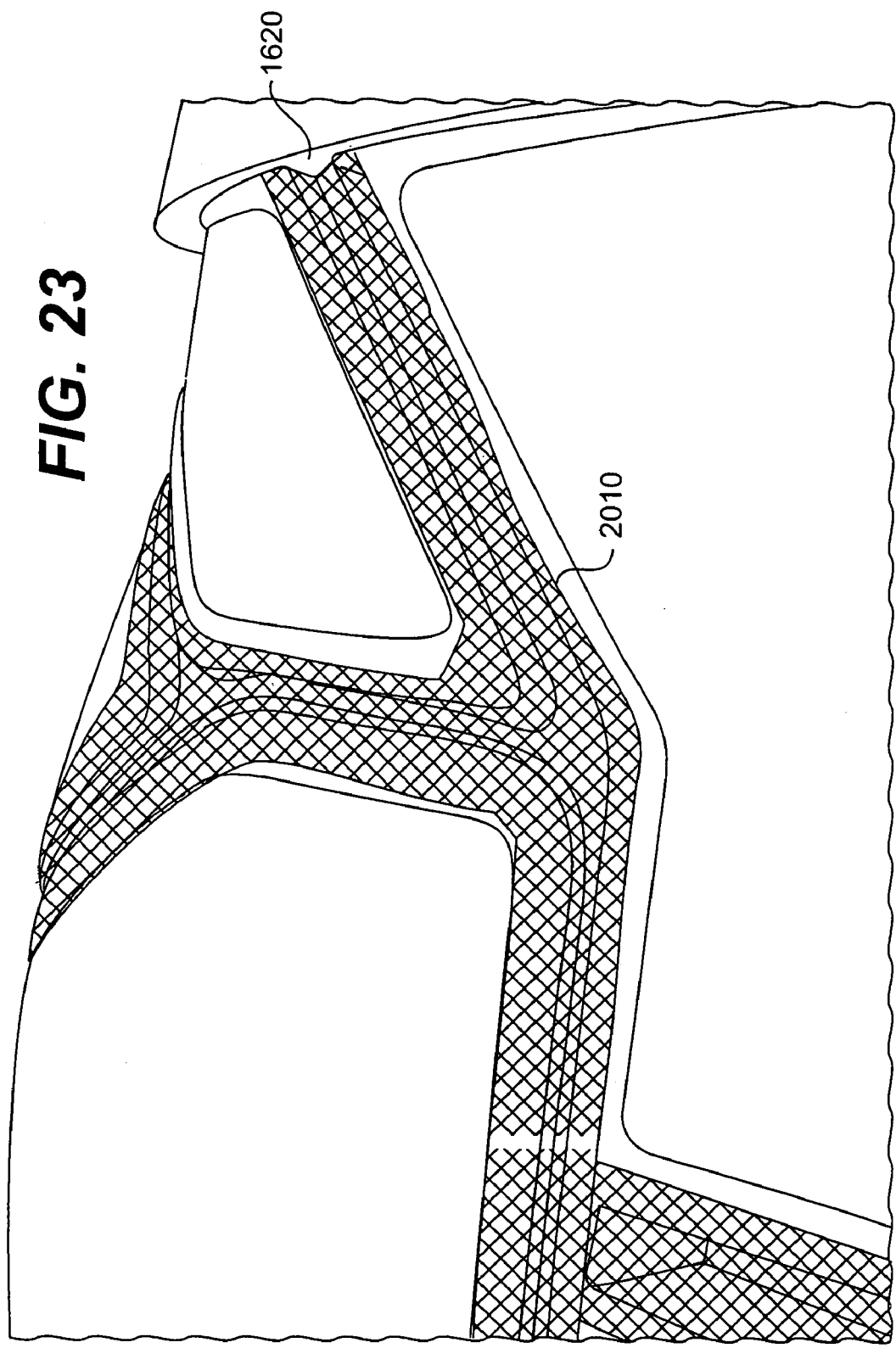
FIG. 23 illustrates frame plies in frame recesses in a mandrel in more detail in accordance with an embodiment of the present invention, as shown in FIGS. 21A-21C.

FIG. 23 illustrates frame plies in frame recesses in a mandrel in more detail in accordance with an embodiment of the present invention, as shown in FIGS. 21A-21C. As shown in FIG. 23, frame plies 2010 are placed inside frame recess 2310 in mandrel 1410. In this example, frame plies 2010 are placed inside frame recess 2310 in the forward and lower portion of access door opening 115. Frame mandrels 1920 may then be placed on frame plies 2010, as shown in FIG. 24A.

Figure 24A:
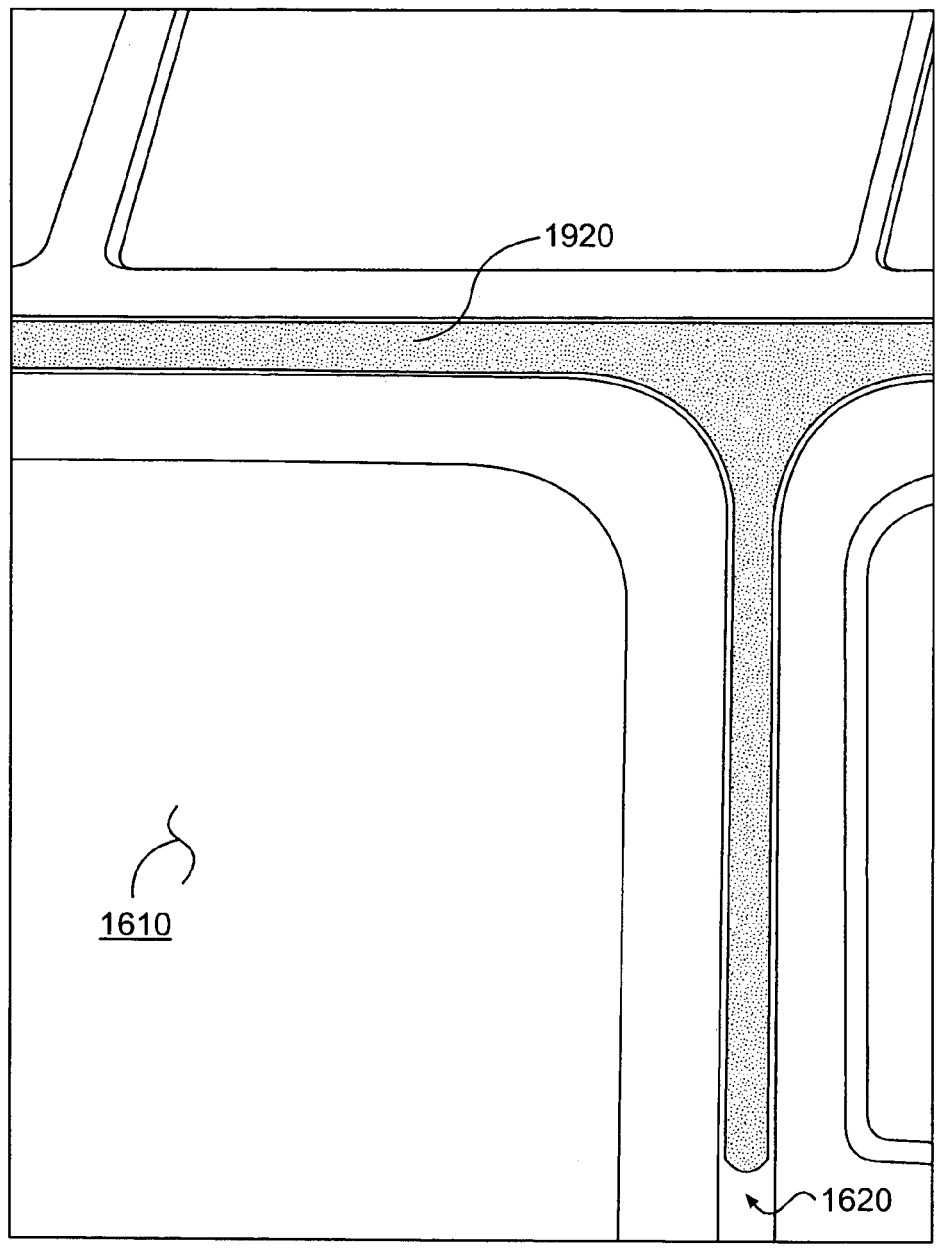
FIG. 24A illustrates a frame mandrel in a frame recess in a mandrel in more detail in accordance with an embodiment of the present invention, as shown in FIGS. 21A-21C.
Figure 24B:
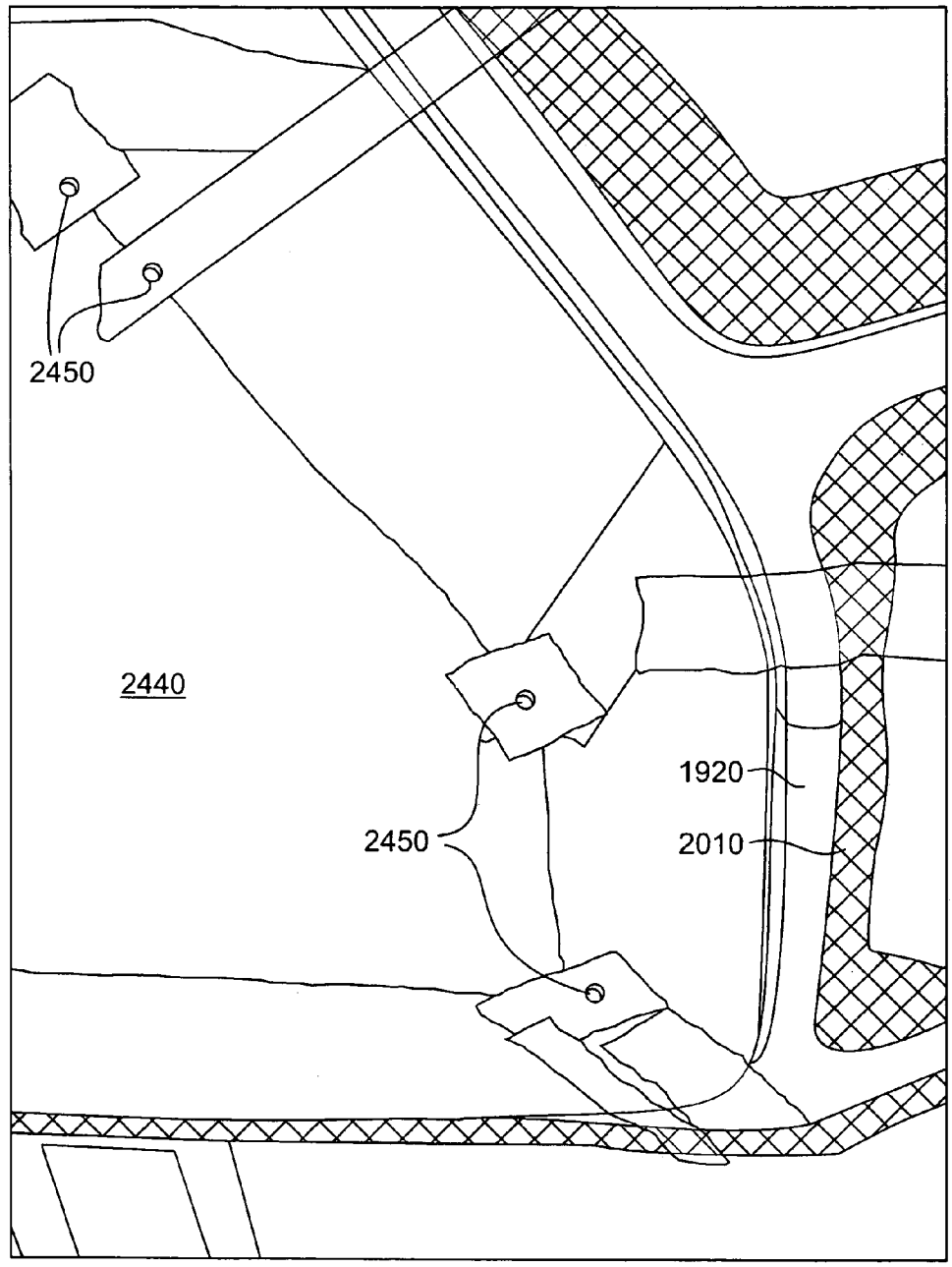
FIG. 24B illustrates a frame mandrel over frame plies in a frame recess in a mandrel in accordance with an embodiment of the present invention, as shown in FIGS. 21A-21C, 23, and 24A.

FIGS. 24A-24B, illustrate the combination of frame plies and a frame mandrel on a mandrel.

FIG. 24A illustrates a frame mandrel in a frame recess in a mandrel in more detail in accordance with an embodiment of the present invention, as shown in FIGS. 21A-21C. As shown in FIG. 24A, frame mandrel 1920 is placed in frame recess 1620 in mandrel 1610.

FIG. 24B illustrates a frame mandrel over frame plies in a frame recess in a mandrel in accordance with an embodiment of the present invention, as shown in FIGS. 21A-21C, 23, and 24A. As shown in FIG. 24B, frame plies 2010 are placed in frame recess 1620 (not shown). In this example, frame plies 2010 are placed inside frame recess 1620 in the forward section of access door opening 115. Frame mandrel 1920 is then placed on top of frame plies 2010. As also shown in FIG.

24B, the recess in access door 115 may be filled with a winding aid, such as, door opening filler block 2440. As described above, winding aids, such as door opening filler block 2440, provide a convex surface for filament winding (described in the following paragraphs). As shown in FIG. 24B, a second winging aid 2450 is used to define ply cutting locations during cut and drape 911 (described below).

FIGS. 21A-24A have described place frames and frame mandrels 908, as shown in FIG. 9. As shown in FIG. 9, following place frames and frame mandrels 910, wind inner skin 910 occurs. Wind inner skin 910 is described in FIGS. 25-28.

Figure 25:
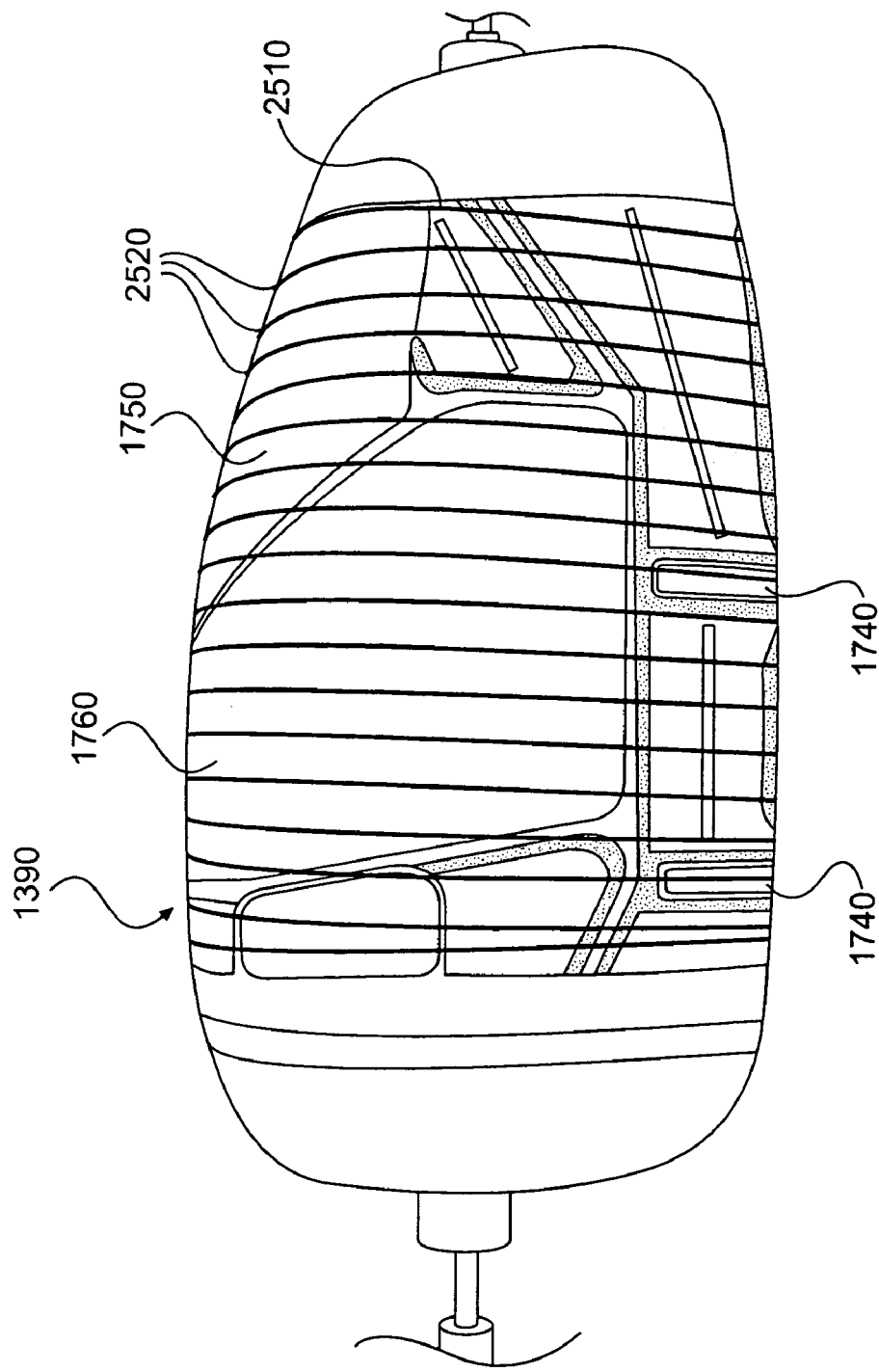
FIG. 25 illustrates preparing the mandrel for filament winding of the inner skin in accordance with an embodiment of the present invention, as shown in FIG. 9.

FIG. 25 illustrates preparing the mandrel for filament winding of the inner skin in accordance with an embodiment of the present invention, as shown in FIG. 9. As shown in FIG. 25, mandrel 1390 includes door recess filler 1760, windshield recess filler 1750, and wing attachment pocket fillers 1740. Other frames and frame mandrels have also been inserted in mandrel 1390 (as described above.)

Figure 26:
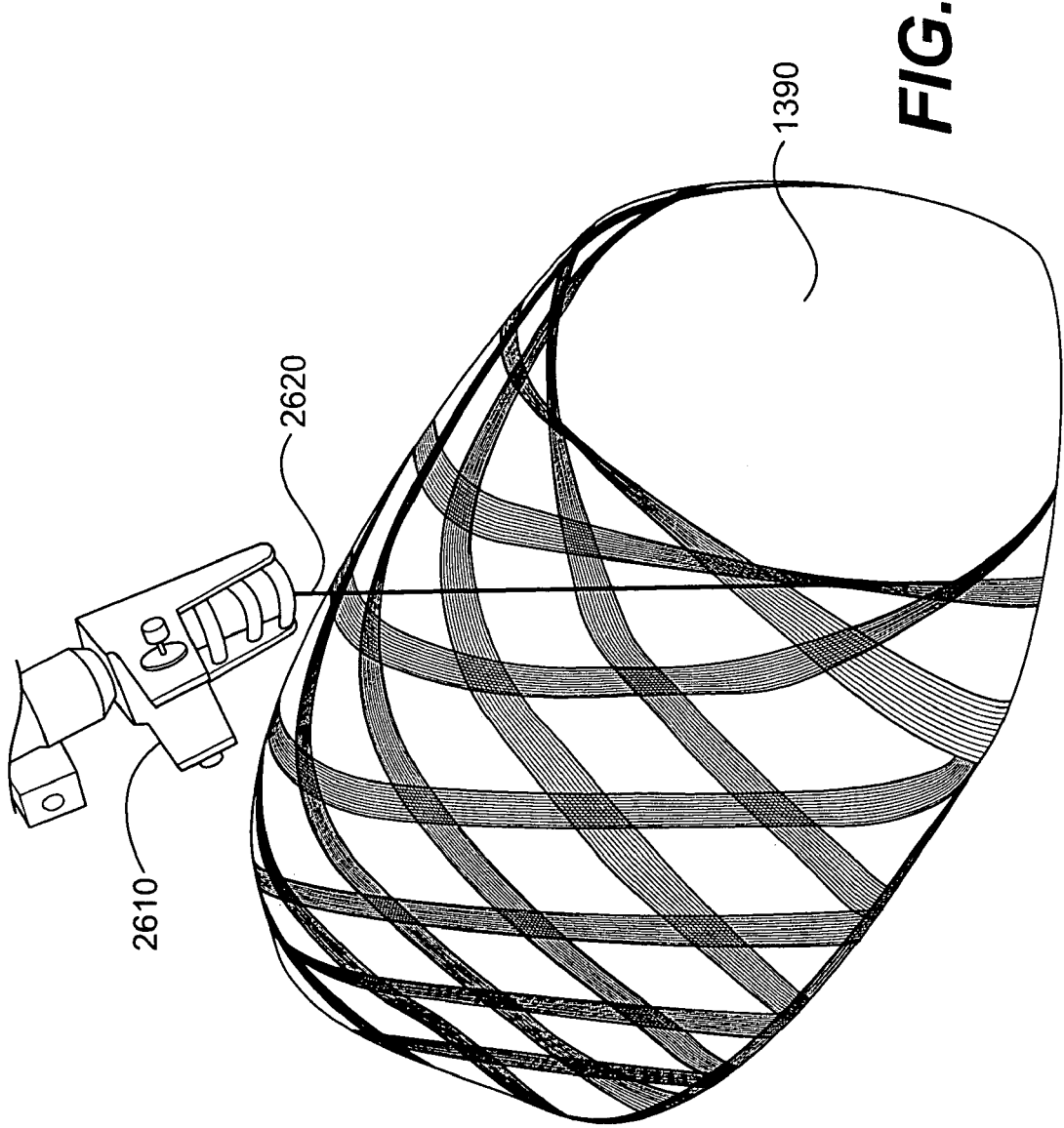
FIG. 26 illustrates applying filament to the mandrel for filament winding of the inner skin by a filament winding machine in accordance with an embodiment of the present invention, as shown in FIG. 25.
Figure 27:
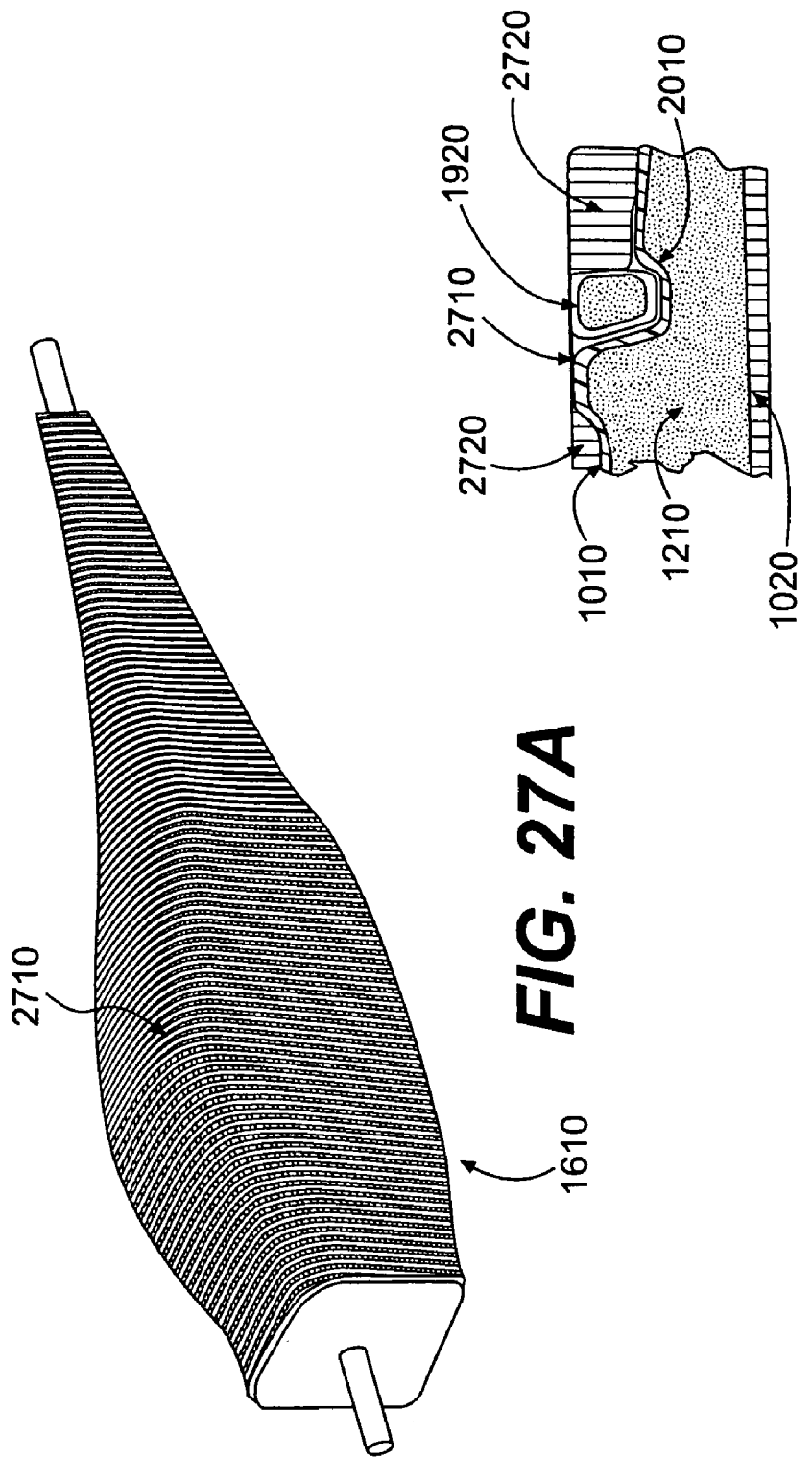
FIG. 27A is a perspective view of a mandrel with a filament-wound inner skin in accordance with an embodiment of the present invention, as shown in FIGS. 21A-21C.
FIG. 27B is a cut-away view of a mandrel with a filament-wound inner skin in accordance with the embodiment of the present invention, as shown in FIG. 27A.

As further shown in FIG. 25, a hoop wrap 2510 may be applied as hoops 2520 to mandrel 1390 by a filament winding machine (not shown here, but shown in FIG. 26). Hoop wrap 2510 is wound circumferentially by the filament winding machine around mandrel 1390, such that space exists between the adjacent hoops 2520. In one implementation, approximately 4 inches of "advance" is used. Advance is the space between subsequent winding paths. In the case of a hoop wrap, advance is the distance between adjacent bands of fiber being placed by the winding machine head. Hoop wrap 2510 is subsequently removed from mandrel 1390 after sufficient filament of desired orientation has been applied to mandrel 1390 to retain frame plies, frame mandrels, and winding aids.

FIG. 26 illustrates applying filament to the mandrel for filament winding of the inner skin by a filament winding machine in accordance with an embodiment of the present invention, as shown in FIG. 25. As shown in FIG. 26, a filament winding machine 2610 applies filament 2620 (such as carbon fiber) to mandrel 1390. In the example shown in FIG. 26, approximately 15% of one internal ply is in place to form the inner skin. In one implementation, when the inner skin is complete a cross-section of the inner skin will be about 0.016 inch thick, over about a 0.250 inch thick core. In this implementation, moreover, frames will generally be about 0.034 inch thick with a height of about 1.25 inch and a width of about 1.75 inch. These dimensions are provided for exemplary purposes and are typical of one fuselage structure for one type of aircraft. Therefore, other implementations may be used, as needed.

As shown in FIG. 26, filament winding machine 2610 is used to apply an inner skin to mandrel 1390. For filament winding of a structure (such as mandrel 1390), a filament winding machine having a capacity of approximately 25 feet in length and a swing of approximately 3 feet is adequate. An acceptable filament winding machine for this purpose is commercially available through vendors, such as Entec in Salt Lake City, Utah. However, other filament winding machines may be used. In one implementation, the wind angle may be close to plus or minus 45 degrees, as practicable. For other implementations, it may be preferable to build a custom winding machine suited for a particular structure being manufactured. Also, in some implementations, during filament winding, it may be necessary to stop and place doubler plies by hand, as needed.

FIG. 27A is a perspective view of a mandrel with a filament-wound inner skin in accordance with an embodiment of the present invention, as shown in FIGS. 21A-21C. As shown in FIG. 27A, mandrel 1610 has been fully wound with inner skin 2710 by filament winding machine 2610 (not shown).

FIG. 27B is a cut-away view of a mandrel with a filament-wound inner skin in accordance with the embodiment of the present invention, as shown in FIG. 27A. As shown in FIG. 27B, filament-wound inner skin 2710 sits atop frame mandrel 1920, which sits atop frame plies 2010, which sits atop bag 1010, which surrounds media 1210, which surrounds armature 1020. Filament wound inner skin 2710 also covers winding aids 2720.

Figure 28:
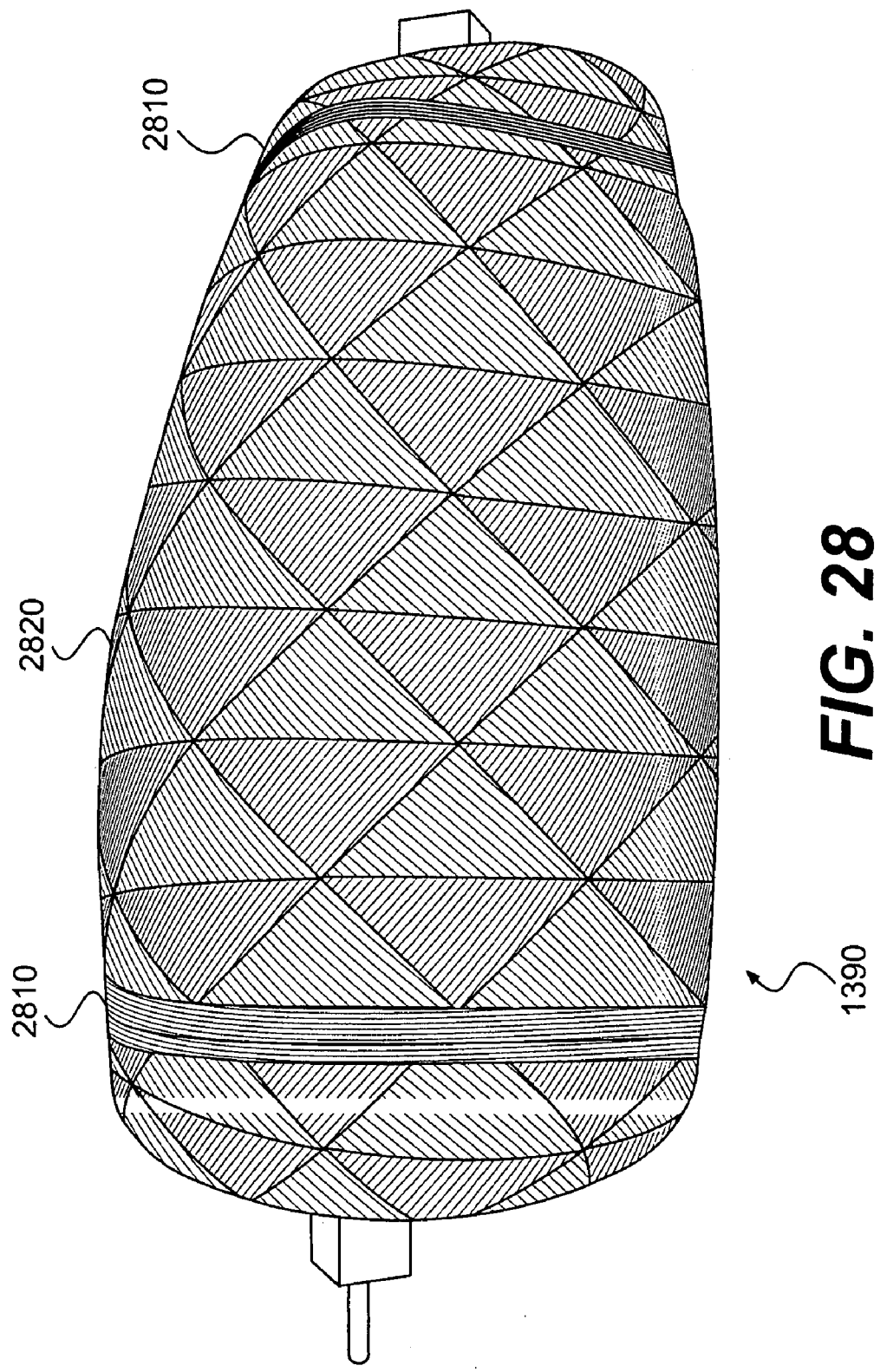
FIG. 28 is a side view of a mandrel with a filament-wound inner skin with external end hoop plies in accordance with an embodiment of the present invention, as shown in FIG. 26.

FIG. 28 is a side view of a mandrel with a filament-wound inner skin with external end hoop plies in accordance with an embodiment of the present invention, as shown in FIG. 26. As shown in FIG. 28, external end hoop plies 2810 are placed around portions of mandrel 1390 over inner skin 2820. External hoop plies 2810 are used to hold inner skin 2810 for cut and drape 911 (described below).

FIGS. 25-28 have described wind inner skin 910, as shown in FIG. 9. As shown in FIG. 9, following wind inner skin 910, cut and drape 911 occurs. Cut and drape 911 is described in FIGS. 29-30B.

Figure 29:
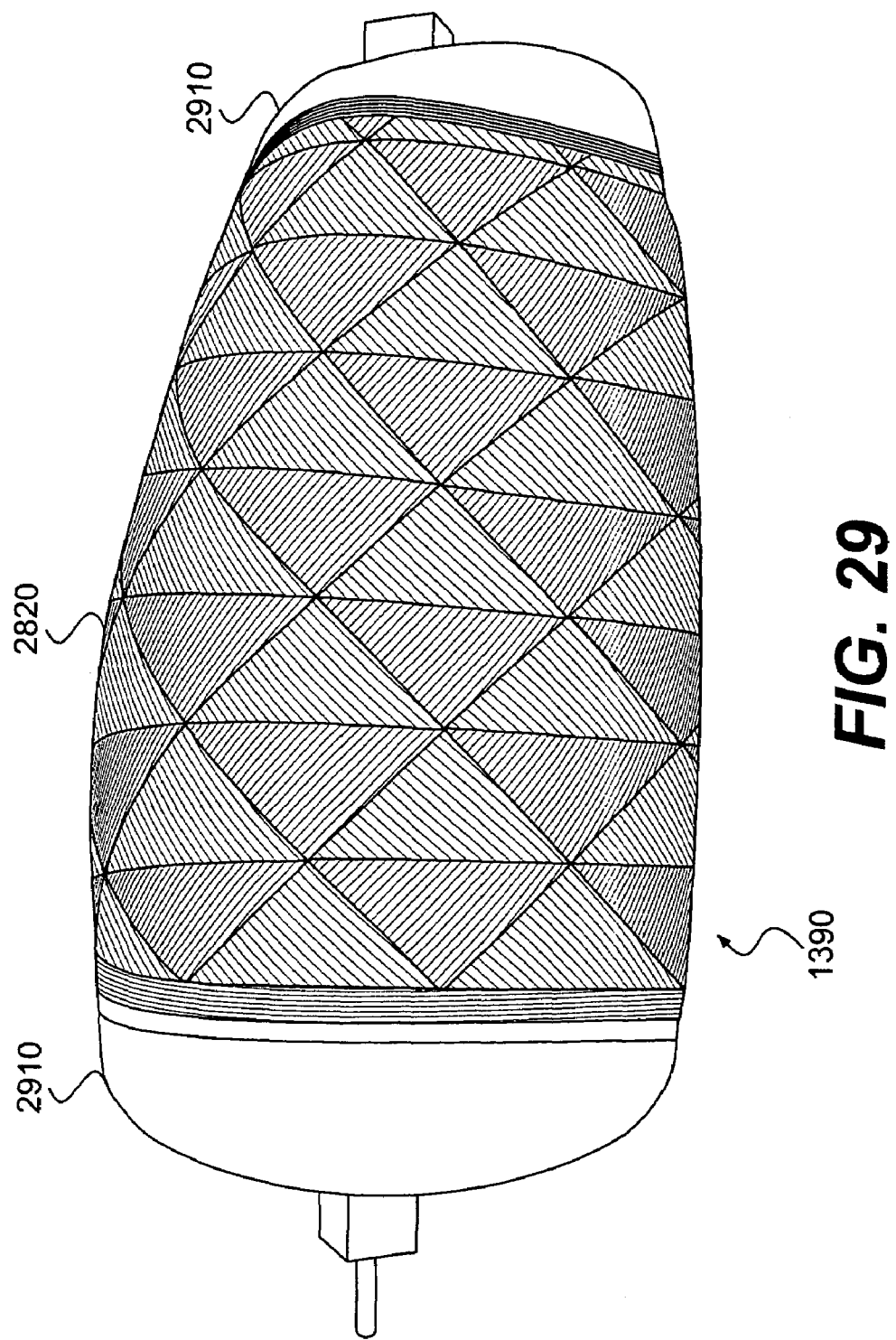
FIG. 29 illustrates cutting a mandrel in accordance with an embodiment of the present invention, as shown in FIG. 9.

FIG. 29 illustrates cutting a mandrel in accordance with an embodiment of the present invention, as shown in FIG. 9. As shown in FIG. 29, ends 2910 have been cut from inner skin 2820 over mandrel 1390. After ends 2910 have been cut, the other portions of mandrel 1390 are cut (as described below).

FIG. 30A is a perspective view of a mandrel with inner skin cut and draped in accordance with an embodiment of the present invention, as shown in FIG. 27A. As shown in FIG. 30A, mandrel 1610 shows inner skin 2710. During cut and drape 911 (as described in FIG. 9), inner skin 2710 is cut in particular locations so that winding aids can be removed (as described in FIG. 17). For example, as shown in FIG. 30A, winding aids include door recess fillers and windshield area fillers. Other winding aids may also include passenger window recess fillers. Additionally, although not shown in FIG. 30A, winding aids 2450 may be used around the winding aids to provide a cutting guide. These winding aids 2450 identify the location of other winding aids. The winding aids 2450 include raised pins, which may be used to position cutting aids for removal of excess material from mandrel 1610.

FIG. 30B is a cut-away view of a mandrel with inner skin that has been cut and draped in accordance with an embodiment of the invention, as shown in FIG. 30A. As shown in FIG. 30B, after cutting inner skin 2710 and removing winding aids in recess areas, joggle areas 3010 are exposed. Inner skin plies 2710 can now be draped into joggle areas 3010. Inner skin plies 2710 are draped into contact with frame plies 2010, frame mandrel 1920, and bag 1010, which surrounds media 1210, which surrounds armature 1020. Thus, following cutting and removal of winding aids (not shown) doubler plies 2020 (not shown) are draped to joggle areas 3010. Doubler plies 2020 are placed over inside corners where skin plies 2710 are cut to allow them to drape into joggled areas. Doubler plies 2020 reinforce the cut inner skin plies 2710. Joggled areas 3010 are normally located around windshields, windows, and door openings. Joggled areas 3010 allow for the windows, the windshield, and the doors to fit flush to the surface of the structure. Alternatively, joggled areas 3010 could be eliminated, where other solutions could be used to make the flush fit. These implementations are merely exemplary, and other implementations may also be used.

FIGS. 29-30B have described cut and drape 911, as shown in FIG. 9. As shown in FIG. 9, following cut and drape 911, place core 912 occurs. Machine core to shape 952 and place core 912 are described in FIGS. 31A-32.

Figure 31A:
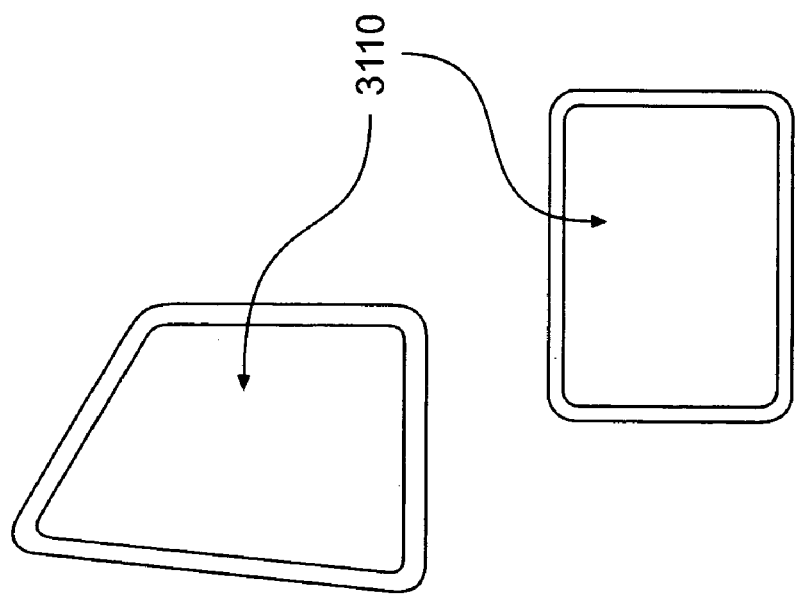
FIG. 31A illustrates machining core in accordance with an embodiment of the present invention, as shown in FIG. 9.

FIG. 31A illustrates machining core in accordance with an embodiment of the present invention, as shown in FIG. 9. As shown in FIG. 31A, core details are machined by cutting a desired peripheral shape from core sheet stock and then chamfering that periphery to provide sandwich material for placement between inner and outer skins of the fuselage to enhance skin buckling strength. Core sheet stock may be prepared to thickness by a core material supplier or it may be cut to desired thickness in a clean environment. Core materials include foam core as well as honeycomb core materials. Foam core materials are made from high temperature thermoplastics that have been foamed using a blowing agent or some other foaming methodology. Honeycomb core materials are made from metal foils or plastic materials (strengthened with natural or synthetic fibers) formed into paper bonded together in such a manner as to resemble natural bee's wax honeycomb. Examples of plastic honeycomb core material include Nomex and Korex materials registered trademarks of Dupont. However, any type of core material may be used for machine core to shape 952.

FIG. 31B is a perspective view of a mandrel with core material in accordance with an embodiment of the present invention, as shown in FIG. 9. As shown in FIG. 31B, mandrel 1610 includes core pieces 3110; which are applied over film adhesive to the outside of inner skin 2710, where inner skin 2710 has been draped into recesses in mandrel 1610. Core pieces 3110 are used to prevent skin buckling. Core pieces 3110 also help to retain a desired structural shape.

FIG. 31C is a cut-away view of a mandrel with core details in accordance with an embodiment of the present invention, as shown in FIG. 31A. As shown in FIG. 31C, a core piece 3110 is placed in a recess created in mandrel 1610. Core piece 3110 sits atop inner skin 2710, which sits atop bag 1010, which sits atop media 1210, which sits atop armature 1020. Core pieces 3110 can be placed on inner skin plies 2710 with or without film adhesive. The use of film adhesive may be needed, if the winding resin being used does not have adhesive properties.

Figure 32:
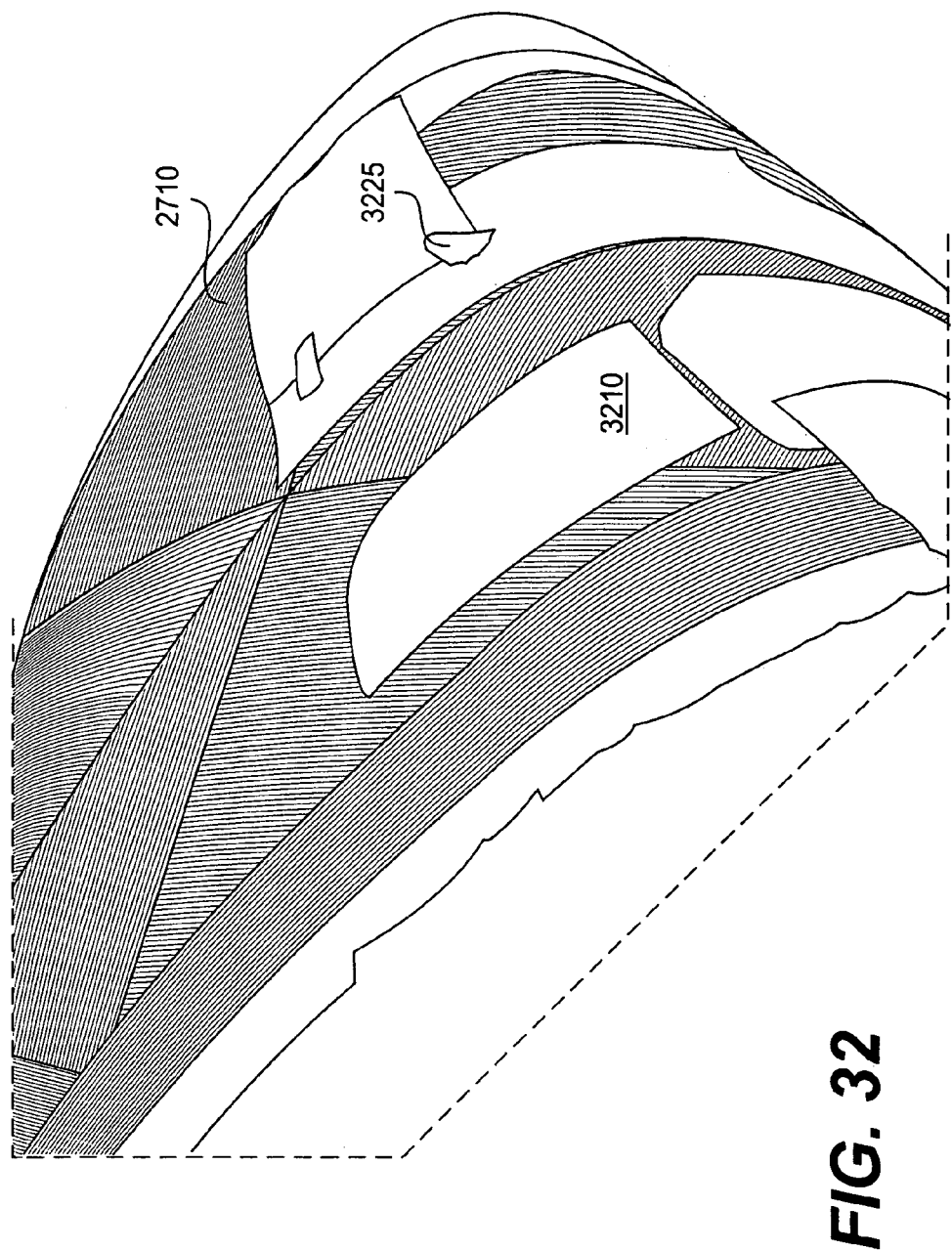
FIG. 32 illustrates a portion of a mandrel with film adhesive covering core material in accordance with an embodiment of the present invention, as shown in FIGS. 31A-31B.

FIG. 32 illustrates a portion of a mandrel with film adhesive covering core material in accordance with an embodiment of the present invention, as shown in FIGS. 31A-31B. As shown in FIG. 32, core pieces 3110 include core material with film adhesive 3210 and core material without adhesive (not shown). Separator film 3225 may also be placed on the inner skin. Separator film 3225, which is placed to aid manufacture, such as, when it is time to remove excess material and to drape any joggle areas 3010.

FIGS. 31A-32 have described place core 912, as shown in FIG. 9. As shown in FIG. 9, following place core 912, wind outer skin 914 occurs. Wind outer skin 914 is described in FIGS. 33-35.

Figure 33:
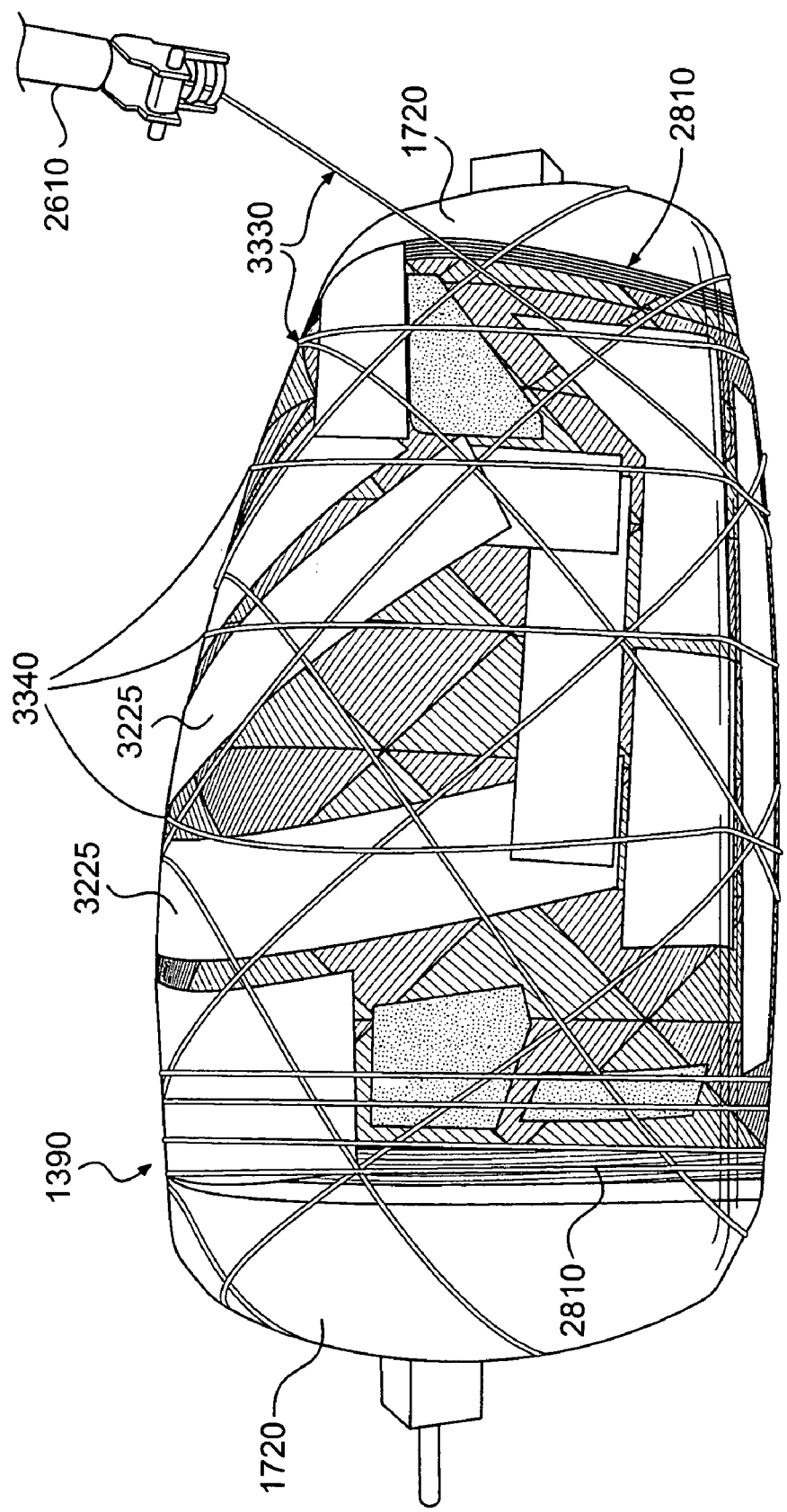
FIG. 33 illustrates preparing a mandrel for application of an outer skin by a filament winding machine in accordance with an embodiment of the present invention, as shown in FIG. 9.

FIG. 33 illustrates preparing a mandrel for application of an outer skin by a filament winding machine in accordance with an embodiment of the present invention, as shown in FIG. 9. As shown in FIG. 33, mandrel 1390 includes end domes 1720, separator film 3225, and end hoop wraps 2810. End domes 1720 are used to provide a convex surface. Separator film 3225 is used around the joggle areas to aid in removal of winding aids in joggle recesses. External end hoop wraps 2810 are used around mandrel 1390 to hold inner skin plies 2630 in place. Further, as shown in FIG. 33, filament for outer skin 3330 has begun to be applied to mandrel 1390 by filament winding machine 2610. Further, hoop wrap 3340 may be applied to mandrel 1390 by hand or by filament winding machine 2610. Hoop wrap 3340 is wound circumferentially such that gaps exists between successive wraps but close enough together to hold assorted winding aids in their correct locations.

Figure 34:
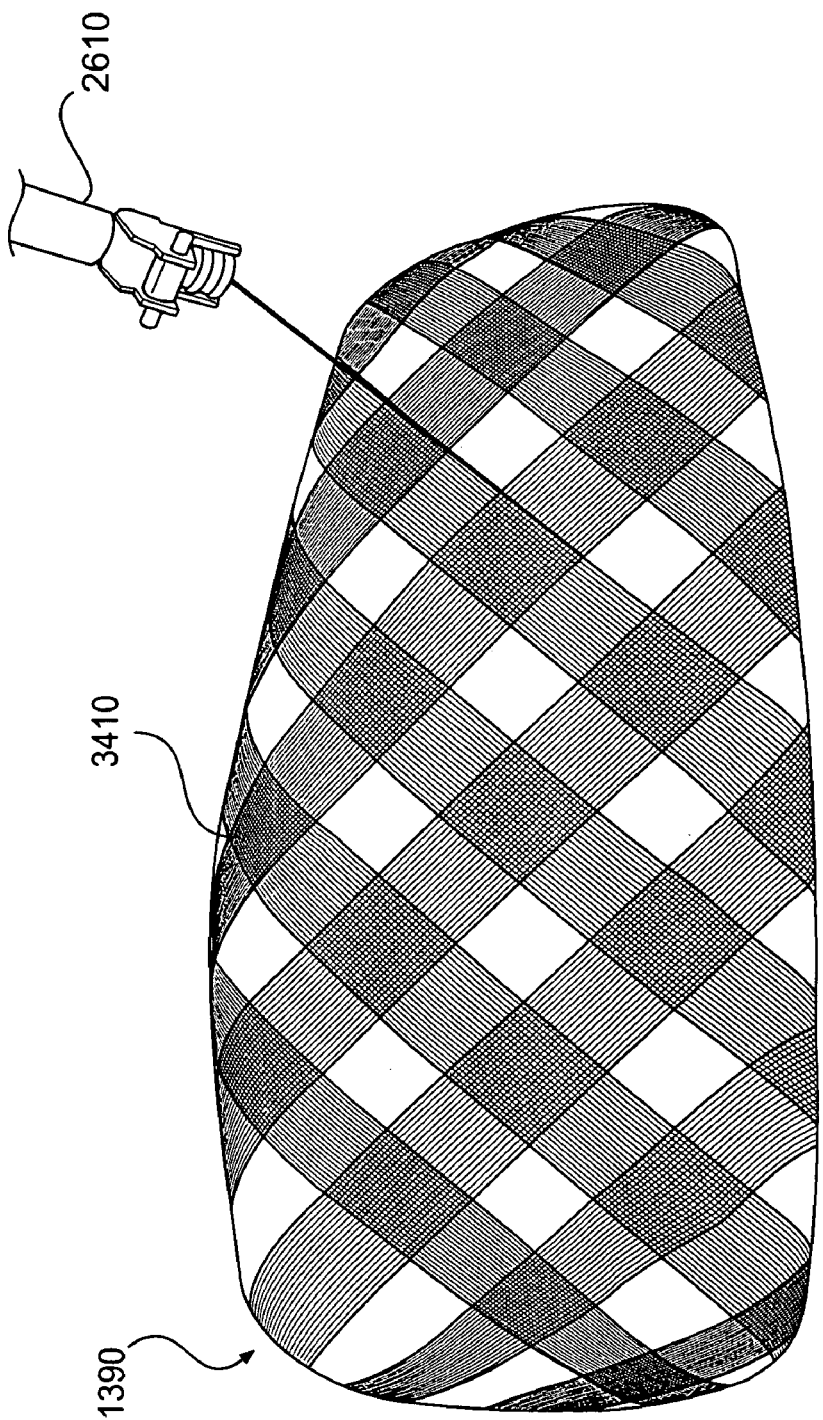
FIG. 34 illustrates applying an outer skin to a mandrel by a filament winding machine in accordance with an embodiment of the present invention, as shown in FIG. 33.
Figure 35:
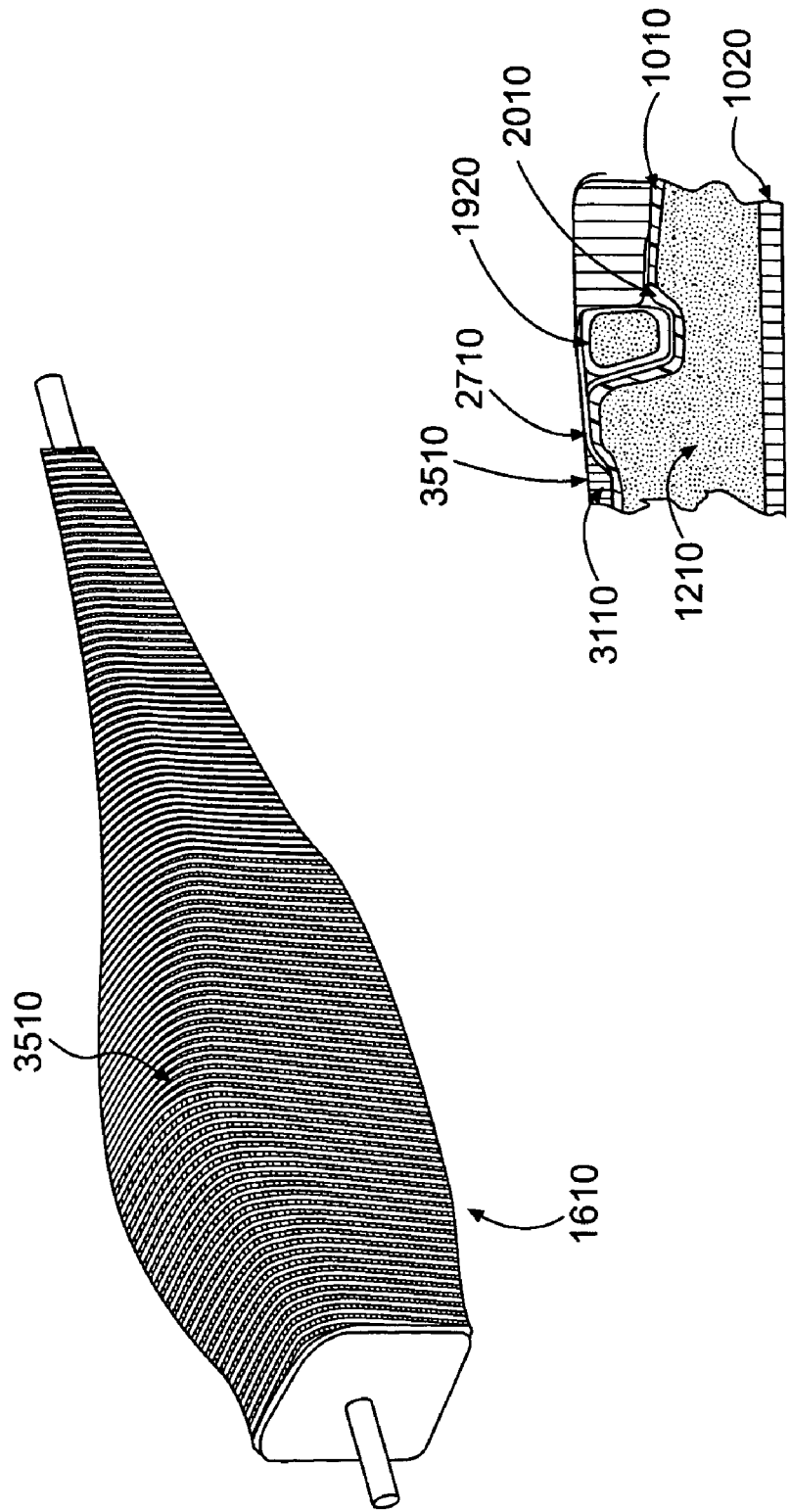
FIG. 35A is a perspective view of a mandrel with a filament wound outer skin in accordance with an embodiment of the present invention, as shown in FIG. 9.
FIG. 35B is a cut-away view of a mandrel with a filament wound outer skin in accordance with an embodiment of the present invention, as shown in FIG. 35A.
Figure 36:
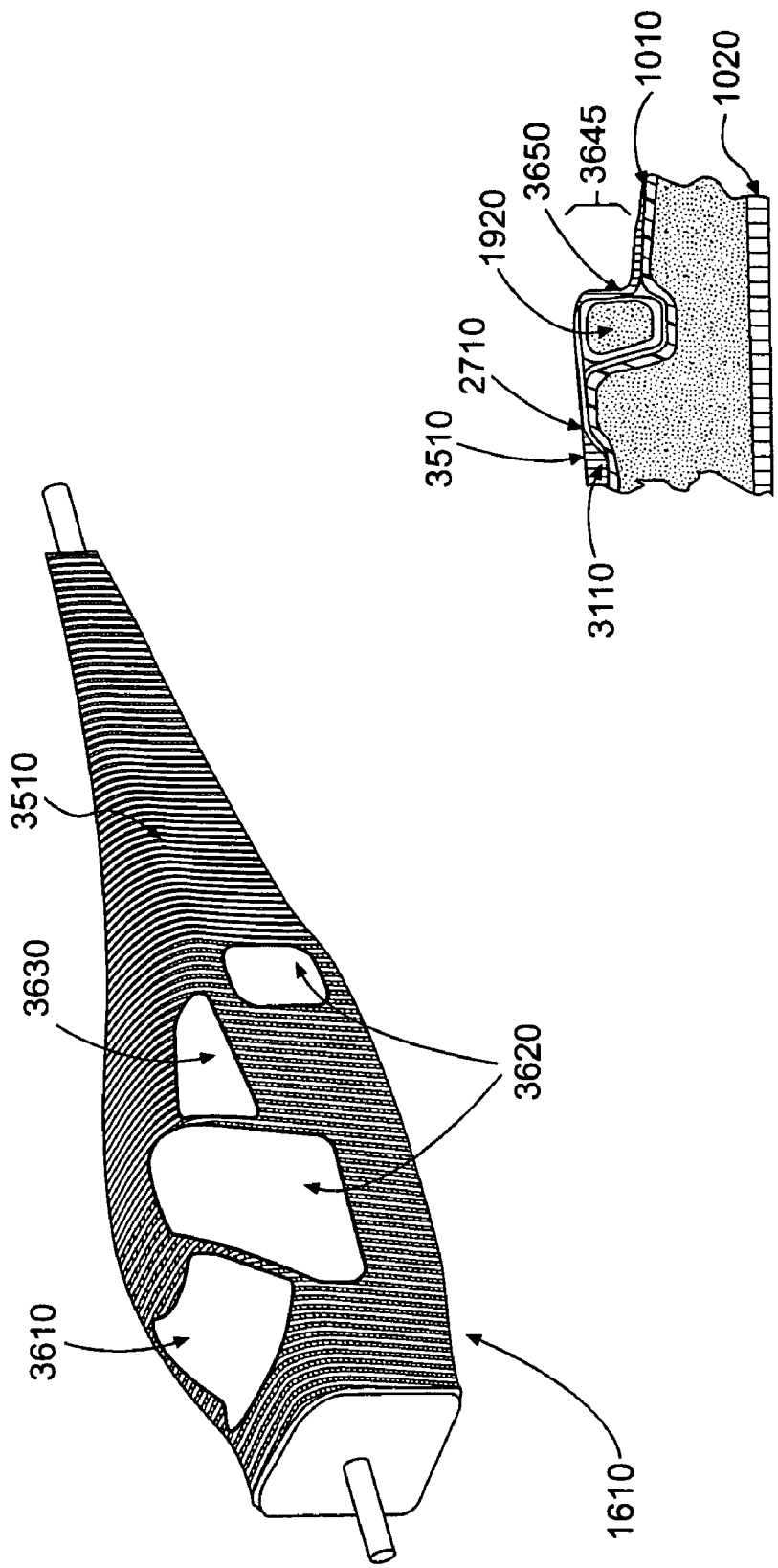
FIG. 36A is a perspective view of a mandrel with outer skin cut and draped in accordance with an embodiment of the present invention, as shown in FIG. 9.
FIG. 36B is a cut-away view of a mandrel with outer skin that has been cut and draped in accordance with an embodiment of the invention, as shown in FIG. 36A.

FIG. 34 illustrates applying an outer skin to a mandrel by a filament winding machine in accordance with an embodiment of the present invention, as shown in FIG. 33. As shown in FIG. 34, filament winding machine 2610 wraps mandrel 1390 in filament for outer skin 3410. In this example, filament winding machine 2610 is at about in a 25% finished state, with outer skin 3410 applied to mandrel 1390. In one implementation, outer skin 3410 includes two plies. Alternatively, in another implementation, filament winding machine 2610 may wind an outer skin 3410 that is twice as thick. Other implementations may have other plies or other layers.

FIG. 35A is a perspective view of a mandrel with a filament wound outer skin in accordance with an embodiment of the present invention, as shown in FIG. 9. As shown in FIG. 35A, filament winding machine 2610 (not shown) applies outer skin 3510 to mandrel 1610. As also shown in FIG. 35A, filament winding machine 2610 may apply an outer skin to a large area, which may be larger than just a fuselage cabin (e.g., to include a tail cone 106).

FIG. 35B is a cut-away view of a mandrel with a filament wound outer skin in accordance with an embodiment of the present invention, as shown in FIG. 35A. As shown in FIG. 35B, outer skin 3510 has been placed over core pieces 3110, inner skin 2710, frame mandrel 1920, and other winding aids. Core piece 3110 sits atop inner skin 2710, which sits atop bag 1010, which sits atop media 1210, which sits atop armature 1020.

As shown in FIG. 9, following wind outer skin 913, cut and drape 914 occurs. Cut and drape 914 is described in FIGS. 36A-37.

FIG. 36A is a perspective view of a mandrel with outer skin cut and draped in accordance with an embodiment of the present invention, as shown in FIG. 9. As shown in FIG. 36A, mandrel 1610 shows outer skin 3510. During cut and drape 914 (as described in FIG. 9), outer skin 3510 is cut in particular locations so that winding aids can be removed. For example, as shown in FIG. 36A, winding aids that are removed include windshield winding aid 3610, door winding aids 3620, and window winding aid 3630.

FIG. 36B is a cut-away view of a mandrel with outer skin that has been cut and draped in accordance with an embodiment of the invention, as shown in FIG. 36A. As shown in FIG. 36B, after cutting outer skin 3510 and removing winding aids in recess areas joggle area 3645 is exposed. Outer skin plies 3510 can now be draped into joggle area 3645. Outer skin plies are draped into contact with inner skin 2710, which has already been formed into joggle area 3645. Inner skin plies contact frame plies 2010, frame mandrel 1920 and bag 1010, which surrounds media 1210, which surrounds armature 1020. Thus, following cutting and removal of winding aids (not shown) doubler plies 2020 (not shown) are draped to joggle area 3645. Doubler plies 2020 are placed over inside corners where outer skin plies 3510 are cut to allow them to drape into joggled areas. Doubler plies 2020 reinforce the cut outer skin plies 3510. Joggled areas 3645 are normally located around windshields, windows, and door openings. Joggled areas 3645 allow for the windows, the windshield, and the doors to fit flush to the surface of the structure. Alternatively, joggled areas 3645 could be eliminated, where other solutions could be used to make the flush fit. For example, frames could include joggle areas 3645, rather than using plies, such as doubler plies 2020.

Figure 37:
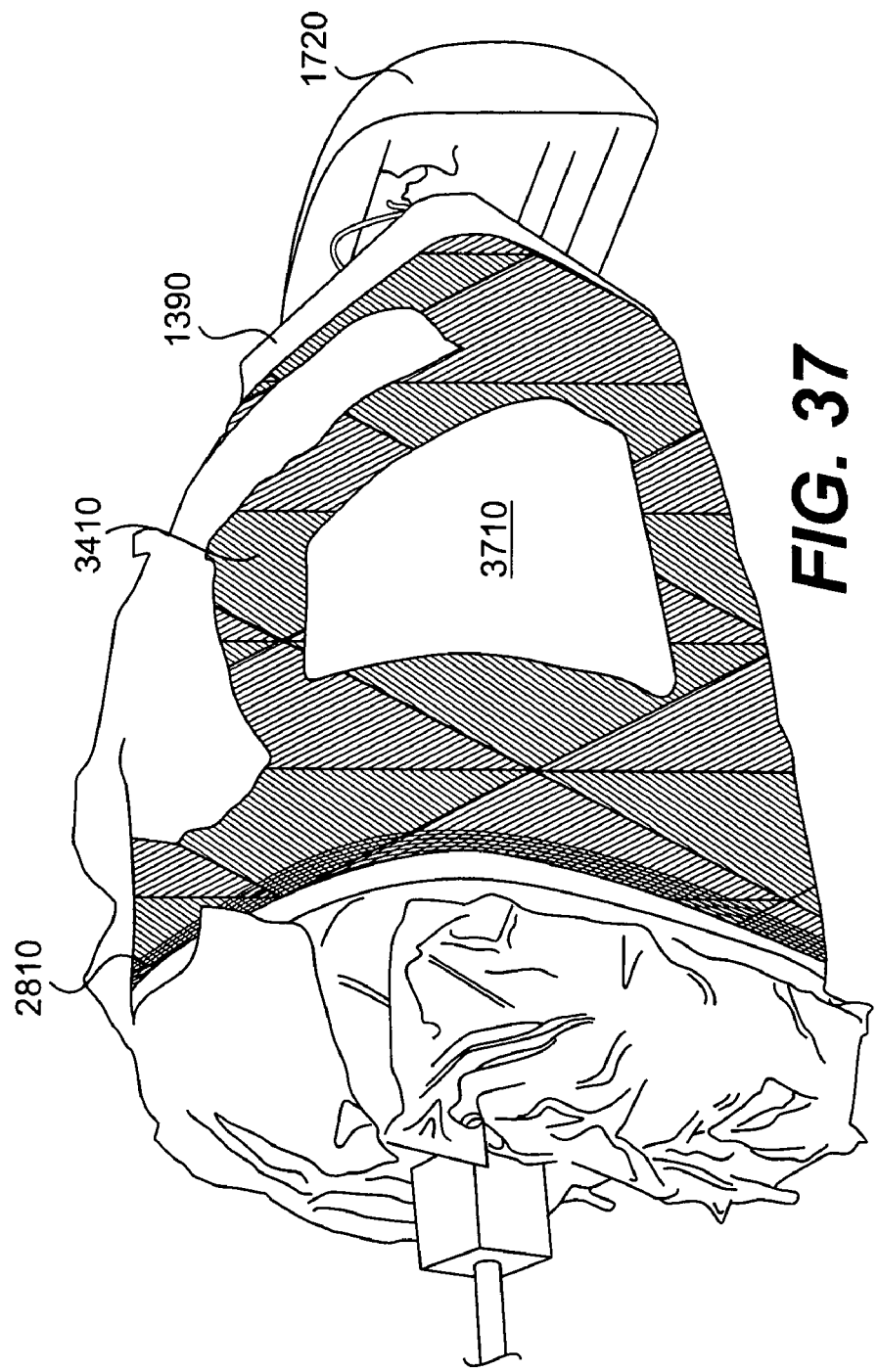
FIG. 37 illustrates the mandrel after cutting and draping of the outer skin in accordance with an embodiment of the present invention, as shown in FIG. 33.

FIG. 37 illustrates the mandrel after cutting and draping of the outer skin in accordance with an embodiment of the present invention, as shown in FIG. 33. As shown in FIG. 37, mandrel 1390 is shown with outer skin 3410 cut and draped into door joggle area 3710. Separator film 3225 (not shown) has been removed from between inner skin 2630 and outer skin 3410 to allow cutting and draping of outer skin 3410 into door joggle area 3710. Separator film 3225 is any low cost thermoplastic film the most prevalent being polyethylene and nylon. Other films may be used including FEP, PTFE, and ECTFE. External end hoop plies 2810 are retaining outer skin 3410 and inner skin 2710 to mandrel 1390. End domes 1720 can now be removed from both ends of mandrel 1390.

As shown in FIG. 9, following cut and drape 914, close mold 915 occurs. Close mold 915 is described in FIGS. 38A-39D.

Figures 38A, 38B:
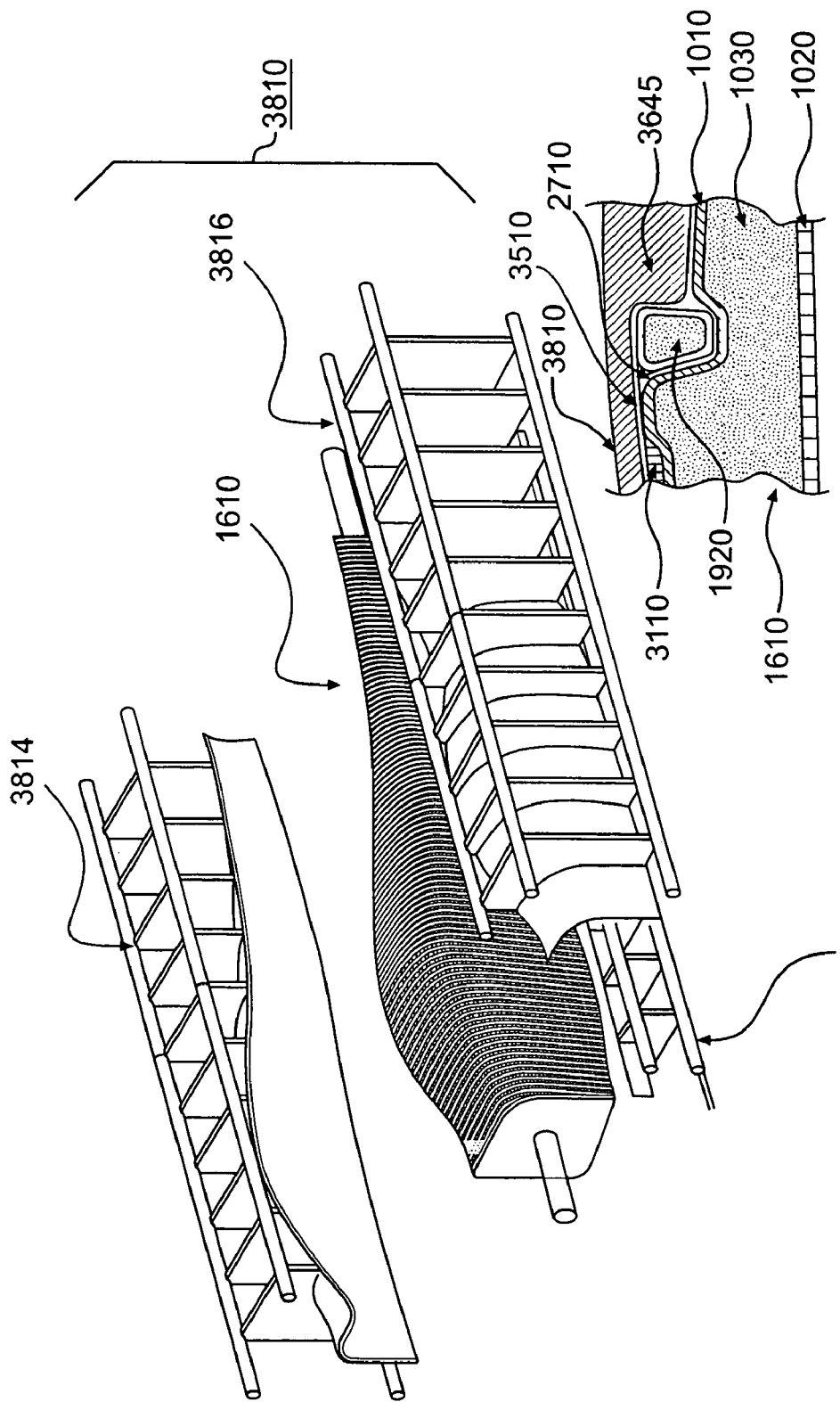
FIG. 38A illustrates preparing a circumferential mold for a mandrel in accordance with an embodiment of the present invention, as shown in FIG. 9.
FIG. 38B is a cut-away view of a mandrel in the circumferential mold in accordance with an embodiment of the present invention.

FIG. 38A illustrates preparing a circumferential mold for a mandrel in accordance with an embodiment of the present invention, as shown in FIG. 9. As shown in FIG. 38, circumferential mold 3810 may include several pieces (described below). Circumferential mold 3810 may be placed on the exterior of mandrel 1610. In one implementation, circumferential mold 3810 is approximately 20 feet long, 4 feet wide, and 6 feet high. In this implementation, circumferential mold 3810 consists of three pieces: (1) lower circumferential mold section 3812, (2) left top circumferential mold section 3814, and (3) right top circumferential mold section 3816. In other implementations, circumferential mold 3810 may be one piece, two pieces, or more than three pieces. These implementations are merely exemplary, and other implementations may also be used.

FIG. 38B is a cut-away view of a mandrel in the circumferential mold in accordance with an embodiment of the present invention. As shown in FIG. 38B, circumferential mold 3810 is closed over mandrel 1610. Circumferential mold 3810 covers all portions of mandrel 1610, including outer skin 3510 and outer joggle recesses 3645. Once circumferential mold 3810 has been closed, a vacuum may be applied, so that all air is removed between outer skin 3510 and inner skin 2710, between outer skin 3510 and core piece 2060, between inner skin 2710 and bag 1010, and between inner skin 2710 and frame mandrel 1920, among other areas. Additionally, pressurization may be used with a vacuum. In this implementation, enclosed cavity 1030 containing media 1210 is pressurized. Between two and three atmospheres are generally adequate for pressurization, although pressure may vary depending upon the particular application. If pressurization is used, during cut and drape 911 and/or cut and drape 914, cuts should be done to allow for expansion during pressurization. In both of these implementations, the frame mandrels 1920 may be placed under vacuum to maintain their shape (described below).

Figure 39A:
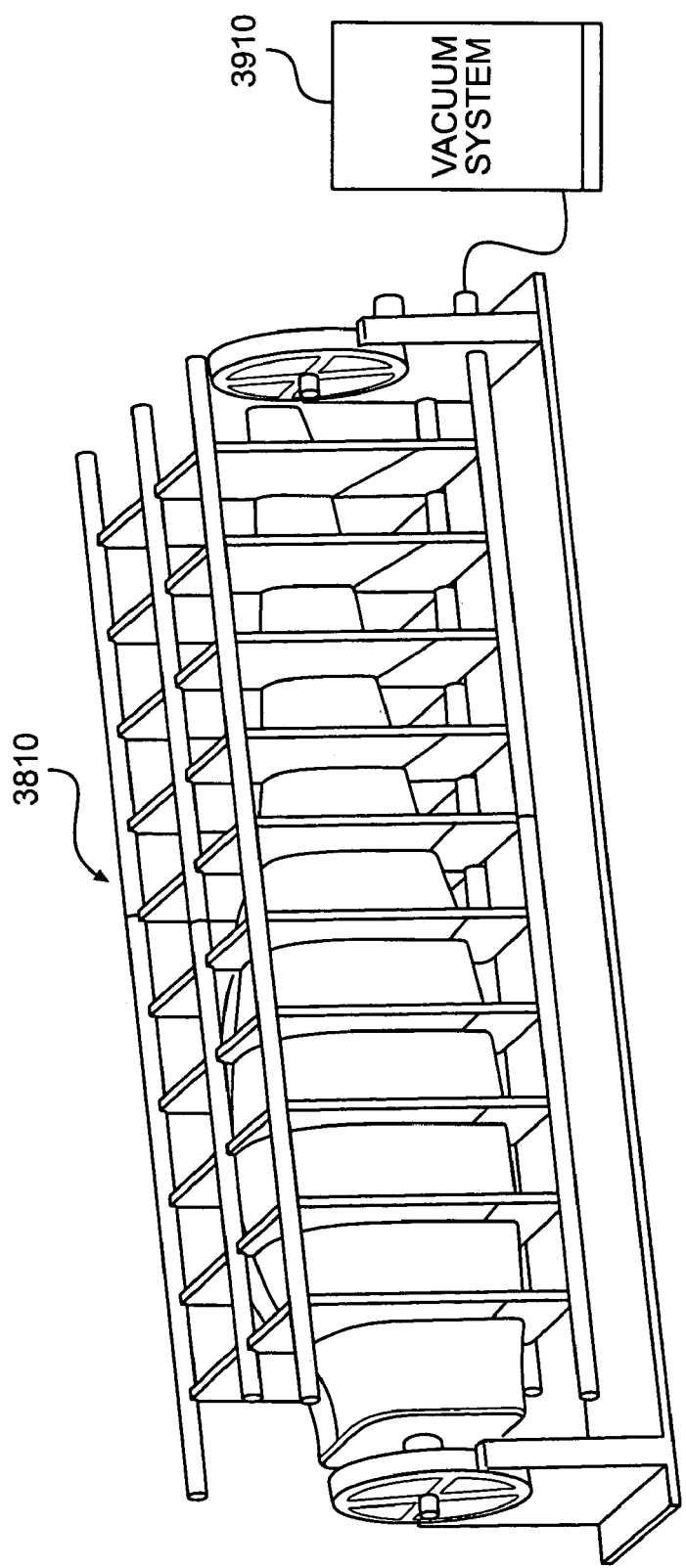
FIG. 39A illustrates preparing a circumferential mold with a vacuum system for the frame mandrels during curing in accordance with an embodiment of the present invention, as shown in FIGS. 38A-38B.

FIG. 39A illustrates preparing a circumferential mold with a vacuum system for the frame mandrels during curing in accordance with an embodiment of the present invention, as shown in FIGS. 38A-38B. As shown in FIG. 39A, vacuum system 3910 may be used so that frame mandrels (not shown here, but shown in FIG. 39B) maintain the proper shape. For vacuum system 3910, internal plumbing (not shown) is needed. Standard vacuum plumbing may accomplish these tasks.

Figure 39B:
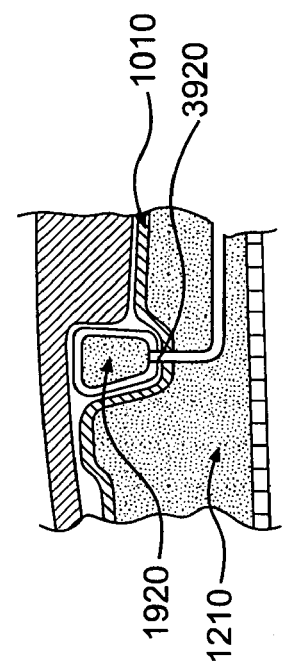
FIG. 39B illustrates a cut-away of the mandrel in the circumferential mold with a vacuum system for the frame mandrels in accordance with an embodiment of the present invention, as shown in FIG. 39A.

FIG. 39B illustrates a cut-away of the mandrel in the circumferential mold with a vacuum system for the frame mandrels in accordance with an embodiment of the present invention, as shown in FIG. 39A. Vacuum system 3910-provides for pulling a vacuum, using piping which starts at end plates (not shown), continues through media 1210, and goes to bag 1010, which then goes to a vacuum port 3920. Thus, a vacuum is transmitted to the frame mandrels, such as frame mandrel 1920, through vacuum port 3920, which may be installed when the frame mandrels are positioned in mandrel 1610.

Figure 39C:
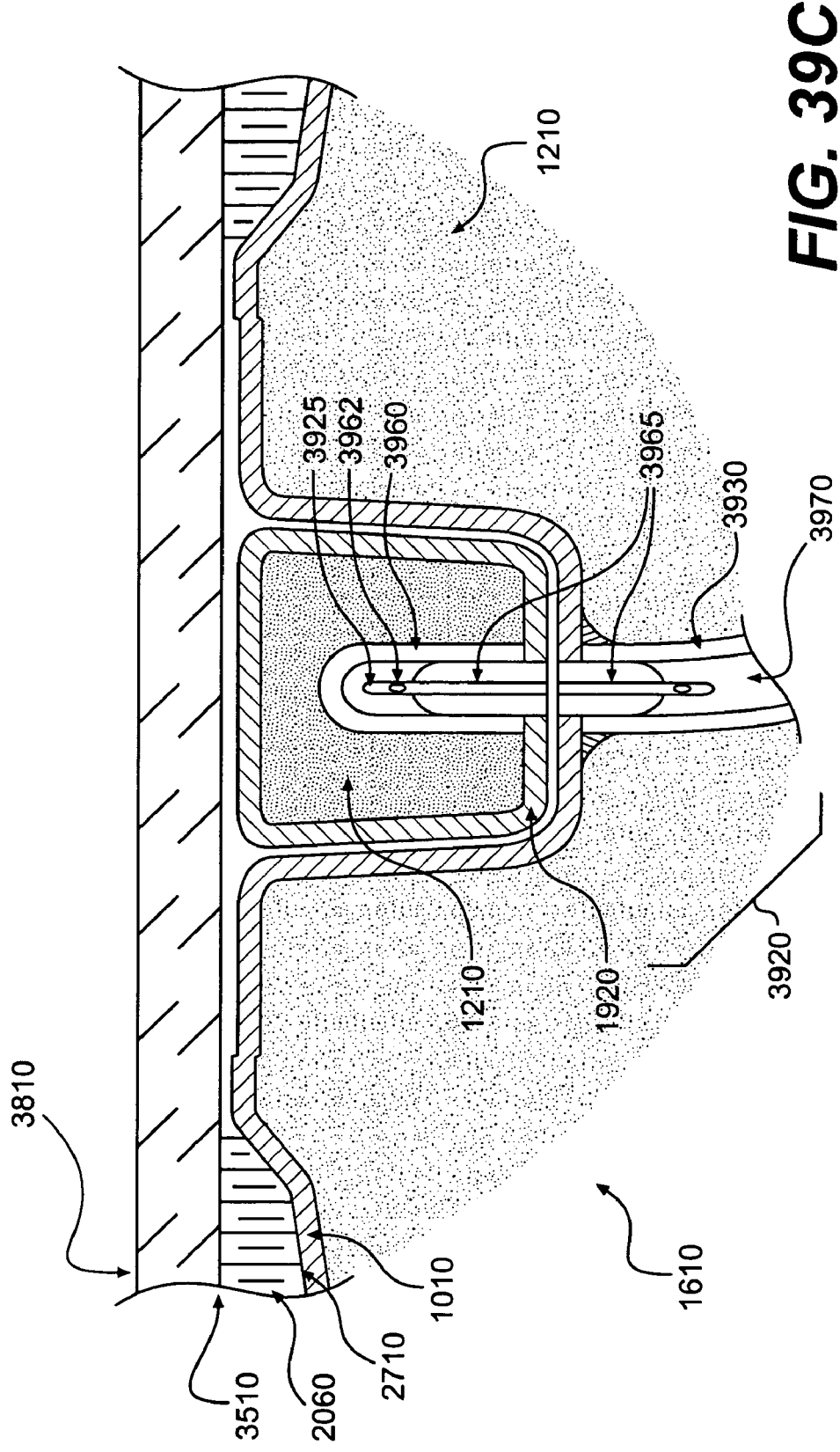
FIG. 39C illustrates a vacuum port in a frame mandrel in accordance with an embodiment of the present invention, as shown in FIGS. 39A and 39B.

FIG. 39C illustrates a vacuum port in a frame mandrel in accordance with an embodiment of the present invention, as shown in FIGS. 39A and 39B. As shown in FIG. 39C, vacuum port 3920 is a couple between the interior of frame mandrel 1920 and vacuum source tube 3970. Vacuum from vacuum source tube 3970 is extended into the interior of frame mandrel 1920, which has media 1210 inside, through double-ended needle 3925. Double-ended needle 3925 passes through valve 3965 in frame mandrel 1920 and valve 3965 in mandrel 1610. Because frame mandrel 1920 is filled with media 1210 it is necessary to equip frame mandrel with filtering device 3960 to prevent media 1210 from plugging double ended needle 3925.

Figure 39D:
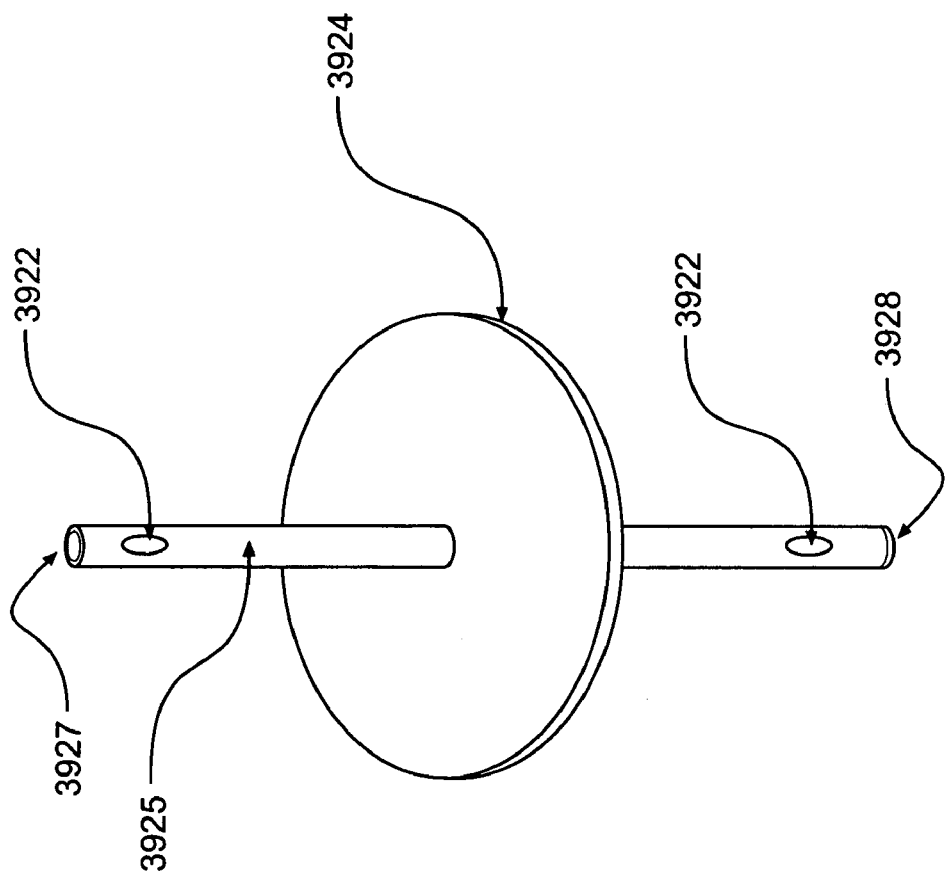
FIG. 39D illustrates a device for maintaining a vacuum in a frame mandrel in accordance with an embodiment of the present invention, as shown in FIGS. 39B and 39C.

FIG. 39D illustrates a device for maintaining a vacuum in a frame mandrel in accordance with an embodiment of the present invention, as shown in FIGS. 39B and 39C. As shown in FIG. 39C, vacuum port 3920 includes a double ended inflation needle 3925, of such a length that one end of needle 3925 when inserted into a valve 3965 in frame mandrel 1920 extends into air space 3962 and the other end inserted into a valve 3965 in mandrel 1610 extends into vacuum source tube 3970. Further, needle 3925 is modified at ends 3927, 3928 with side holes 3922 to prevent end plugging and further comprises a disk 3924 located approximately at the mid-point of needle 3925 to guard against end plugging by sealing end 3927 against the filtering device 3960.

As shown in FIG. 9, following close mold 915, cure 916 occurs. Cure 916 is described in FIG. 40.

Figure 40:
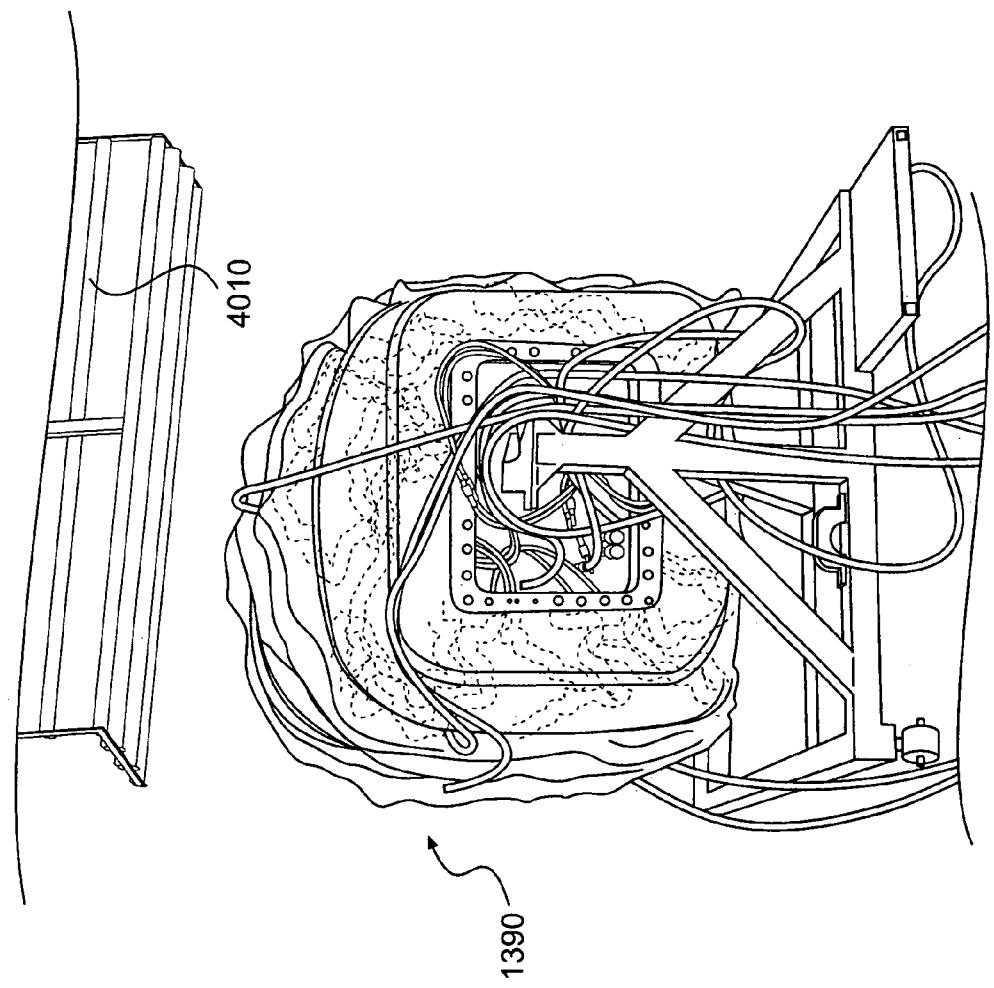
FIG. 40 illustrates curing a filament wound mandrel in a circumferential mold in an oven in accordance with an embodiment of the present invention, as shown in FIG. 9.

FIG. 40 illustrates curing a filament wound mandrel in a circumferential mold in an oven in accordance with an embodiment of the present invention, as shown in FIG. 9. As shown in FIG. 40, in one implementation, circumferential mold 3810 is placed in oven 4010. In this implementation, oven heat cures the composite materials on mandrel 1390 against circumferential mold 3810. Alternatively, heat can be applied using integral heating methods, such as circulating heated liquid through tubes within circumferential mold 3810. Alternatively, heat can also be used inside enclosed cavity 1030 to cure the composite material. Indeed, any type of oven or any type of heat can be used to cure composite material inside circumferential mold 3810.

As shown in FIG. 9, following cure 916, de-mold 917 occurs. De-mold 917 is described in FIGS. 41-45. De-mold 917 includes removing circumferential mold 3810, as described in FIG. 41, removing media 1210, as described in FIG. 42, removing armature 1020, as described in FIG. 43, removing bag 1010, as described in FIG. 44, and making bag 1020 available for reuse, as described in FIG. 45.

Figure 41:
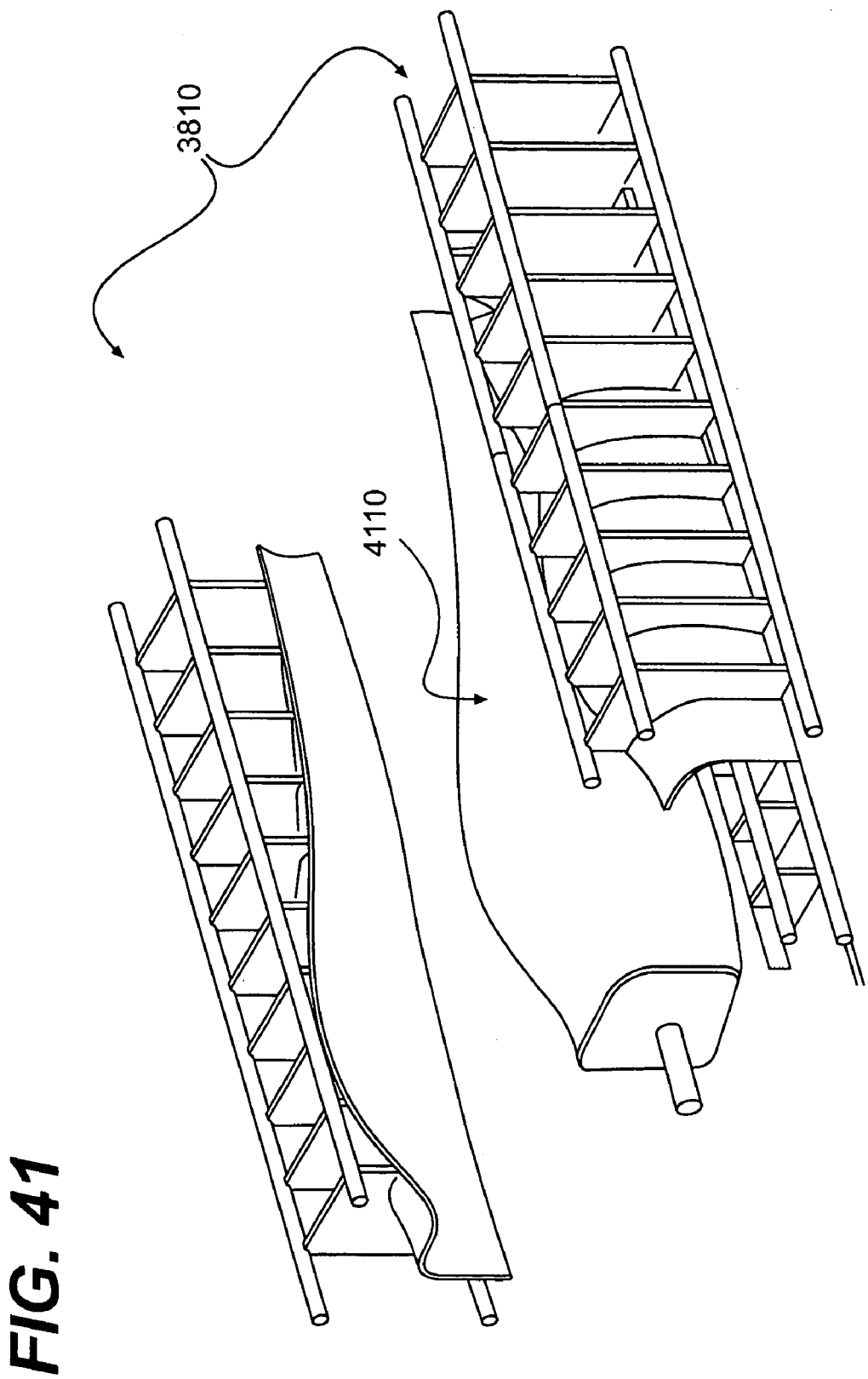
FIG. 41 illustrates removing a circumferential mold from around a one-piece integrally stiffened fuselage on a mandrel in accordance with an embodiment of the present invention, as shown in FIG. 9.

FIG. 41 illustrates removing a circumferential mold from around a one-piece integrally stiffened fuselage on a mandrel in accordance with an embodiment of the present invention, as shown in FIG. 9. As shown in FIG. 41, fuselage 4110 is removed from circumferential mold 3810. In one implementation, removal of circumferential mold 3810 occurs after fuselage 4110 has been allowed to cool sufficiently, for example, to below 150° F. For this implementation after mandrel 160 has cooled, a vacuum and/or pressure is also released. Other implementations may be used.

Figure 42:
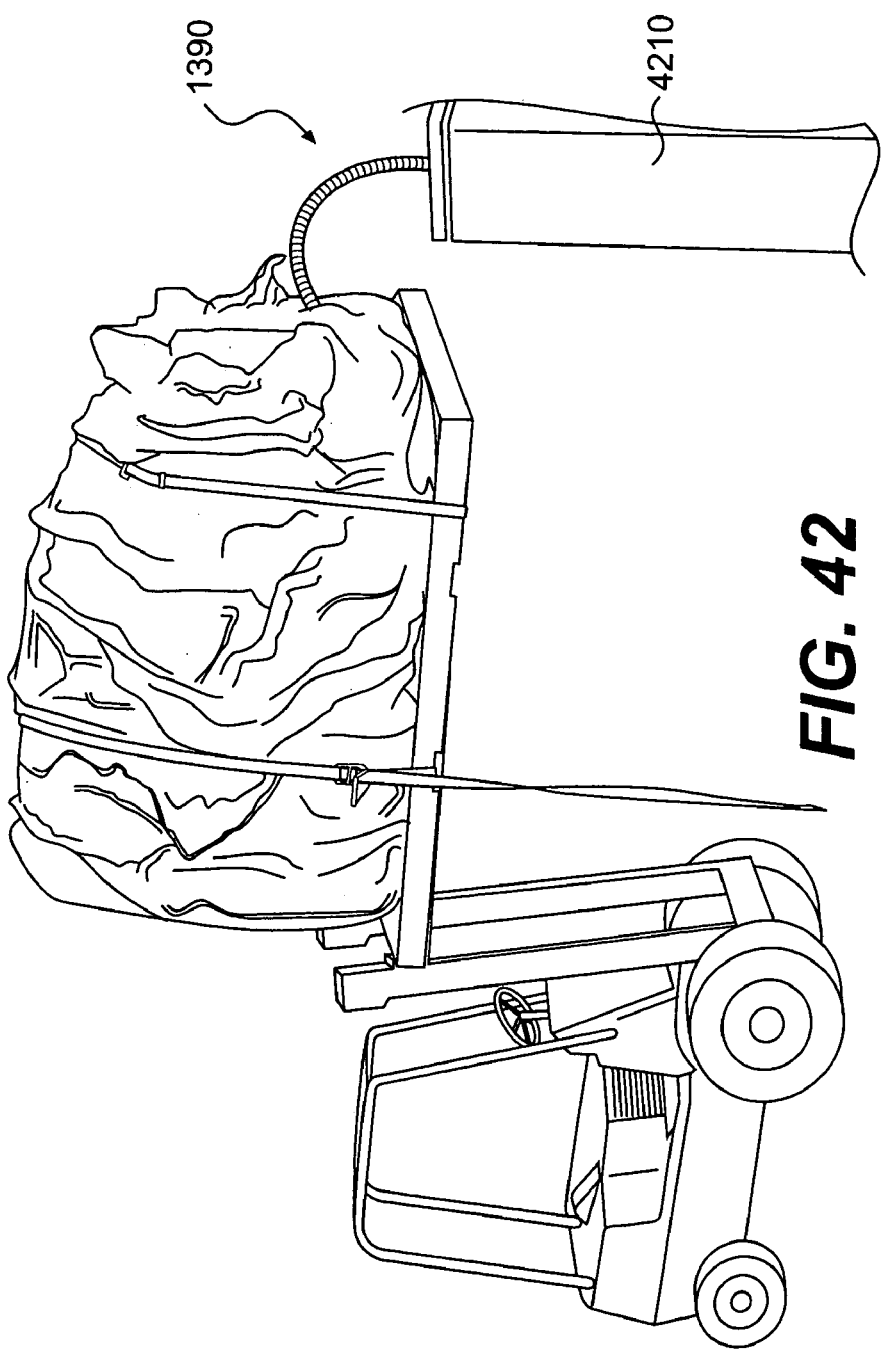
FIG. 42 illustrates removing media from a mandrel in accordance with an embodiment of the present invention, as shown in FIG. 9.

FIG. 42 illustrates removing media from a mandrel in accordance with an embodiment of the present invention, as shown in FIG. 9. As shown in FIG. 42, mandrel 1390 is inside one-piece integrally stiffened fuselage cabin, which in turn is inside circumferential mold 3810. In one implementation, a vacuum 4210 removes media through fill ports (not shown) in end plates 1380 (also not shown). In this implementation, after removal of media from mandrel 1390, armature 1320 is removed from mandrel 1390 (not shown), and armature 1320 may then be reused. Other implementations may be also used.

Figure 43:
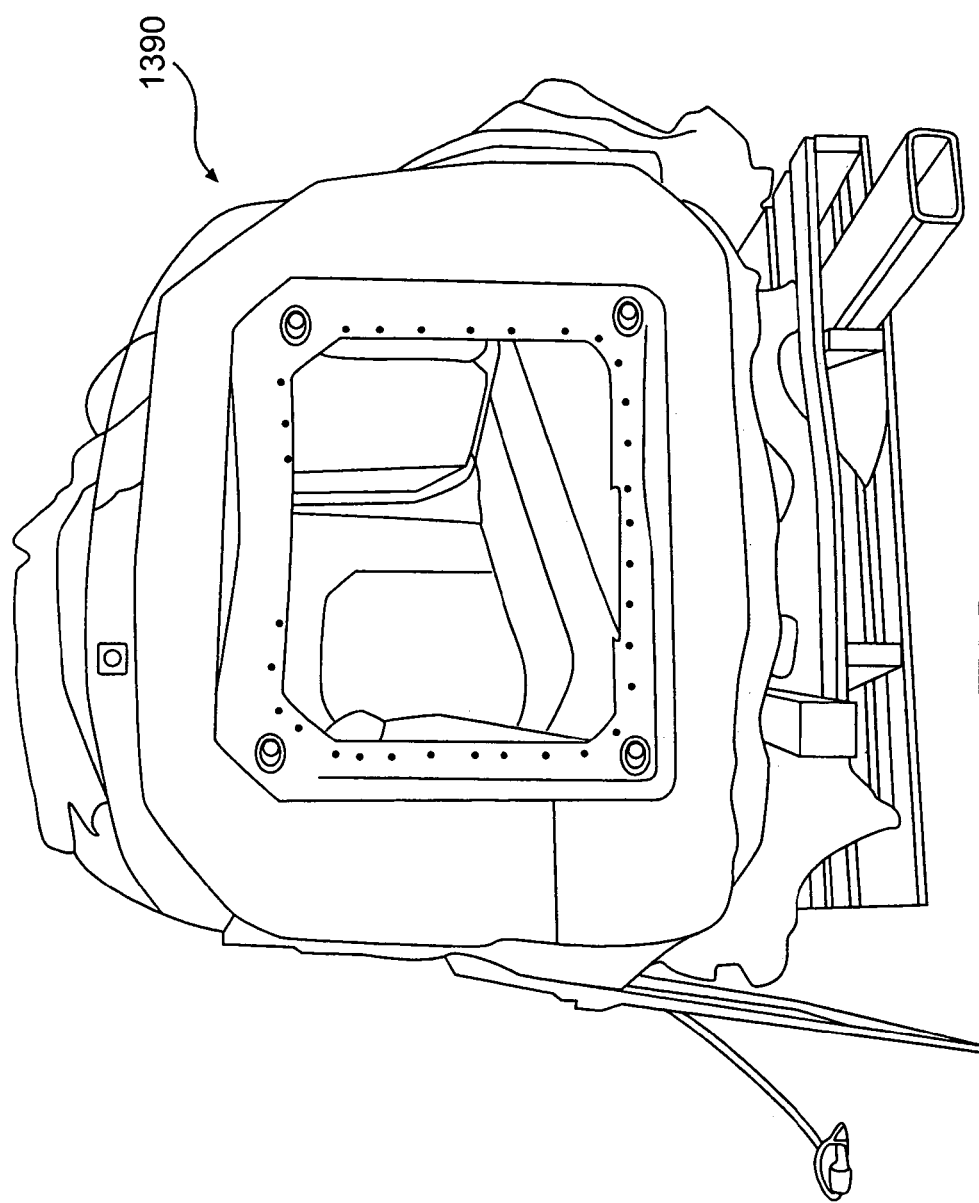
FIG. 43 illustrates a one-piece integrally stiffened fuselage contained in a circumferential mold after removal of media and armature in accordance with one embodiment of the present invention as shown in FIG. 42.

FIG. 43 illustrates a one-piece integrally stiffened fuselage contained in a circumferential mold after removal of media and armature in accordance with one embodiment of the present invention as shown in FIG. 42. As shown in FIG. 43, media and armature 1320 (not shown) have been removed from mandrel 1390.

Figure 44:
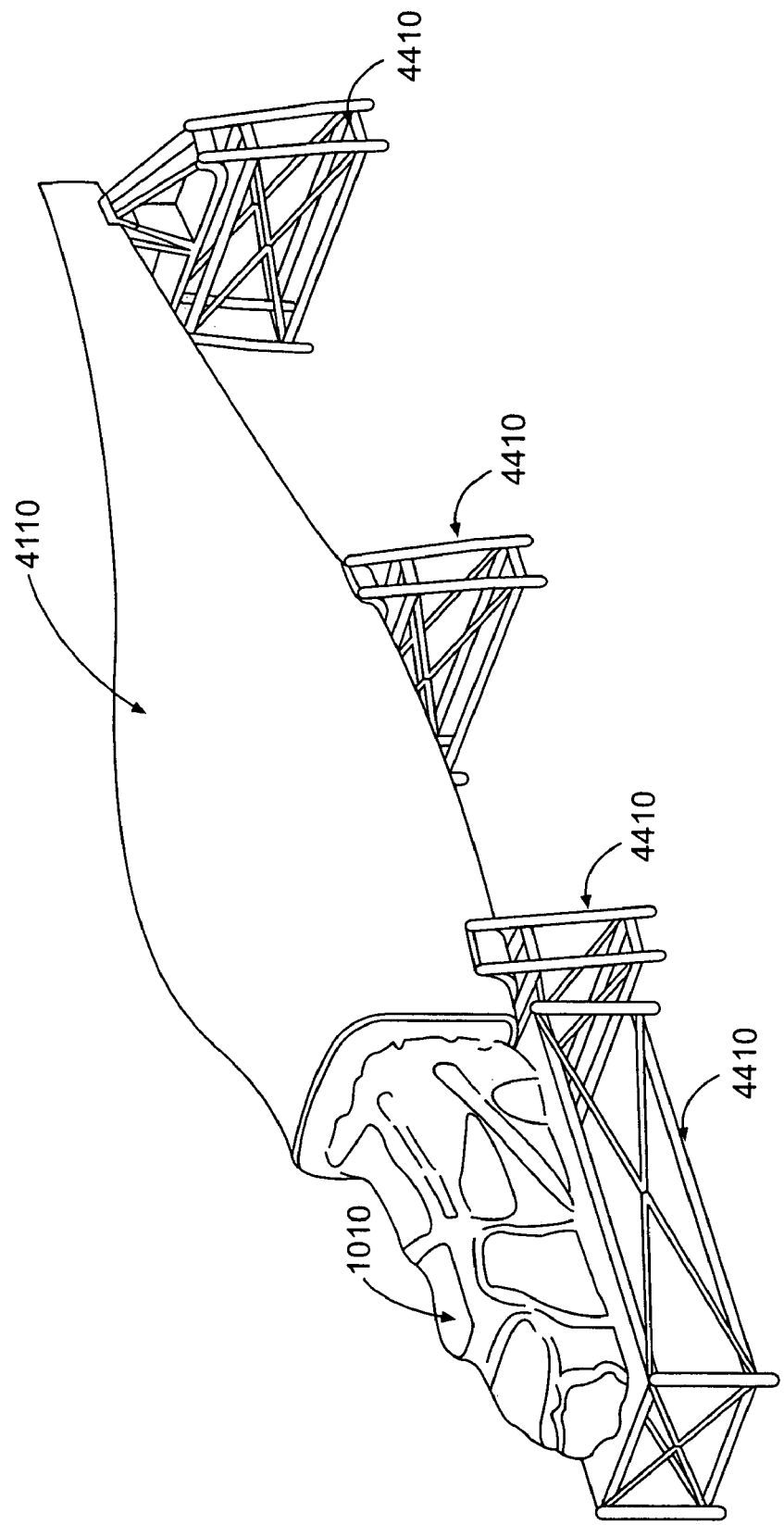
FIG. 44 illustrates removing a bag from a one-piece integrally stiffened fuselage in accordance with an embodiment of the present invention as shown in FIG. 41.

FIG. 44 illustrates removing a bag from a one-piece integrally stiffened fuselage in accordance with an embodiment of the present invention as shown in FIG. 41. As shown in FIG. 44, bag 1010 is removed from one-piece integrally stiffened fuselage 4110, while both are supported on work stands 4410. Bag 1010 as previously explained has no substantial shape without armature 1020 and media 1210.

Figure 45:
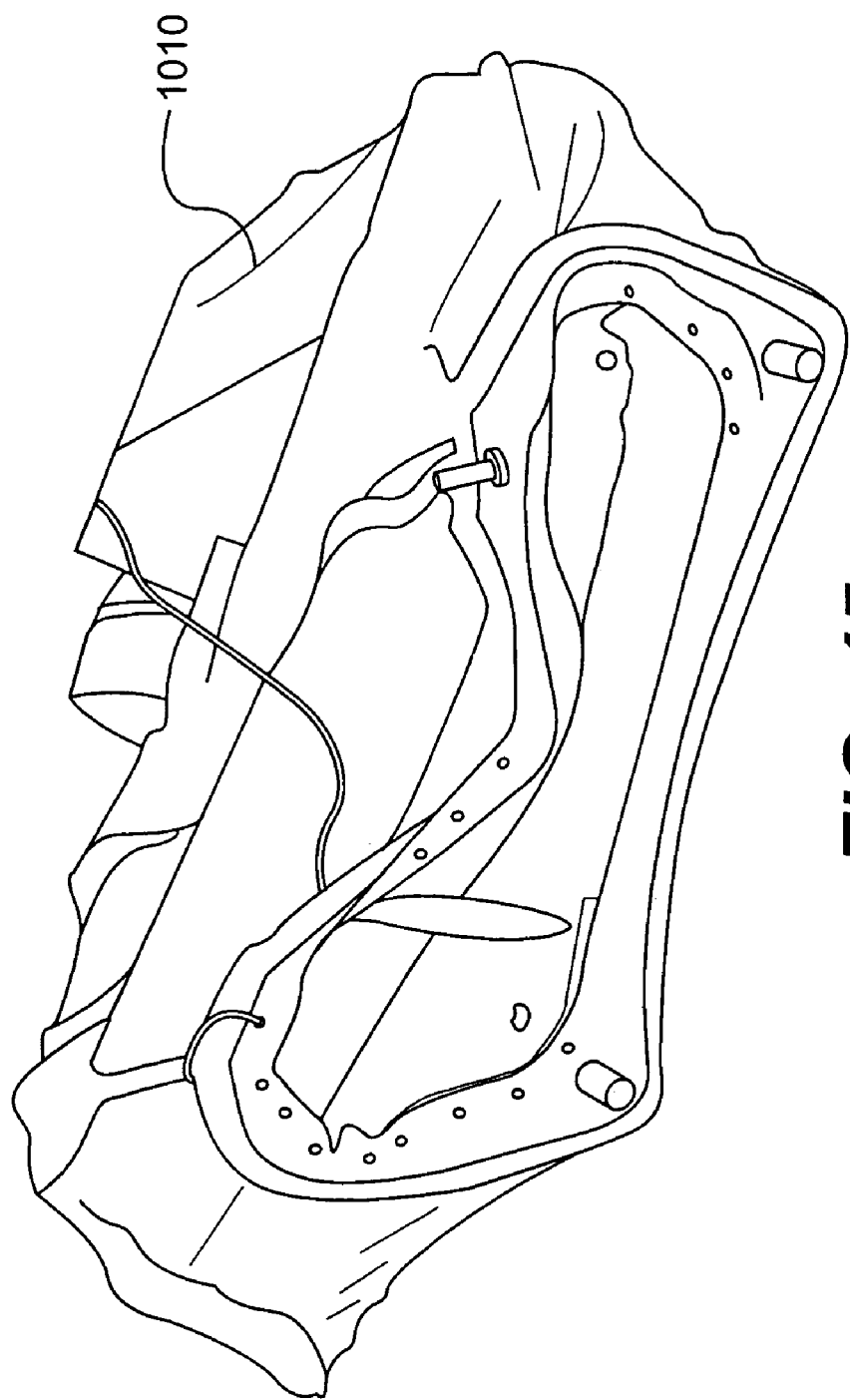
FIG. 45 illustrates a bag after removal from a mandrel in accordance with an embodiment of the present invention, as shown in FIG. 44.

FIG. 45 illustrates a bag after removal from a mandrel in accordance with an embodiment of the present invention, as shown in FIG. 44. Bag 1010 may now be reused, after removal from one-piece integrally stiffened fuselage 4110.

As shown in FIG. 9, following de-mold 917, extract frame mandrels 918 occurs. Extract frame mandrels 918 is described in FIG. 46.

Figure 46:
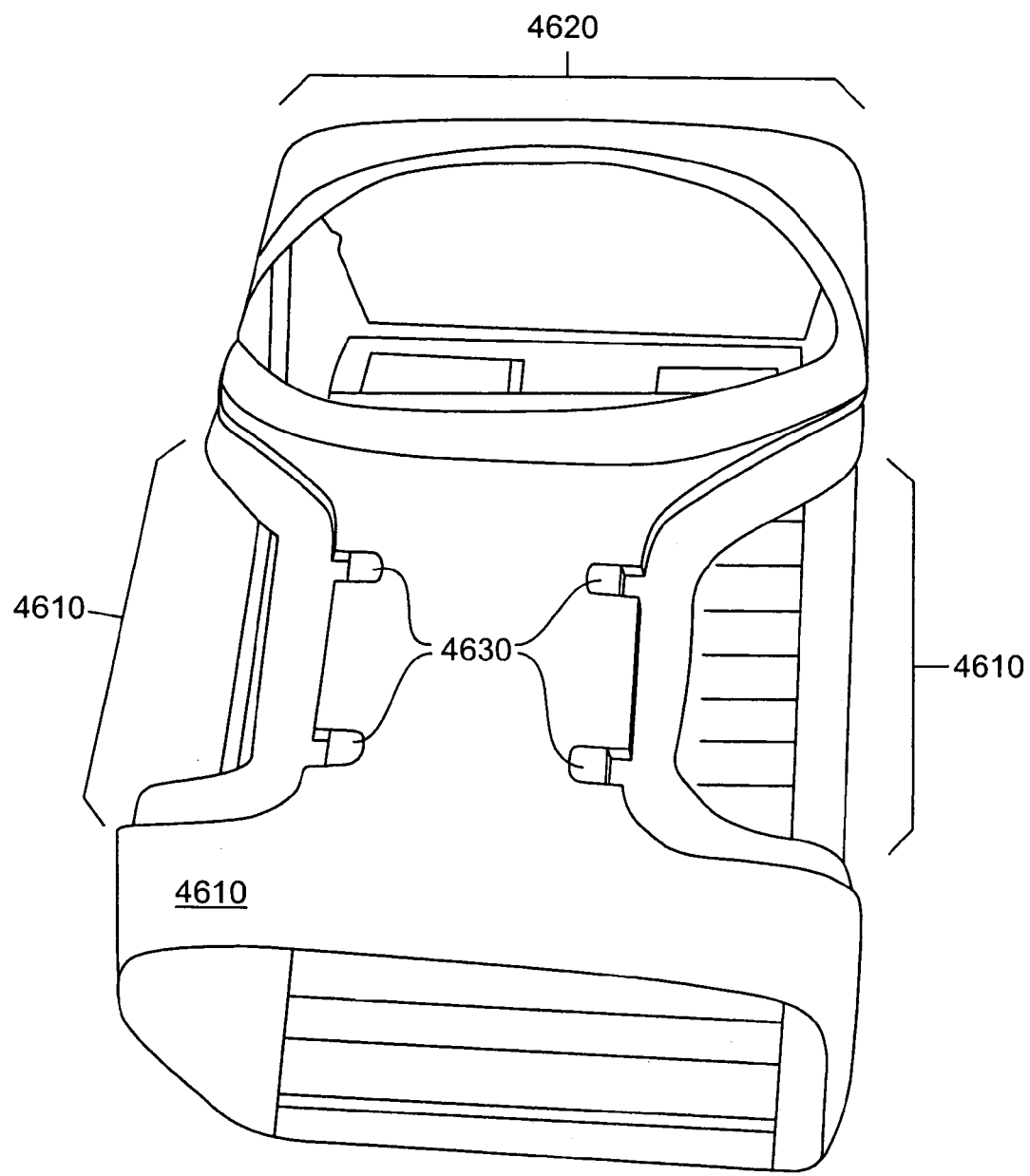
FIG. 46 illustrates removing frame mandrels from a one-piece integrally stiffened fuselage in accordance with an embodiment of the present invention as shown in FIG. 9.

FIG. 46 illustrates removing frame mandrels from a one-piece integrally stiffened fuselage in accordance with an embodiment of the present invention as shown in FIG. 9. As shown in FIG. 46, once media has been extracted, and once the bag 1420 has been extracted, frame mandrels 1920 (not shown) may then be extracted. Once frame mandrels 1920 have been extracted from mandrel 4200, a structure can be seen, such as, in this example, one-piece integrally stiffened fuselage 4610. Fuselage 4610 includes door openings 4610, windshield opening 4620, and door attachment points 4630. Fuselage 4610 also depicts other components, as shown in FIG. 46.

As shown in FIG. 9, following extract frame mandrels 918, visually inspect parts 919, trim 920, and prime and paint 921 occurs. One implementation of actions 919, 920, and 921 is described in FIGS. 47-48. Other implementations may be used.

Figure 47:
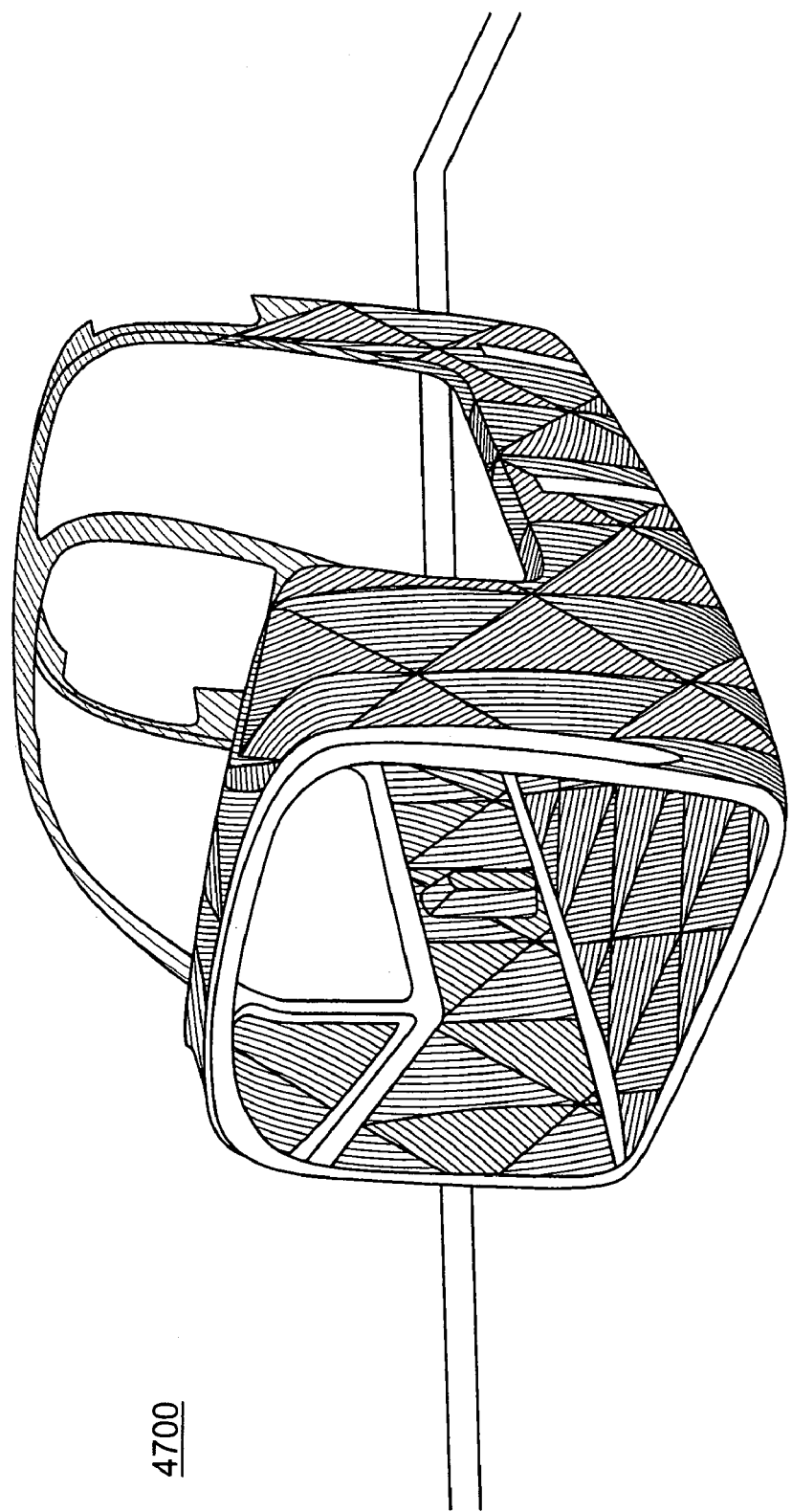
FIG. 47 illustrates a one-piece integrally-stiffened fuselage manufactured in accordance with one embodiment of the present invention as shown in FIG. 9.

FIG. 47 illustrates a one-piece integrally-stiffened fuselage manufactured in accordance with one embodiment of the present invention as shown in FIG. 9. As shown in FIG. 47, fuselage 4700 has been prepared for inspection. During visually inspecting part 919, fuselage 4700 is examined visually, both interior and exterior surfaces. In addition, visually inspect part 919 includes verification that dimensional tolerances are correct. In addition to visually inspect part 919, trim 920 includes trimming any material, as needed. Trim 920 includes manual methods (such as a hand held air powered router motor with router tool) or automatic methods (such as robot using a router tool). In addition to trim 920, prime and paint 921 includes sanding and filling surfaces to an acceptable level of smoothness. After sanding and filling, fuselage 4700 receives paint primer on all exterior surfaces.

Figure 48:
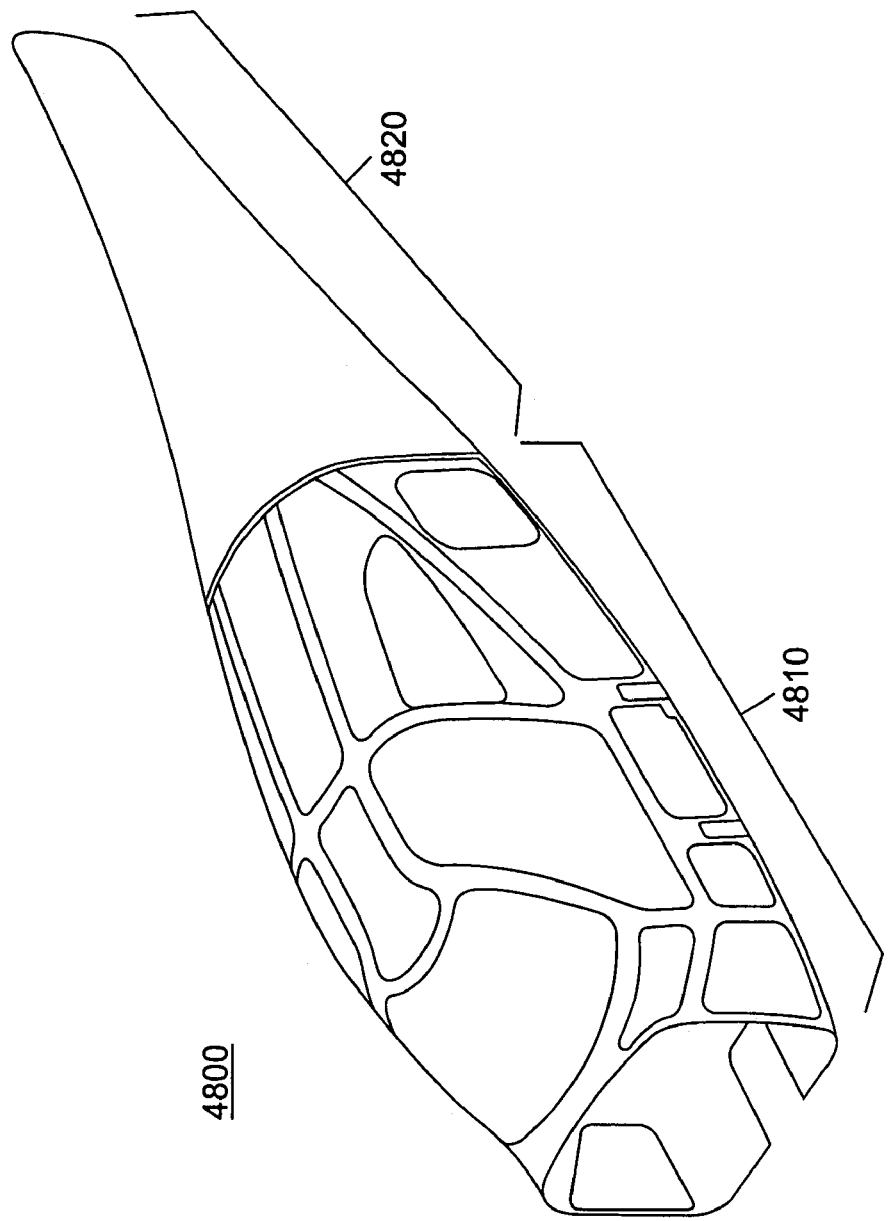
FIG. 48 illustrates a one-piece integrally stiffened fuselage manufactured in accordance with one embodiment of the present invention as shown in FIG. 9.

FIG. 48 illustrates a one-piece integrally stiffened fuselage manufactured in accordance with one embodiment of the present invention as shown in FIG. 9. As shown in FIG. 48, fuselage 4800 includes both a fuselage cabin 4810 and a tail cone 4820. FIG. 48 demonstrates that fuselage 4800 includes both fuselage cabin 4810 and tail cone 4820. In other implementations, other parts of an aircraft may further be included with fuselage 4800.

As shown in FIG. 9, following prime and paint 921, store for assembly 922 occurs. Store for assembly involves storing a structure, such as a fuselage, until needed, e.g., until the fuselage is needed to assemble an aircraft.

As described in the preceding sections, various implementations may be used to create a structure, such as fuselage 4700 or fuselage 4800. The following section illustrates one of many such alternative implementations.

2. Alternate 2

Figure 49:
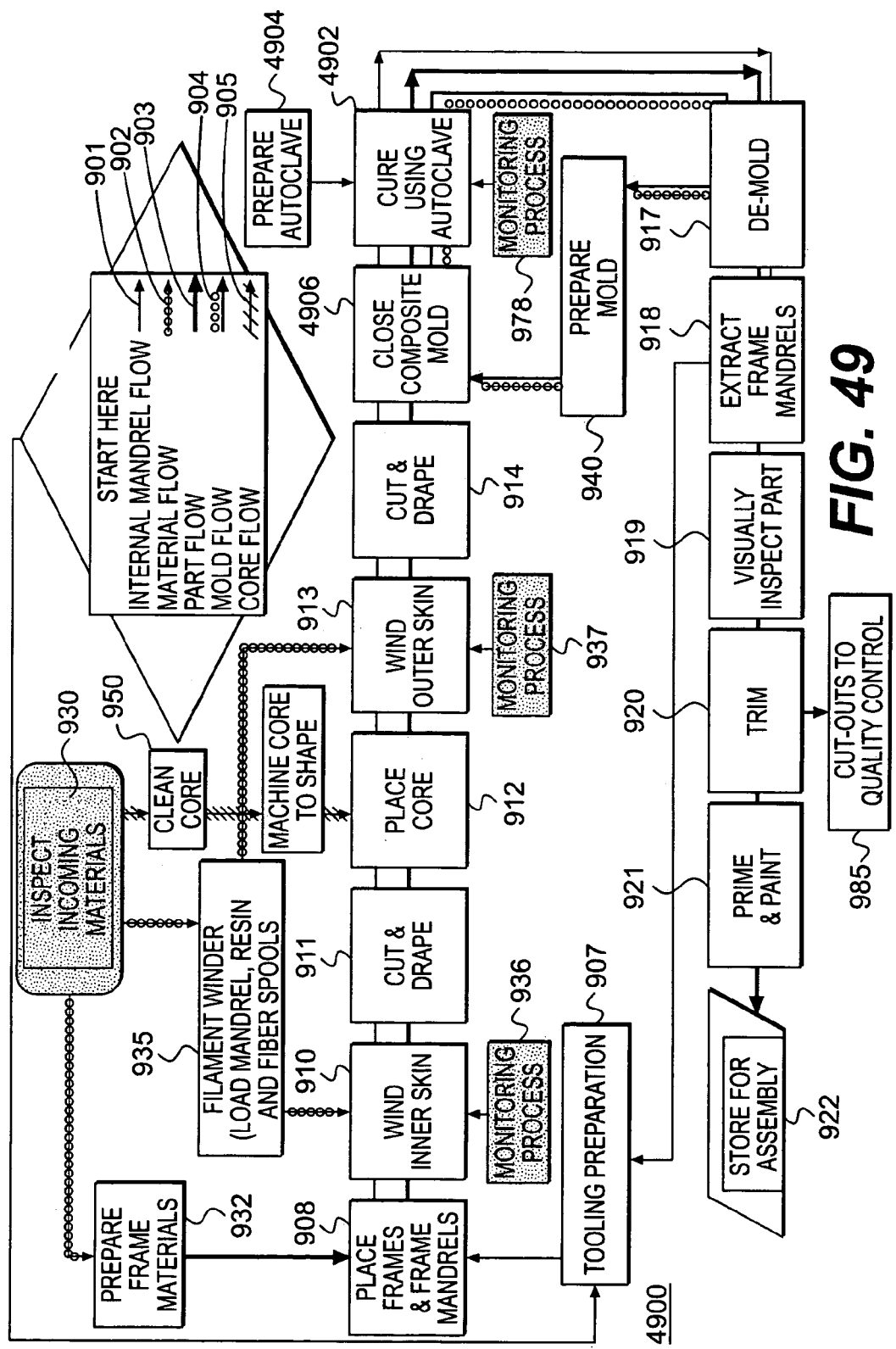
FIG. 49 is a block diagram illustrating the process of manufacturing a one-piece fuselage in accordance with another embodiment of the present invention, as shown in FIG. 9.

FIG. 49 is a block diagram illustrating the process of manufacturing a one-piece fuselage in accordance with another embodiment of the present invention, as shown in FIG. 9. As shown in FIG. 49, system 4900 is substantially similar to system 900 shown in FIG. 9. However, as shown in FIG. 49, close composite mold 4906 has replaced close mold 915, prepare autoclave 4904 has replaced prepare oven 975, and cure using autoclave 4902 has replaced cure 916. Close composite mold 4906 involves the use of a mold manufactured from composite materials. In one implementation, the mold is manufactured from high temperature fiber-reinforced plastics. However, in other implementations, other molds and other materials could be used. Prepare autoclave 4904 and cure using autoclave show that an autoclave is used to cure the structure in system 4900. Cure using autoclave pressure is described below. Close composite mold 4906, prepare autoclave 4904, and cure using autoclave 4902 are described in FIGS. 50-53.

Figure 50:
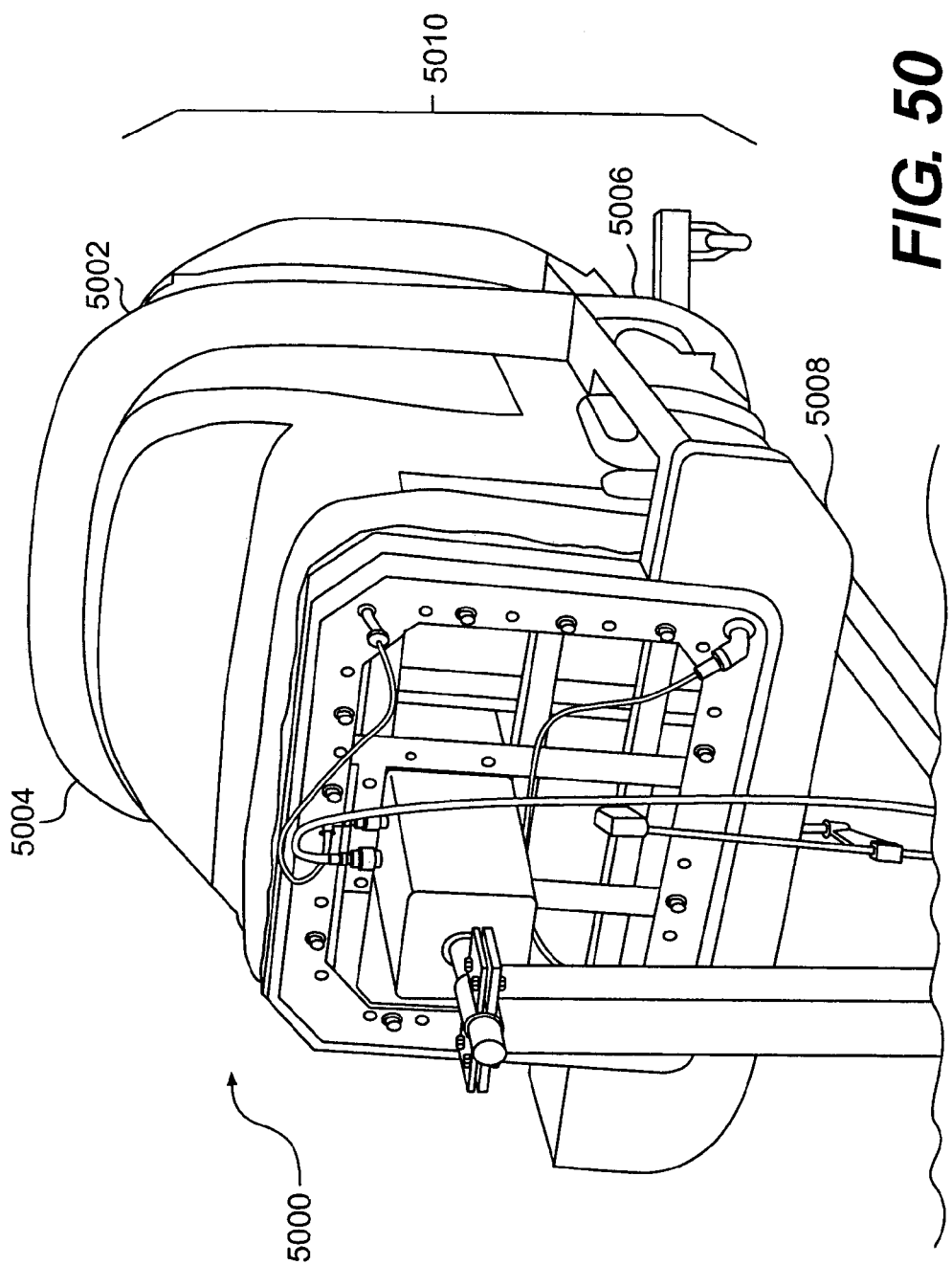
FIG. 50 illustrates assembling a circumferential mold around a mandrel in accordance with an embodiment of the present invention, as shown in FIG. 49.

FIG. 50 illustrates assembling a circumferential mold around a mandrel in accordance with an embodiment of the present invention, as shown in FIG. 49. As shown in FIG. 50, fuselage 5000 may be prepared for curing according to prepare autoclave 4904 (from FIG. 49). Fuselage 5000 may be placed in a mold 5010 for curing. In one implementation, mold 5010 consists of seven pieces. Four of the seven pieces are visible in FIG. 50: (1) upper left half 5002, (2) upper right half 5004, (3) lower forward segment 5008, and (4) lower aft segment 5006. The other segments (not shown) comprise: (1) left windshield area 5012 (not shown), (2) the right windshield area 5014 (not shown), and (3) the bulkhead flange upper half segment 5016 (not shown). In other implementations, more or less pieces could be used to construct the mold 5010. These implementations are merely exemplary, and other implementations may also be used.

Figure 51:
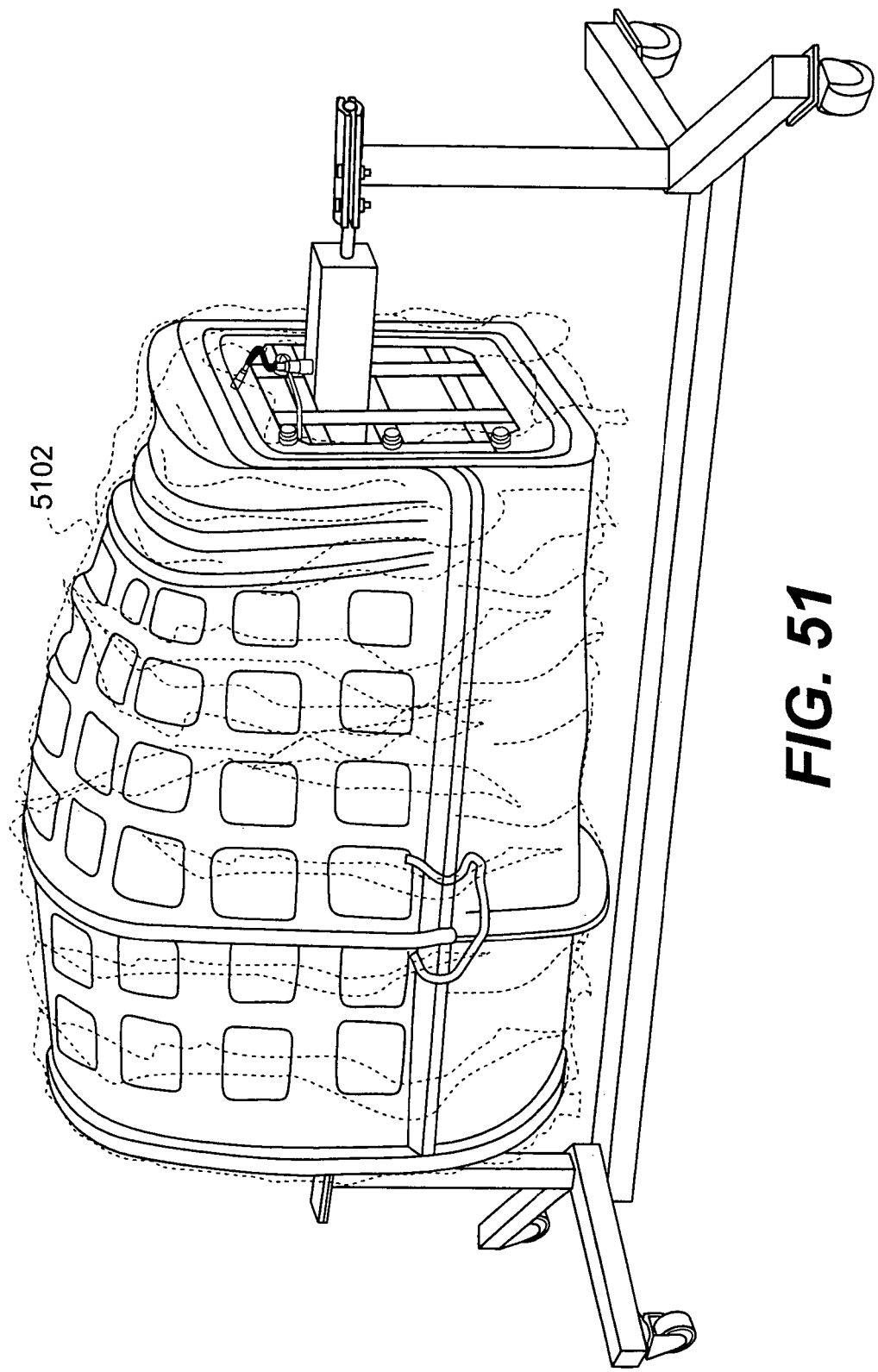
FIG. 51 illustrates bagging a circumferential mold in accordance with an embodiment of the present invention, as shown in FIG. 50.

FIG. 51 illustrates bagging a circumferential mold in accordance with an embodiment of the present invention, as shown in FIG. 50. As shown in FIG. 51, the seven pieces of mold 5010 (as described in FIG. 50) have been placed around fuselage 5000. After construction of the mold 5010, it is placed in a bag 5102 for sealing to form bag assembly 5100. Bag 5102 may be made of nylon. However, bag 5102 may also be made of any other material. In one implementation, bag 5102 is sealed such that a vacuum is formed between the bag 1420 and envelope bag 5102. In this implementation, the vacuum provides for a void-free structure. Other implementations may also be used.

Figure 52:
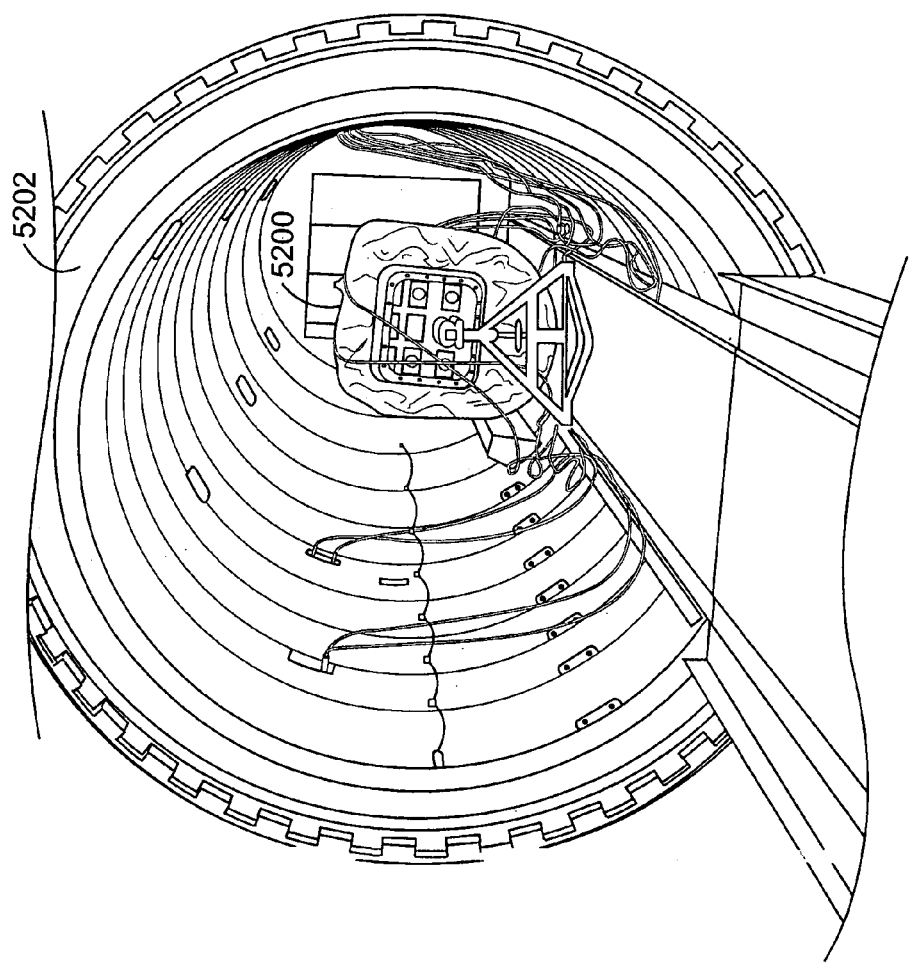
FIG. 52 illustrates placing a circumferential mold in an autoclave for curing in accordance with an embodiment of the present invention, as shown in FIG. 51.

FIG. 52 illustrates placing a circumferential mold in an autoclave for curing in accordance with an embodiment of the present invention, as shown in FIG. 51. As shown in FIG. 52, bag assembly 5200 may be placed in an autoclave 5202. In one implementation, autoclave 5202 applies pressure to bag assembly 5200. In this implementation, during autoclave curing, the frames and frame mandrels are maintained under by vacuum to maintain the proper shape for the frames. In this implementation, further curing by autoclave 5202 generally takes 1½ to 2 hours at a temperature between 250° F. and 350° F. at one to three atmospheres of pressure. The pressure is applied to the outside of bag 5102 and to the media cavity between armature 1320 and bag 1420. Autoclaves such as those manufactured by Thermal Equipment Corporation, Taricco Corporation, McGill AirPressure Corporation, Melco Steel Incorporated, and American Autoclave Company may be used. These implementations are only exemplary, and other implementations and other types of autoclaves may also be used.

Figure 53:
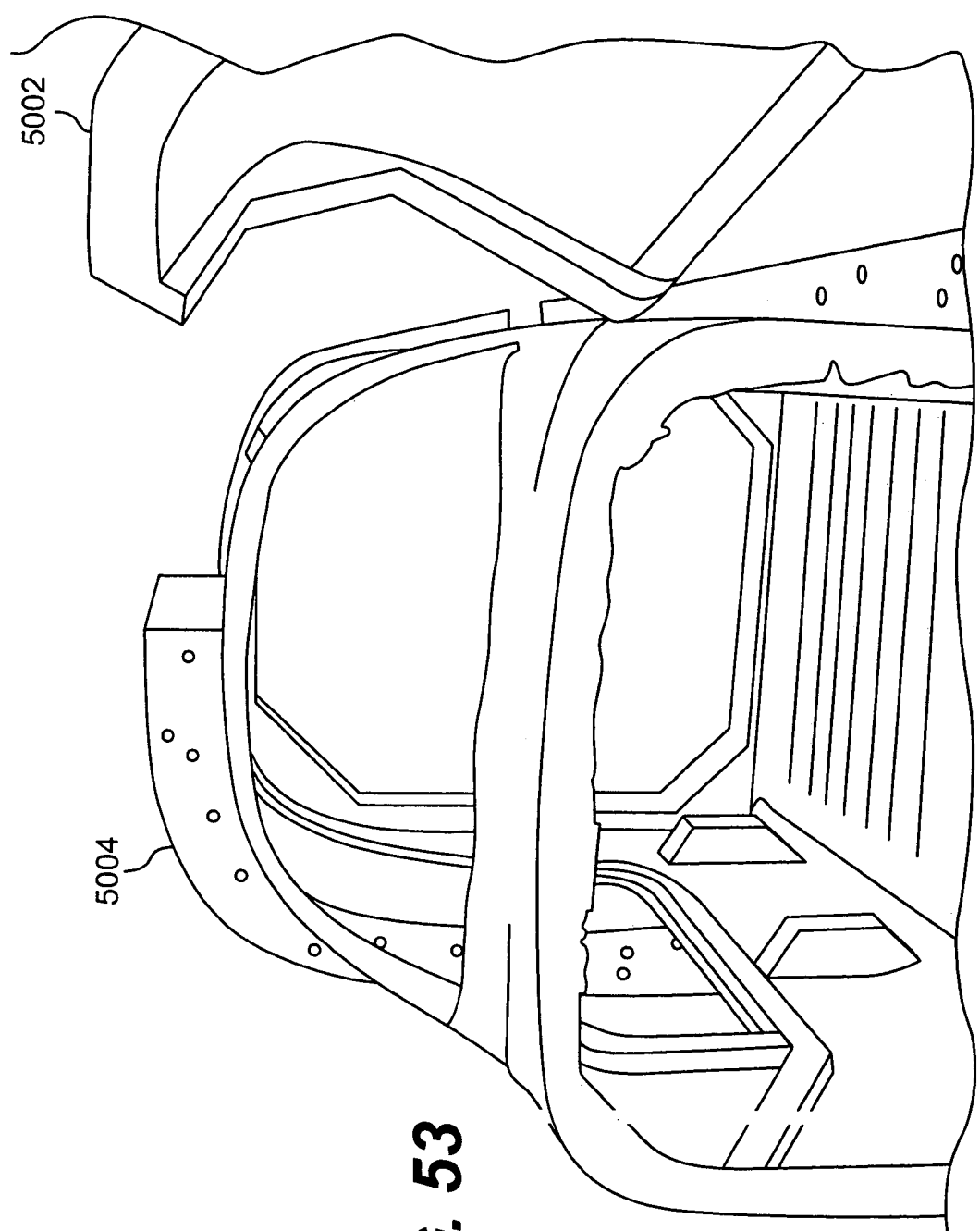
FIG. 53 illustrates removing a circumferential mold after curing in an autoclave in accordance with an embodiment of the present invention, as shown in FIG. 52.

FIG. 53 illustrates removing a circumferential mold after curing in an autoclave in accordance with an embodiment of the present invention, as shown in FIG. 52. As shown in FIG. 53, the pieces of mold 5010 are removed following curing by autoclave 5202. In FIG. 53, upper left half 5002 is removed, while upper right half 5004 is still in place.

Figure 54:
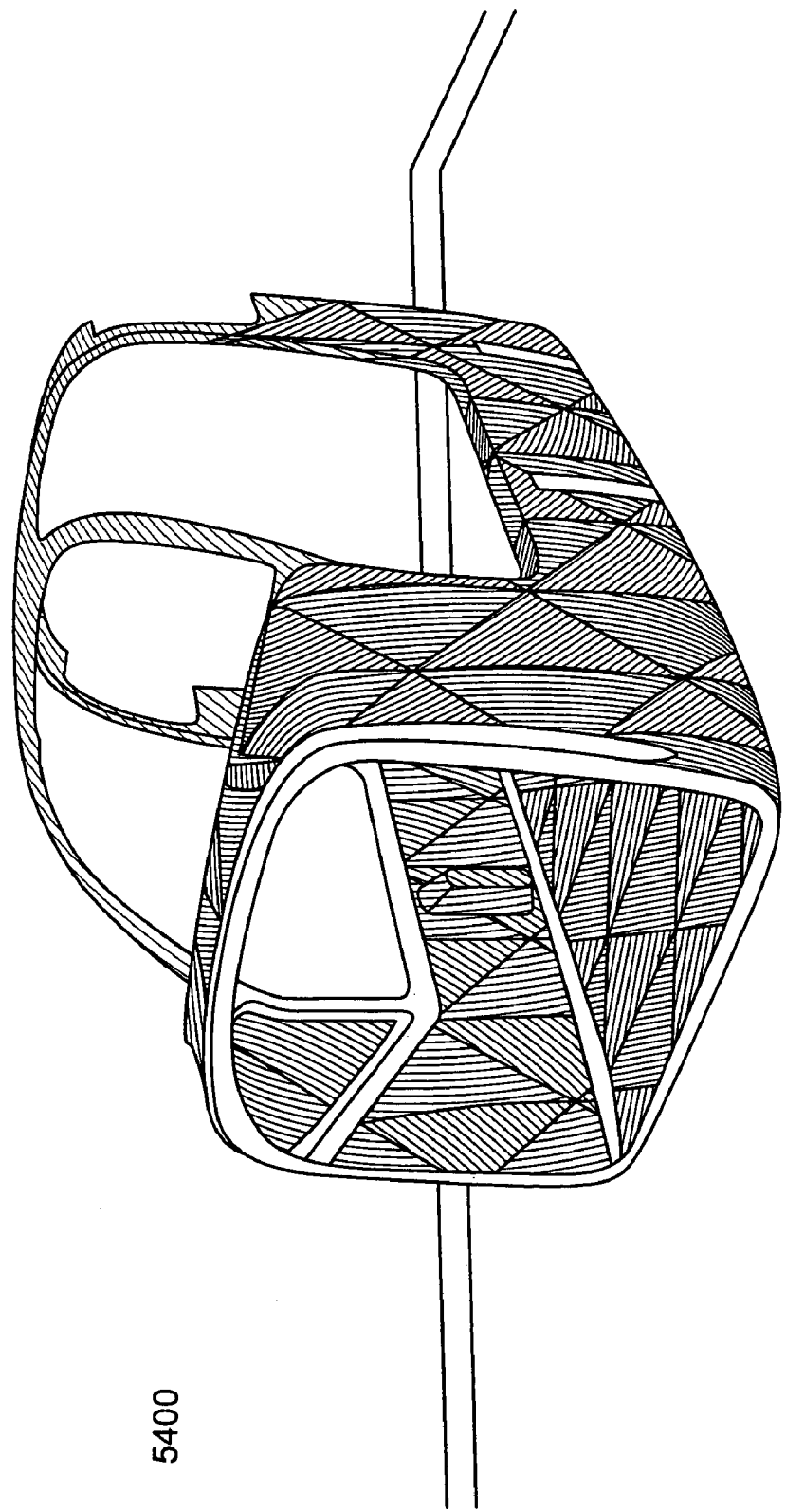
FIG. 54 illustrates a one-piece integrally-stiffened fuselage manufactured in accordance with another embodiment of the present invention, as shown in FIG. 49.

As shown in FIG. 49, following de-mold 917, extract mandrels 918, visually inspect part 919, trim 920, and prime and paint 921 occurs. One implementation of actions 919, 920, and 921 is depicted in FIG. 54. Other implementations may be used.

FIG. 54 illustrates a one-piece integrally-stiffened fuselage manufactured in accordance with another embodiment of the present invention, as shown in FIG. 49. As shown in FIG. 54, fuselage 5400 has been prepared for inspection. During visually inspect parts 919, fuselage 5400 is examined visually, both interior and exterior surfaces. In addition, visually inspect parts 919 includes verification that dimensional tolerances are correct. In addition to visually inspect parts 919, trim 920 includes trimming any material, as needed. Trim 920 includes manual methods (such as a hand held air powered router motor with router tool) or automatic methods (such as. robot using a router tool). In addition to trim 920, prime and paint 921 includes sanding and filling surfaces to an acceptable level of smoothness. After sanding and filling, fuselage 5400 receives paint primer on all exterior surfaces.

3. Other Alternates:

Alternates 1 (such as process alternate #1 805) and Alternate 2 (such as process alternate #2 815) are described herein, but any number of alternate methods and structures are possible for a one-piece structure, such as a fuselage, using the claimed invention.

VI. Conclusion

As described above, therefore, other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents. In this context, equivalents mean each and every implementation for carrying out the functions recited in the claims, even if not explicitly described therein.

What is claimed is:

1. A system for manufacturing a one-piece closed-shape structure using a mandrel, comprising:
   a preparing component configured to prepare the mandrel, wherein the mandrel comprises a bag and an armature;
   a first applying component configured to apply a frame mandrel to the mandrel to form a frame for the structure;
   a first filing component configured to fill the mandrel and the frame mandrel with media;
   a second applying component configured to apply a curable resin to a fiber;
   a third applying component configured to apply the fiber over the mandrel and frame mandrel to form the structure;
   a curing component configured to cure the structure;
   a removing component configured to remove the media from the mandrel and frame mandrel;
   an extracting component configured to extract the mandrel and frame mandrel from the structure;
   wherein the preparing component further comprises:
      a placing component configured to place the armature through the bag; and
      a first conforming component configured to conform the shape of the bag to a desired shape of the structure
   wherein the first conforming component further comprises:
      a sealing component configured to seal the bag;
         a placing component configured to place the armature and the bag in a form tool; and
      a second conforming component configured to conform the shape of the bag to the form tool,
   wherein the second conforming component further comprises:
      a second filling component configured to fill a space between the armature and the bag with air; and
      a creating component configured to create a vacuum between the form tool and the bag to force the bag to conform to the shape of the form tool.

2. A system for manufacturing a one-piece closed-shape structure using a mandrel, comprising:
   a preparing component configured to prepare the mandrel, wherein the mandrel comprises a bag and an armature;
   a first applying component configured to apply a frame mandrel to the mandrel to form a frame for the structure;
   a first filing component configured to fill the mandrel and the frame mandrel with media;
   a second applying component configured to apply a curable resin to a fiber;
   a third applying component configured to apply the fiber over the mandrel and frame mandrel to form the structure;
   a curing component configured to cure the structure;
   a removing component configured to remove the media from the mandrel and frame mandrel;
   an extracting component configured to extract the mandrel and frame mandrel from the structure;
   wherein the first applying component further comprises:
      a fourth applying component configured to apply a frame ply to an exterior of the bag; and
      a fifth applying component configured to apply the frame mandrel over the frame ply.

3. A system, for manufacturing a one-piece closed-shape structure using a mandrel, comprising:
   a preparing component configured to prepare the mandrel, wherein the mandrel comprises a bag and an armature;
   a first applying component configured to apply a frame mandrel to the mandrel to form a frame for the structure;
   a first filing component configured to fill the mandrel and the frame mandrel with media;
   a second applying component configured to apply a curable resin to a fiber;
   a third applying component configured to apply the fiber over the mandrel and frame mandrel to form the structure;
   a curing component configured to cure the structure;
   a removing component configured to remove the media from the mandrel and frame mandrel;
   an extracting component configured to extract the mandrel and frame mandrel from the structure;
   wherein the third applying component further comprises:
   a first winding component configured to wind the fiber over the mandrel and frame mandrel to form the structure; and
   wherein the first winding component further comprises:
      a first placing component configured to place a first winding aid on the bag;
      a second winding component configured to wind the fiber over the first winding aid, the frame mandrel, and the mandrel to form an inner skin;

a first cutting component configured to cut the inner skin to remove the first winding aids;

a second placing component configured to place a second winding aid on the inner skin;

a third winding component configured to wind the fiber over the second winding aid and inner skin to form an outer skin; and a second cutting component configured to cut the outer skin to remove the second winding aids.

4. The system of claim 3, wherein the second placing component further comprises a third placing component configured to place a core piece on the inner skin.

5. A system for manufacturing a one-piece closed-shape structure using a mandrel, comprising:

a preparing component configured to prepare the mandrel, wherein the mandrel comprises a bag and an armature;

a first applying component configured to apply a frame mandrel to the mandrel to form a frame for the structure;

a first filing component configured to fill the mandrel and the frame mandrel with media;

a second applying component configured to apply a curable resin to a fiber;

a third applying component configured to apply the fiber over the mandrel and frame mandrel to form the structure;

a curing component configured to cure the structure;

a removing component configured to remove the media from the mandrel and frame mandrel;

an extracting component configured to extract the mandrel and frame mandrel from the structure;

wherein the curing component further comprises:

a first placing component configured to place a mold around an exterior of the structure;

a sealing component configured to seal the mold;

a second placing component configured to place the mold in a heating device; and a heat applying component configured to apply heat to the mold using the heating device.

6. The system of claim 5, wherein the curing component further comprises:

a first creating component configured to create a vacuum in the mandrel; and a second creating component configured to create a vacuum in the frame mandrel.

7. A system for manufacturing a one-piece closed-shape structure using a mandrel, comprising:

a preparing component configured to prepare the mandrel, wherein the mandrel comprises a bag and an armature;

a first applying component configured to apply a frame mandrel to the mandrel to form a frame for the structure;

a first filing component configured to fill the mandrel and the frame mandrel with media;

a second applying component configured to apply a curable resin to a fiber;

a third applying component configured to apply the fiber over the mandrel and frame mandrel to form the structure;

a curing component configured to cure the structure;

a removing component configured to remove the media from the mandrel and frame mandrel;

an extracting component configured to extract the mandrel and frame mandrel from the structure;

wherein the curing component further comprises:

a first placing component configured to place a mold around an exterior of the structure;

a sealing component configured to seal the mold;

a second placing component configured to place the mold in an autoclave and a pressure applying component configured to apply pressure to the mold using the autoclave.

8. A system for manufacturing a one-piece closed-shape structure, using a mandrel comprising:

a preparing component configured to prepare the mandrel, wherein the mandrel comprises a bag and an armature;

a first placing component configured to place the armature through the bag;

a first conforming component configured to conform the shape of the bag to a desired shape of the structure;

a first applying component configured to apply a frame mandrel to the mandrel to form a frame of the structure;

a first filling component configured to fill the mandrel and the frame mandrel with media;

a second applying component configured to apply a curable resin to a fiber;

a third applying component configured to apply the fiber over the frame mandrel and the bag to form an inner skin;

a second placing component configured to place a core piece on the inner skin;

a fourth applying component configured to apply the fiber over the core piece and inner skin to form an outer skin;

a third placing component configured to place a mold around an exterior of the structure;

a curing component configured to cure the structure in the mold;

a first removing component configured to remove the mold from the structure;

a second removing component configured to remove the media from the mandrel and the mandrel frame;

a first extracting component configured to extract the armature from the bag; and a second extracting component configured to extract the bag from the structure.

9. The system of claim 8, wherein the first conforming component further comprises:

a sealing component configured to seal the bag;

a fourth placing component configured to place the armature and the bag in a form tool; and a second conforming component configured to conform the shape of the bag to the form tool.

10. The system of claim 9, wherein the second conforming component further comprises:

a second filling component configured to fill a space between the armature and the bag with air; and a creating component configured to create a vacuum between the form tool and the bag to force the bag to conform to the shape of the form tool.

11. The system of claim 8, wherein the first applying component further comprises:

a fifth applying component configured to apply a frame ply to an exterior of the bag; and a sixth applying component configured to apply a frame mandrel over the frame ply.

12. The system of claim 8, wherein the first filling component further comprises a compacting component configured to compact the media.

13. The system of claim 12, wherein the compacting component further comprises a vibrating component configured to vibrate the mandrel and frame mandrel to aid compaction.

14. The system of claim 8, wherein the third applying component comprises:

a first winding component configured to wind the fiber over the frame mandrel and the bag to form the inner skin.

15. The system of claim 14, wherein the first winding component further comprises:
- a fourth placing component configured to place a winding aid on the bag;
- a second winding component configured to wind the fiber over the frame mandrels, the winding aid, and the bag to form the inner skin; and
- a cutting component configured to cut the inner skin to remove the winding aid.

16. The system of claim 8, wherein the fourth applying component comprises:
- a first winding component configured to wind the fiber over the core piece and inner skin to form the outer skin.

17. The system of claim 16, wherein the first winding component further comprises:
- a fourth placing component configured to place a winding aid on the inner skin;
- a second winding component configured to wind the fiber over the core piece, the winding aid, and the inner skin to form an outer skin; and
- a cutting component configured to cut the outer skin to remove the winding aid.

18. The system of claim 8, wherein the curing component further comprises:
- a sealing component configured to seal the mold;
- a fourth placing component configured to place the mold in a heating device; and
- a heat applying component configured to apply heat to the mold using the heating device.

19. The system of claim 18, wherein the curing component further comprises:
- a first creating component configured to create a vacuum in the mandrel; and
- a second creating component configured to create a vacuum in the frame mandrel.

20. The system of claim 8, wherein the curing component further comprises:
- a sealing component configured to seal the mold;
- a fourth placing component configured to place the mold in an autoclave; and
- a pressure applying component configured to apply pressure to the mold using the autoclave.

21. The system of claim 8, wherein the one-piece closed-shape structure is an airplane fuselage.

22. A system for manufacturing a one-piece closed-shape structure, using a mandrel comprising:
- a preparing means for preparing the mandrel, wherein the mandrel comprises a bag and an armature;
- a first placing means for placing the armature through the bag;
- a conforming means for conforming the shape of the bag to a desired shape of the structure;
- a first applying means for applying a frame mandrel to the mandrel to form a frame of the structure;
- a filling means for filling the mandrel and the frame mandrel with media;
- a second applying means for applying a curable resin to a fiber;
- a third applying means for applying the fiber over the frame mandrel and the bag to form an inner skin;
- a second placing means for placing a core piece on the inner skin;
- a fourth applying means for applying the fiber over the core piece and inner skin to form an outer skin;
- a third placing means for placing a mold around an exterior of the structure;
- a curing means for curing the structure in the mold;
- a first removing means for removing the mold from the structure;
- a second removing means for removing the media from the mandrel and the mandrel frame;
- a first extracting means for extracting the armature from the bag; and
- a second extracting means for extracting the bag from the structure.

\* \* \* \* \*

UNITED STATES PATENT AND TRADEMARK OFFICE
CERTIFICATE OF CORRECTION

PATENT NO. : 7,431,239 B2 Page 1 of 1
APPLICATION NO. : 10/712042
DATED : October 7, 2008
INVENTOR(S) : Alan H. Anderson et al.

It is certified that error appears in the above-identified patent and that said Letters Patent is hereby corrected as shown below:

Col. 29, line 53: "filing" should be "filling"

Col. 30, line 23: "filing" should be "filling"

Col. 30, line 46: "filing" should be "filling"

Col. 31, line 19: "filing" should be "filling"

Col. 31, line 52: "filing" should be "filling"

Signed and Sealed this

Ninth Day of December, 2008

JON W. DUDAS
*Director of the United States Patent and Trademark Office*